United States Patent
Hasegawa

(10) Patent No.: US 10,634,848 B2
(45) Date of Patent: Apr. 28, 2020

(54) OPTICAL FILTER AND OPTICAL TRANSMISSION DEVICE

(71) Applicant: FUJITSU LIMITED, Kawasaki-shi, Kanagawa (JP)

(72) Inventor: Makoto Hasegawa, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/425,131

(22) Filed: May 29, 2019

(65) Prior Publication Data
US 2020/0003957 A1  Jan. 2, 2020

(30) Foreign Application Priority Data

Jun. 28, 2018 (JP) .................. 2018-123606

(51) Int. Cl.
*G02B 6/34* (2006.01)
*G02B 6/293* (2006.01)
*G02B 6/26* (2006.01)
*G02B 6/42* (2006.01)

(52) U.S. Cl.
CPC ............ *G02B 6/34* (2013.01); *G02B 6/262* (2013.01); *G02B 6/29311* (2013.01); *G02B 6/4215* (2013.01)

(58) Field of Classification Search
CPC ...... G02B 6/327; G02B 6/243; G02B 6/3822; G02B 6/429; G01J 3/0218; G01J 3/0221
See application file for complete search history.

(56) References Cited

U.S. PATENT DOCUMENTS

| 6,074,100 A * | 6/2000 | Rowland ............. G02B 6/25 385/60 |
| 6,822,190 B2 * | 11/2004 | Smithson ............ G02B 6/262 219/121.69 |
| 6,856,726 B2 * | 2/2005 | Fuhrmann ........... G01J 3/02 385/13 |

(Continued)

FOREIGN PATENT DOCUMENTS

| JP | 2009-009073 | 1/2009 |
| JP | 2011-065023 | 3/2011 |

OTHER PUBLICATIONS

Mona Mayeh et al., "Tailoring Gaussian Laser Beam Shape Through Controlled Etching of Single-Mode and Multimode Fibers: Simulation and Experimental Studies", IEEE Sensors Journal, vol. 12, No. 1, pp. 168-173, Jan. 2012 (6 pages).

(Continued)

*Primary Examiner* — Rhonda S Peace
(74) *Attorney, Agent, or Firm* — Fujitsu Patent Center

(57) ABSTRACT

An optical filter includes a spectroscopic element configured to disperse input light, and emit the dispersed input light as spectrum light; and an optical fiber including an end face having a recess, a core having a first face in contact with a bottom of the recess and a second face sandwiched between the first face and a circumference end of the recess, and a clad surrounding the core, wherein in the optical fiber, the recess is irradiated with the spectrum light, the second face is inclined such that a second portion incident from the second face to the core out of the irradiated spectrum light is emitted to the clad, and a first portion incident from the first face to the core out of the irradiated spectrum light is outputted.

9 Claims, 53 Drawing Sheets

(56) References Cited

U.S. PATENT DOCUMENTS

| | | | | |
|---|---|---|---|---|
| 6,904,206 B2* | 6/2005 | Bao | ............... | G02B 6/262 |
| | | | | 385/28 |
| 7,330,617 B2* | 2/2008 | Aota | ............... | G02B 6/2931 |
| | | | | 359/290 |
| 7,488,116 B2* | 2/2009 | Steve | ............... | G02B 6/32 |
| | | | | 385/31 |
| 8,369,203 B2* | 2/2013 | Komura | ............... | B82Y 20/00 |
| | | | | 369/112.27 |
| 2004/0114860 A1* | 6/2004 | Dultz | ............... | G02B 6/4206 |
| | | | | 385/31 |
| 2020/0003957 A1* | 1/2020 | Hasegawa | ............... | G02B 6/262 |

OTHER PUBLICATIONS

H. Toshiyoshi et al., "A 5-Volt Operatid MEMS Variable Optical Attenuator," The 12th International Conference on Solid State Sensors, Actuators and Microsystems, Boston, Jun. 8-12, 2003 (4 pages).

WL Photonics Inc., Leading Provider of Fiber Optic Wavelength Tuning and Conditioning Solutions, Feb. 2016 (6 pages).

* cited by examiner

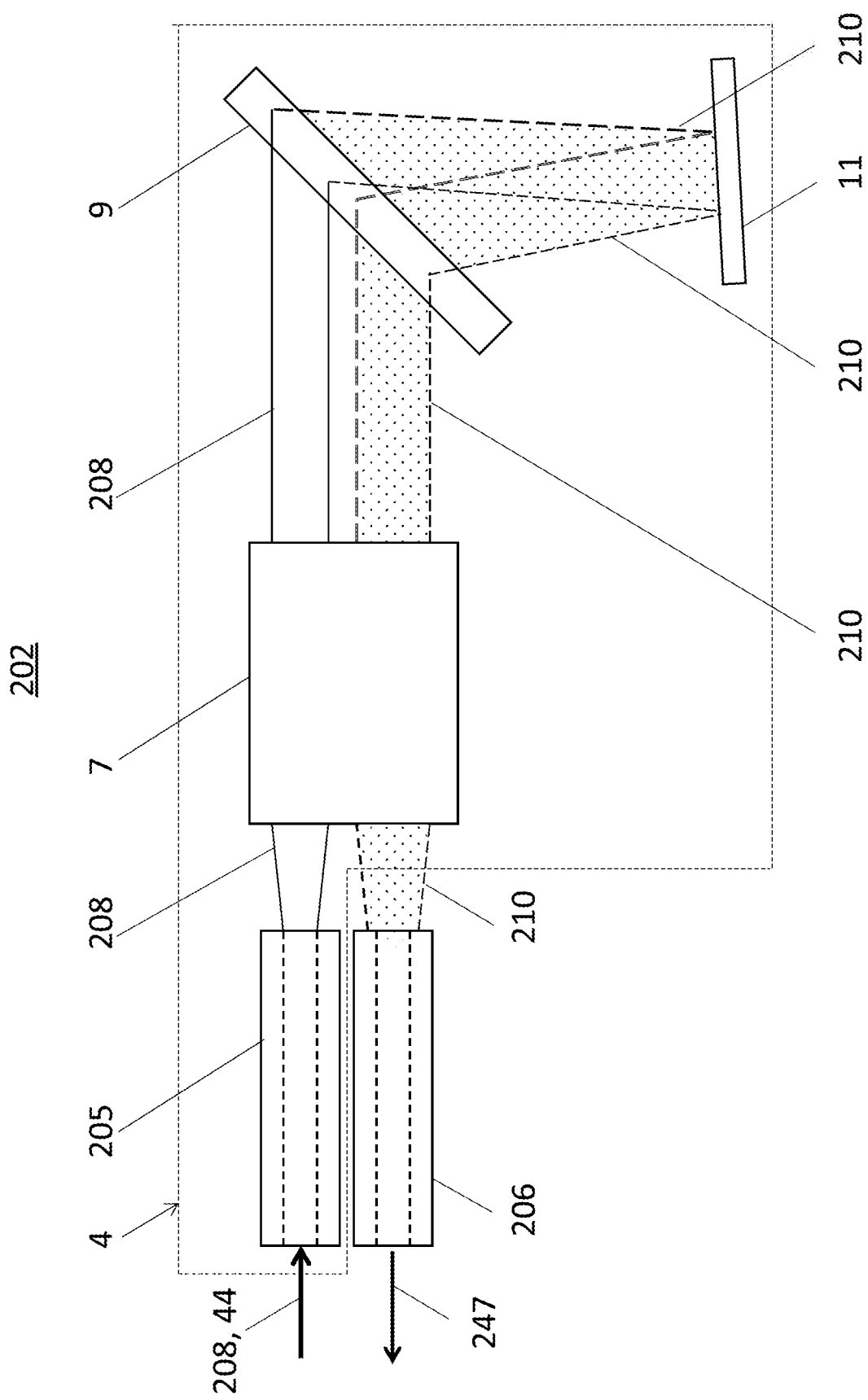

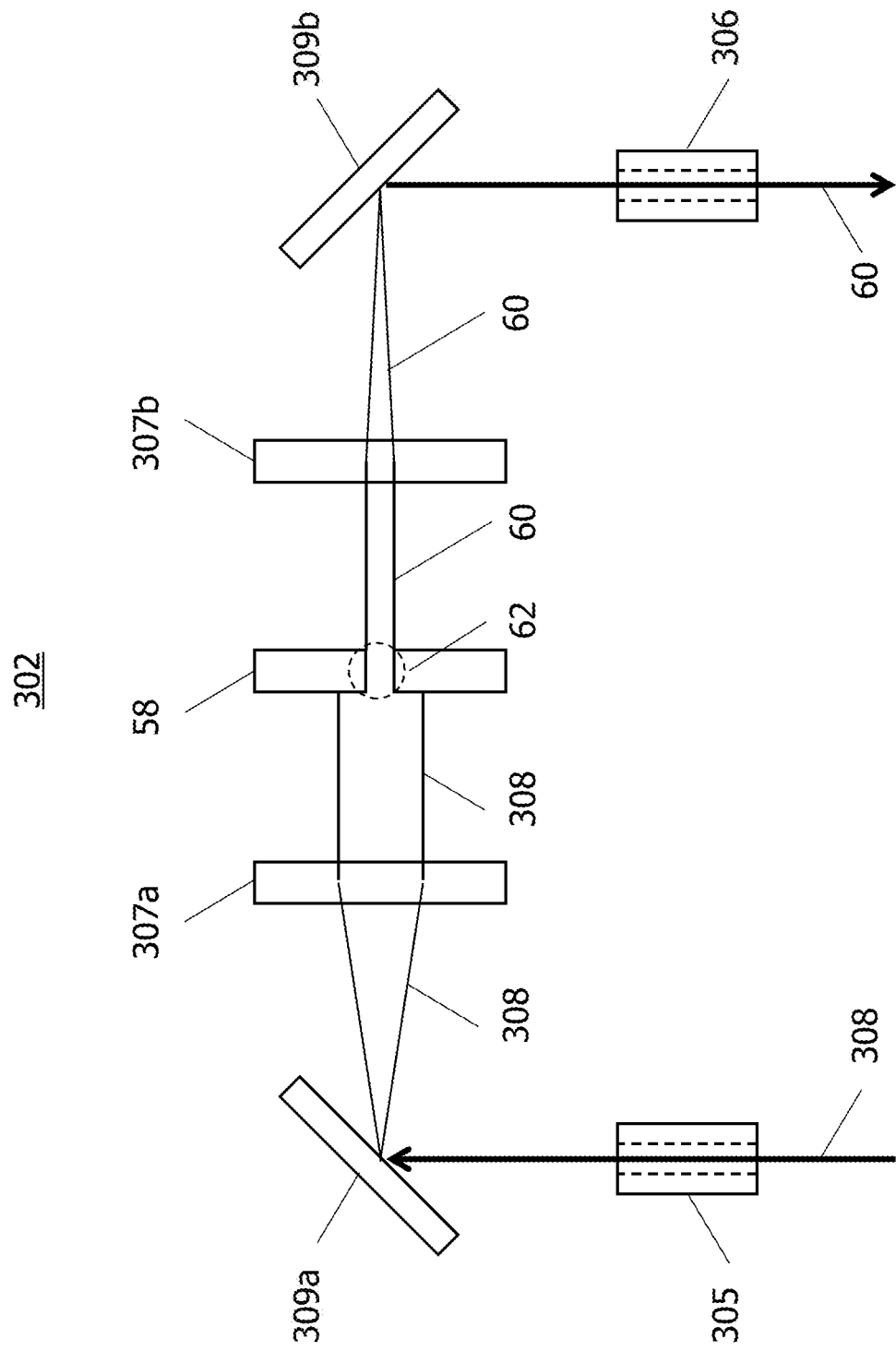

| FREQUENCY (THz) | VOLTAGE (V) |
|---|---|
| 195.90 | $V_0$ |
| ⋮ | ⋮ |
| 195.50 | $V_8$ |
| ⋮ | ⋮ |
| 195.10 | $V_{16}$ |

| CHANNEL | FREQUENCY (THz) |
|---------|-----------------|
| CH0     | 195.90          |
| :       | :               |
| CH8     | 195.50          |
| :       | :               |
| CH16    | 195.10          |

| CHANNEL | FREQUENCY (THz) |
|---------|-----------------|
| CH0     | 2.0             |
| :       | :               |
| CH8     | 2.1             |
| :       | :               |
| CH16    | 2.2             |

| GAIN (dB) | DRIVE CURRENT (mA) |
|---|---|
| 0 | $I_0$ |
| ⋮ | ⋮ |
| 10 | $I_{10}$ |
| ⋮ | ⋮ |
| 20 | $I_{20}$ |

498

OPTICAL FILTER AND OPTICAL TRANSMISSION DEVICE

CROSS-REFERENCE TO RELATED APPLICATION

This application is based upon and claims the benefit of priority of the prior Japanese Patent Application No. 2018-123606, filed on Jun. 28, 2018, the entire contents of which are incorporated herein by reference.

FIELD

The embodiments discussed herein are related to an optical filter and an optical transmission device.

BACKGROUND

An optical filter is a device for selectively allowing light having a particular wavelength to transmit. In addition, the optical filter is a device incorporated into optical transmission devices and the like and therefore, is demanded to be reduced in size according to the trends of the times.

A wavelength selectable switch used in building an optical multiplexing communication system also functions as the optical filter. The wavelength selectable switch is a device that selects signal light having a particular wavelength from a wavelength-multiplexed input signal using a diffraction grating, and outputs the selected signal light through one of a plurality of output fibers. Accordingly, by using only one of the plurality of output fibers, the wavelength selectable switch functions as the optical filter.

Related arts are disclosed in, for example, Japanese Laid-open Patent Publication Nos. 2011-65023 and 2009-9073, and Mona Mayeh and Faramarz Farahi, "Tailoring Gaussian Laser Beam Shape Through Controlled Etching of Single-Mode and Multimode Fibers: Simulation and Experimental Studies", IEEE SENSORS JOURNAL, VOL. 12, NO. 1, pp. 168-173, JANUARY 2012.

For the optical filter, the relation between the transmittance and the wavelength (hereinafter referred to as transmission characteristic) is an important characteristic. The preferred transmission characteristic of the optical filter is a filtering characteristic that the transmittance is high in a certain wavelength range (for example, 1 dB band), and suddenly decreases on the both sides of the wavelength range.

For example, using a general variable-wavelength filter used in an optical module as an example of the optical filter, it is feasible to change the Gaussian filtering characteristic into a desired filtering characteristic (that is, filtering characteristic that the transmittance suddenly decreases on both sides of a wavelength range) by providing a slit plate between the diffraction grating of the wavelength selectable switch and the output fiber. However, the slit plate makes downsizing of the variable-wavelength filter difficult. As described above, the downsizing of the optical filter including the variable-wavelength filter follows the trends of the times, such hard-to-downsize optical filter is unpractical.

In consideration of such situation, it is desired to realize an optical filter having the above-mentioned filtering characteristic without increasing the size.

SUMMARY

According to an aspect of the embodiments, an optical filter includes a spectroscopic element configured to disperse input light, and emit the dispersed input light as spectrum light; and an optical fiber including an end face having a recess, a core having a first face in contact with a bottom of the recess and a second face sandwiched between the first face and a circumference end of the recess, and a clad surrounding the core, wherein in the optical fiber, the recess is irradiated with the spectrum light, the second face is inclined such that a second portion incident from the second face to the core out of the irradiated spectrum light is emitted to the clad, and a first portion incident from the first face to the core out of the irradiated spectrum light is outputted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a view illustrating an example of the configuration of optical filter that is different from the optical filter in FIG. 1 in configuration;

FIG. 23 is a view illustrating an example of the configuration of optical filter that is different from the optical filter in FIG. 1 in configuration;

FIG. 30 is a view illustrating an example of a look-up table;

FIGS. 39A and 39B are views illustrating an example of look-up tables;

FIG. 43 is a view illustrating an example of a look-up table;

DESCRIPTION OF EMBODIMENTS

Figure 1:
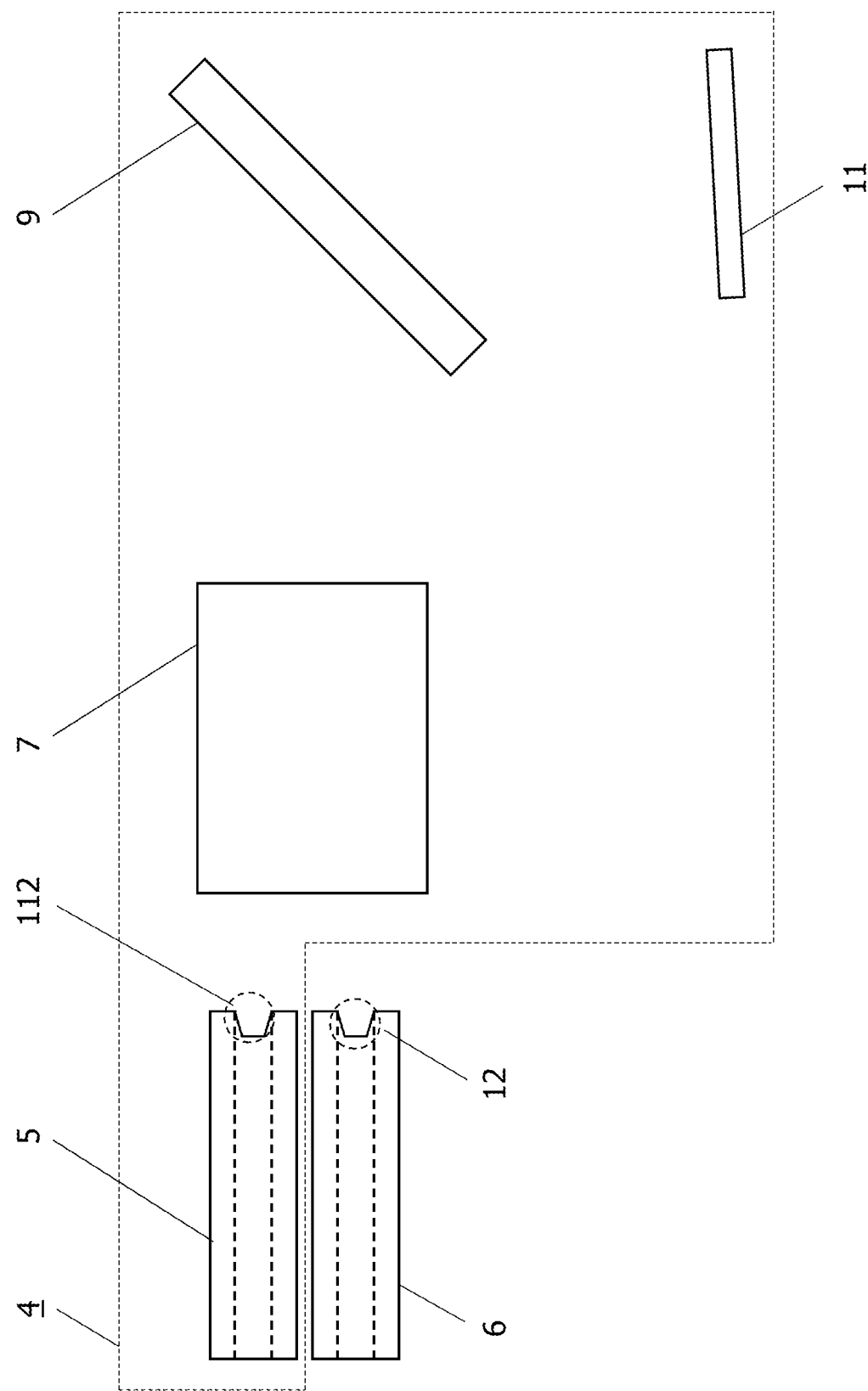
FIG. 1 is a view illustrating an example of the configuration of an optical filter in accordance with Embodiment 1.

Embodiments of the present disclosure will be described below with reference to figures. However, the technical scope of the present disclosure is not limited to the embodiments, but covers the matters defined in Claims and equivalents thereof. The components having the same configuration in drawings are given the same reference numerals, and description thereof is omitted.

(Embodiment 1)

(1) Configuration and Operation

FIGS. 1 to 4 are views illustrating an example of the configuration of an optical filter 2 in accordance with Embodiment 1.

As illustrated in FIG. 1, the optical filter 2 has a spectroscopic part 4 and an optical fiber 6 (hereinafter referred to as output fiber).

(1.1) Spectroscopic Part

The spectroscopic part 4 (see FIG. 4) disperses input light 8, and emits dispersed input light 10 (hereinafter referred to as spectrum light).

The spectroscopic part 4 has, for example, an optical fiber 5 (hereinafter referred to as input fiber) and a lens 7. The input fiber 5 is, for example, an optical fiber stored in a ferrule (this also applies to the output fiber 6). The spectroscopic part 4 further has a diffraction grating 9 and a mirror 11.

The input fiber 5 is, for example, a single mode fiber having a recess 112 on its end face. In the example illustrated in FIG. 1, the input fiber 5 has the same configuration as the output fiber 6. However, the end face of the input fiber 5 may be a flat end face having no recess 112. As described later, since the spectrum light 10 is filtered by the output fiber 6, there is no problem even when the end face of the input fiber 5 is flat.

The diffraction grating 9 is, for example, a transmission diffraction grating configured such that two types of transparent films having different refractive indexes are alternately stacked on a front face. The diffraction grating 9 may be a transmission diffraction grating configured such that cyclic irregularities are formed on a rear face of a transparent substrate.

Figure 4:
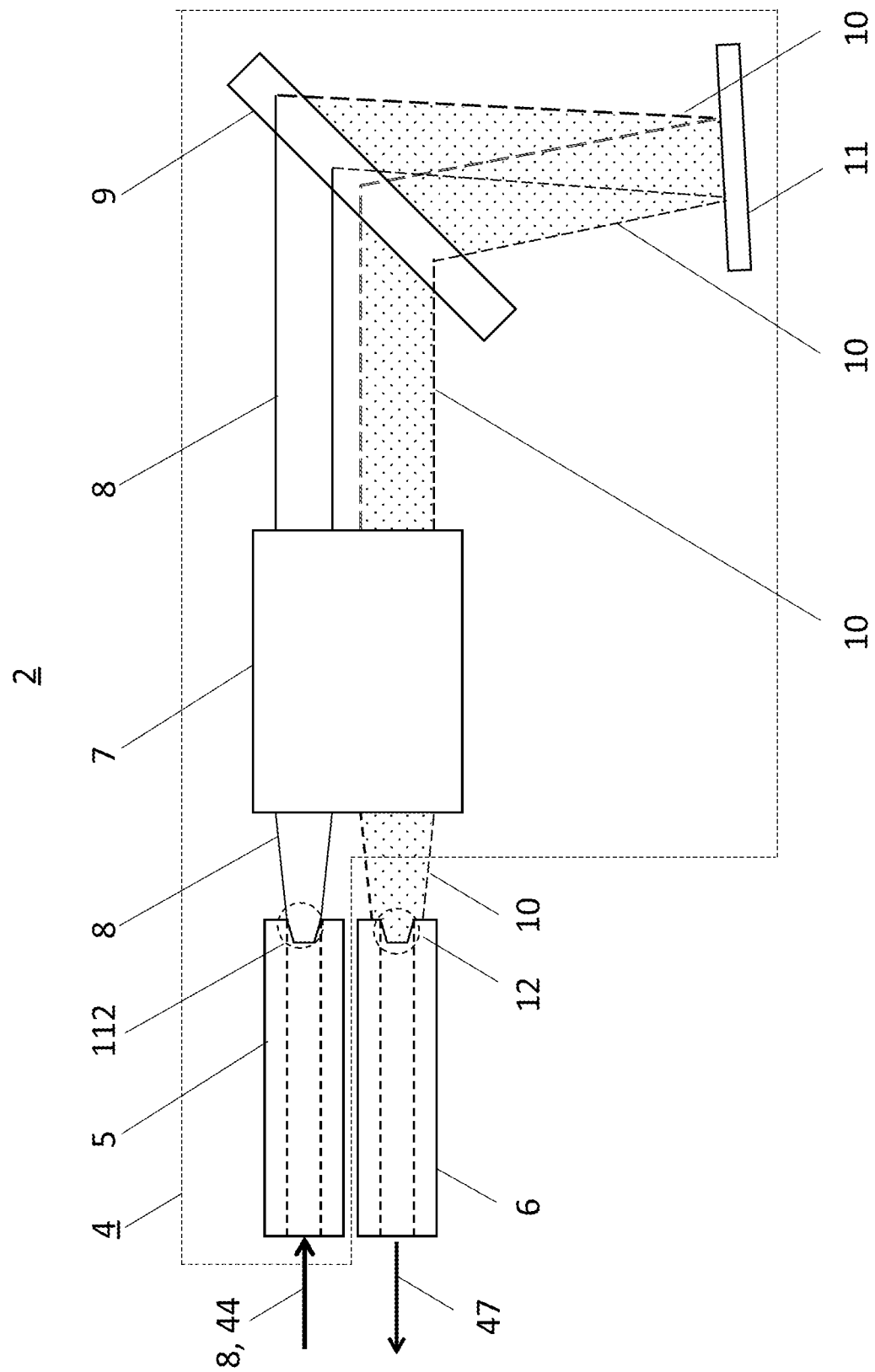
FIG. 4 is a view illustrating an example of the configuration of the optical filter in accordance with Embodiment 1.

As illustrated in FIG. 4, the input light 8 is emitted to free space in the spectroscopic part 4 via the input fiber 5. Then, the input light 8 is converted into a collimated beam by the lens 7. The input light converted into the collimated beam is dispersed by the diffraction grating 9. That is, the diffraction grating 9 causes a plurality of components having different wavelengths (hereinafter referred to as wavelength components) included in the input light 8 to travel in different directions. In summary, the dispersed input light (that is, spectrum light) includes a plurality of wavelength components travelling in different directions.

The spectrum light 10 is projected onto the mirror 11. The mirror 11 reflects the spectrum light 10, and irradiates the diffraction grating 9 with the reflected light. The diffraction grating 9 disperses the spectrum light 10 again, and irradiates the lens 7 with the spectrum light 10. The lens 7 condenses the spectrum light 10, and irradiates the end face of the output fiber 6 with the spectrum light 10.

The spectroscopic part 4 may have another spectroscopic element such as a prism in place of the diffraction grating 9.

(1.2) Output Fiber

Figure 2:
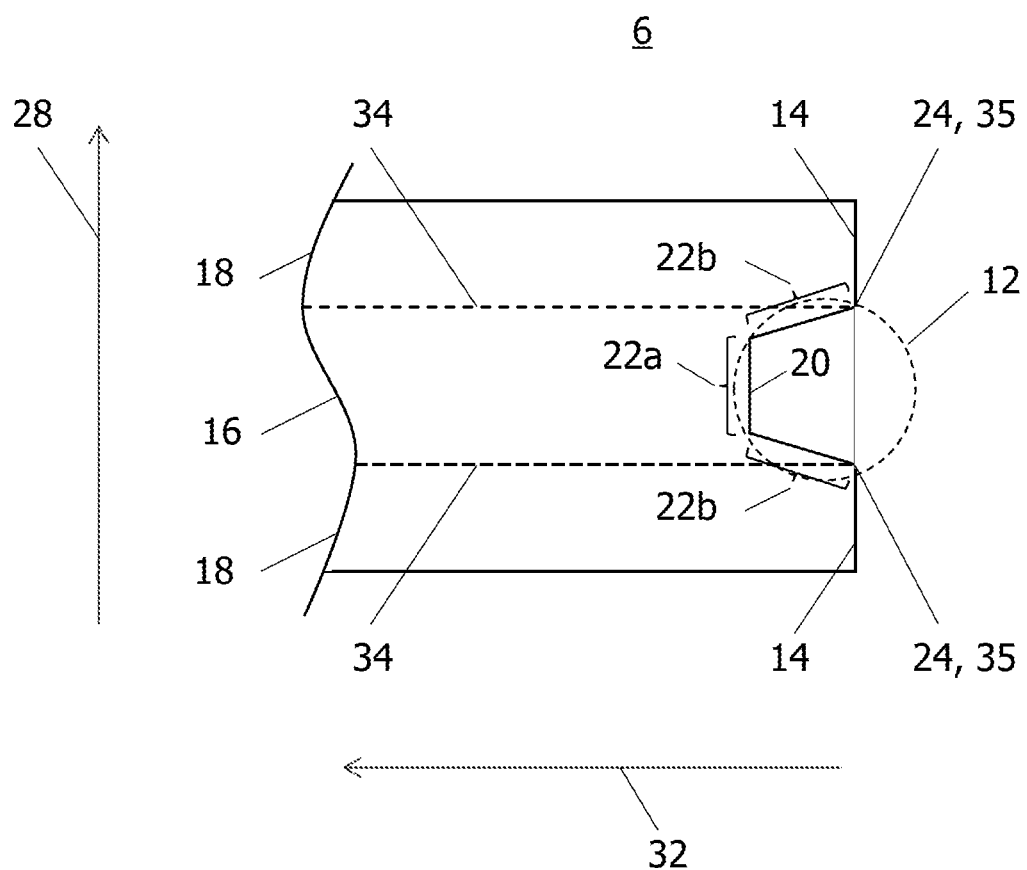
FIG. 2 is a view illustrating an example of the configuration of the optical filter in accordance with Embodiment 1.

FIG. 2 illustrates a vertical cross section of the output fiber 6 (cross section including the center axis of the output fiber 6). As illustrated in FIG. 2, the output fiber 6 includes an end face 14 having a recess 12. The output fiber 6 further includes a core 16 and a clad 18 that surrounds the core 16. The output fiber 6 is, for example, a single mode fiber.

Figure 3:
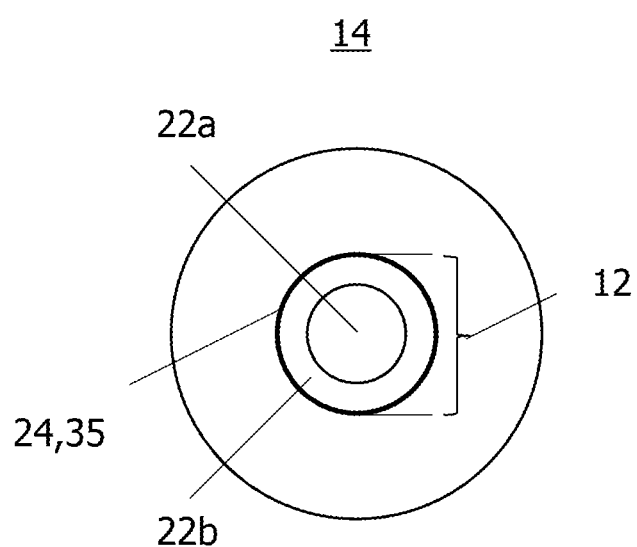
FIG. 3 is a view illustrating an example of the configuration of the optical filter in accordance with Embodiment 1.

FIG. 3 illustrates the end face 14 of the output fiber 6. The core 16 has a first face 22*a* that is in contact with a bottom 20 of the recess 12 (see FIG. 2) (see FIGS. 2 and 3). The core 16 further has a second face 22*b* sandwiched between the first face 22*a* and a circumferential end 24 of the recess 12. The second face 22*b* is inclined with respect to a transverse direction 28 of the core 16 (see FIG. 2, the direction that is perpendicular to the center axis of the core 16). As illustrated in FIG. 4, the recess 12 is irradiated with the spectrum light 10.

Figure 5:
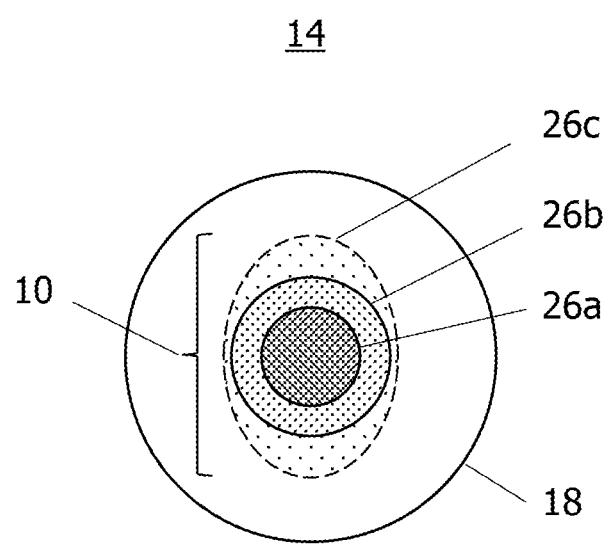
FIG. 5 is a view illustrating an example of spectrum light projected onto a recess.

FIG. 5 is a view illustrating an example of the spectrum light 10 projected onto the recess 12. The second face 22*b* (see FIG. 3) is inclined with respect to the transverse direction 28 of the core 16 such that a second portion 26*b* of the projected spectrum light 10 (see FIG. 5), which is incident from the second face 22*b* onto the core 16, is emitted to the clad 18.

Figure 6:
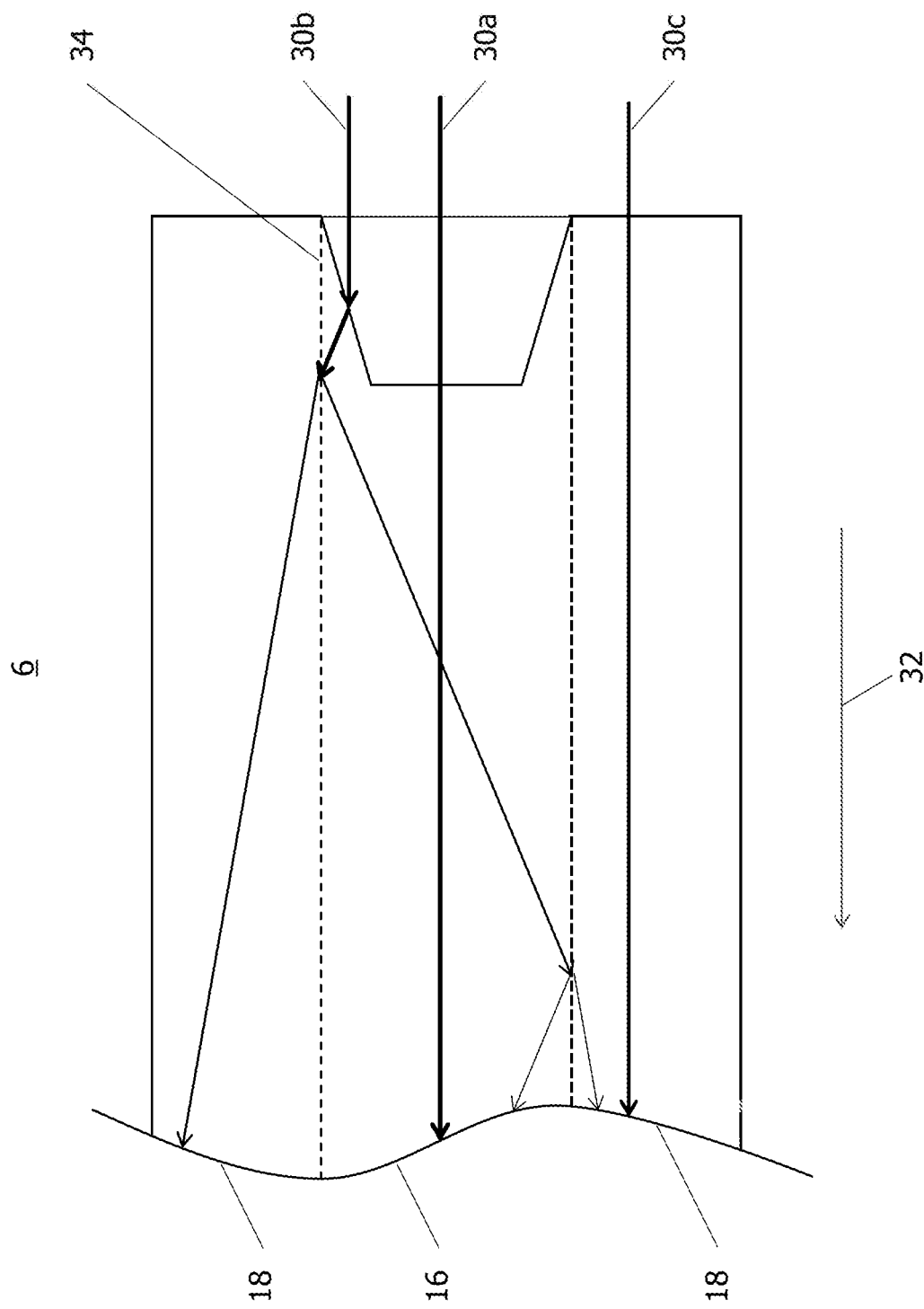
FIG. 6 is a view illustrating an optical path of the spectrum light in an output fiber.

FIG. 6 is a view illustrating an optical path of the spectrum light 10 in the output fiber 6. FIG. 6 illustrates a first light beam 30*a* that travels the center of the spectrum light 10 and a second light beam 30*b* that travels a position shifted from the center. FIG. 6 further illustrates a third light beam 30*c* that travels on the outermost side of the spectrum light 10.

The first light beam 30*a* illustrates a course of a portion 26*a* (see FIG. 5; hereinafter referred to as first portion or spectrum center portion) of the spectrum light 10 (see FIG. 5), which is incident from the first face 22*a* (see FIG. 2) onto the core 16. In the example illustrated in FIG. 6, a spectrum center portion 26*a* (see FIG. 5) represented by the first light beam 30*a* travels in a longitudinal direction 32 of the output fiber 6 (that is, direction that is parallel to an optical axis of the output fiber 6). The spectrum center portion 26*a* may travel in the direction that is inclined with respect to the longitudinal direction 32 to a certain extent. In this case, the spectrum center portion 26*a* is totally reflected on a boundary face 34 between the core 16 and the clad 18 (see FIG. 6). That is, the spectrum center portion 26*a* travels in the core 16.

The second light beam 30*b* illustrates a course of the second portion 26*b* of the spectrum light 10 (see FIG. 5) (hereinafter referred to as spectrum end portion), which is incident from the second face 22*b* (see FIG. 2) onto the core 16. As illustrated by the second light beam 30*b*, a portion of a spectrum end portion 26*b* refracts on the boundary face 34 between the core 16 and the clad 18, and is emitted to the clad 18. This is due to that the course of the spectrum end portion 26*b* is largely refracted on the side of the clad 18 by the second face 22*b*. The range of the inclination angle of the second face 22*b* will be described later.

The other portion of the spectrum end portion 26*b* is reflected on the boundary face 34. The portion reflected on the boundary face 34 is refracted and reflected on the opposite boundary face 34. The spectrum end portion 26*b* is gradually emitted to the clad 18 while being repeatedly refracted and reflected on the boundary face 34.

The third light beam 30*c* illustrates a course of a portion 26*c* of the spectrum light 10 (see FIG. 5) (hereinafter referred to as spectrum outermost portion), which is directly incident upon the clad 18. As represented by the third light beam 30*c*, the spectrum outermost portion 26*c* travels in the clad 18, and disappears soon. As a result, the first portion 26*a* of the spectrum light 10, which is incident from the first face 22*a* (see FIG. 2) onto the core 16 is outputted from the output fiber 6.

In the example illustrated in FIG. 6, the spectrum outermost portion 26*c* represented by the third light beam 30*c* travels in the longitudinal direction 32 of the output fiber 6. However, the spectrum outermost portion 26*c* may travel while inclining toward the core 16 to some extent. In this case, a part of the spectrum outermost portion 26*c* is incident onto the core 16 and however, the amount of the incident light is small (for example, one-a few hundredth).

Accordingly, the portion of the spectrum light 10, which is outputted from the optical filter 2, is only the spectrum center portion 26*a* projected onto the first face 22*a* (that is, the bottom 20 of the recess 12).

(Transmission Characteristic)

Figure 7:
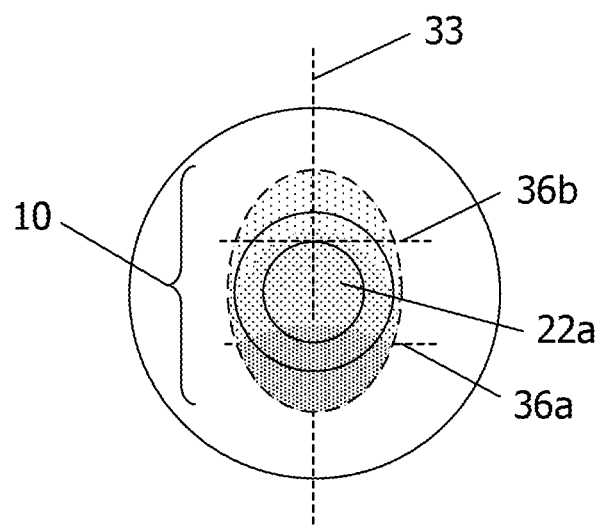
FIG. 7 is a view for describing an example of the spectrum light on an end face of the output fiber.

FIG. 7 is a view illustrating an example of the spectrum light 10 on the end face 14 of the output fiber 6.

As illustrated in FIG. 7, the spectrum light 10 projected onto the recess 12 extends along one axis 33 (hereinafter referred to as wavelength axis) on the end face 14. The wavelength of the spectrum light 10 gradually increases from one end (for example, lower end) toward the other end (for example, upper end) of the wavelength axis 33. The wavelength of the spectrum light 10 is fixed on the axis (hereinafter referred to as spectrum axis) that is perpendicular to the wavelength axis 33. That is, the wavelength components of the spectrum light 10 are projected onto respective spectrum axes.

The wavelength of a spectrum axis 36*a* that is in contact with the lower end of the first face 22*a* is defined as $\lambda 1$. The wavelength of a spectrum axis 36*b* that is in contact with the upper end of the first face 22*a* is defined as $\lambda 2$ ($>1$). That is, the wavelength range of the spectrum center portion 26*a* is defined as $\lambda 1$ to $\lambda 2$ ($\lambda 1$ or more and $\lambda 2$ or less).

As described above, the spectrum center portion 26*a* is outputted from the optical filter 2 substantially as it is. Accordingly, the portion of the input light 8, which is outputted from the optical filter 2 is a portion having the wavelength in the range of $\lambda 1$ to $\lambda 2$. In other words, the optical filter 2 allows the portion having the wavelength in the range of $\lambda 1$ to $\lambda 2$ in the input light 8 to transmit.

Figure 8:
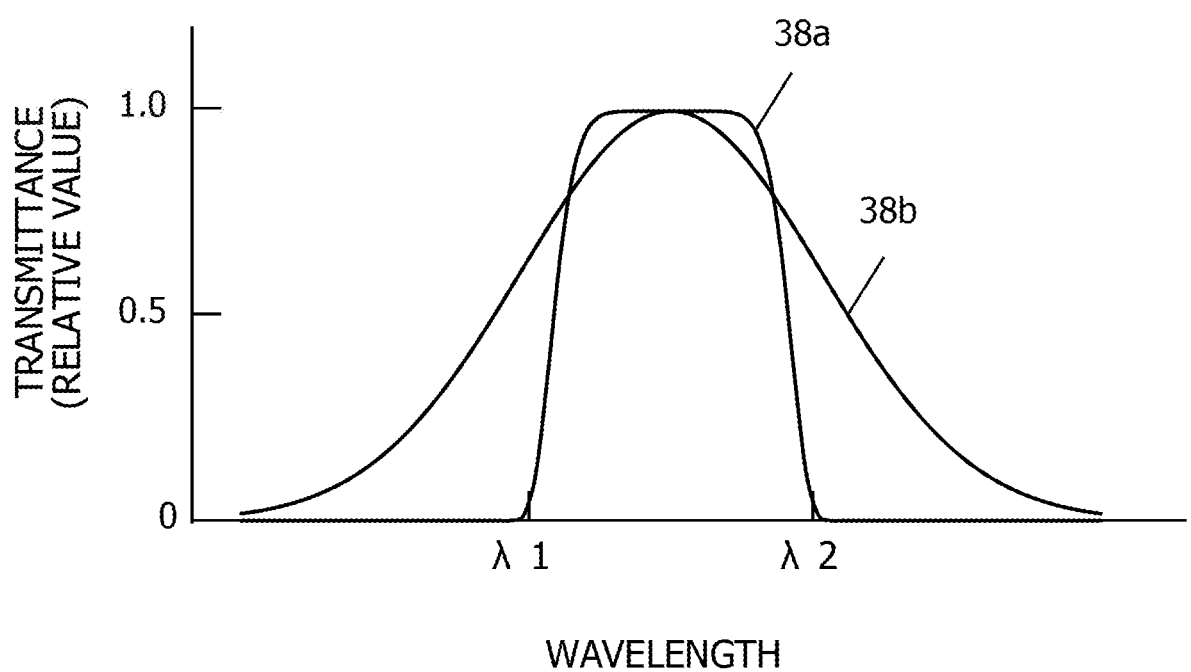
FIG. 8 is a view illustrating an example of a transmission characteristic of the optical filter.

FIG. 8 is a view illustrating an example of a transmission characteristic 38*a* of the optical filter 2. The horizontal axis (linear scale) indicates wavelength. The vertical axis (linear scale) indicates transmittance. Numeric values described along the vertical axis are relative values of the transmittance T ($=T/T_{max}$, $T_{max}$ is a maximum value of T).

FIG. 8 also illustrates a transmission characteristic 38*b* of a filter other than the optical filter 2. The transmission characteristic 38*b* will be described later.

As described above, the optical filter 2 outputs substantially only the spectrum center portion 26*a*. As a result, the transmission characteristic 38*a* is almost fixed in the range between $\lambda 1$ and $\lambda 2$, and suddenly decreases on the both sides of this range. Accordingly, the optical filter 2 in accordance with Embodiment 1 may have a filtering characteristic that the transmittance is substantially flat within a pass band (for example, 1 dB band) and suddenly decreases on the both sides of the pass band.

The filtering characteristic of the optical filter 2 depends on the state of the spectrum light 10 projected onto the input end (that is, the end face 14) of the output fiber 6, and the structure of the output fiber 6. Here, examples of the filtering characteristic of the optical filter 2 include the width of the pass band, and transmittance outside the pass band. Examples of the state of the spectrum light 10 include size, position, and shape of the spectrum light 10 on the end face 14. Examples of the structure of the output fiber 6 include the core diameter and the relative refractive-index difference of the output fiber 6, and the structure of the recess 12.

The optical filter 2 in accordance with Embodiment 1 is configured such that the spectrum light 10 is suitably condensed on the end face 14 according the desired filtering characteristic and the structure of the output fiber 6. The spectrum light 10 may be suitably condensed by suitably selecting the lens 7.

(Inclination Angle of Second Face)

Figure 9:
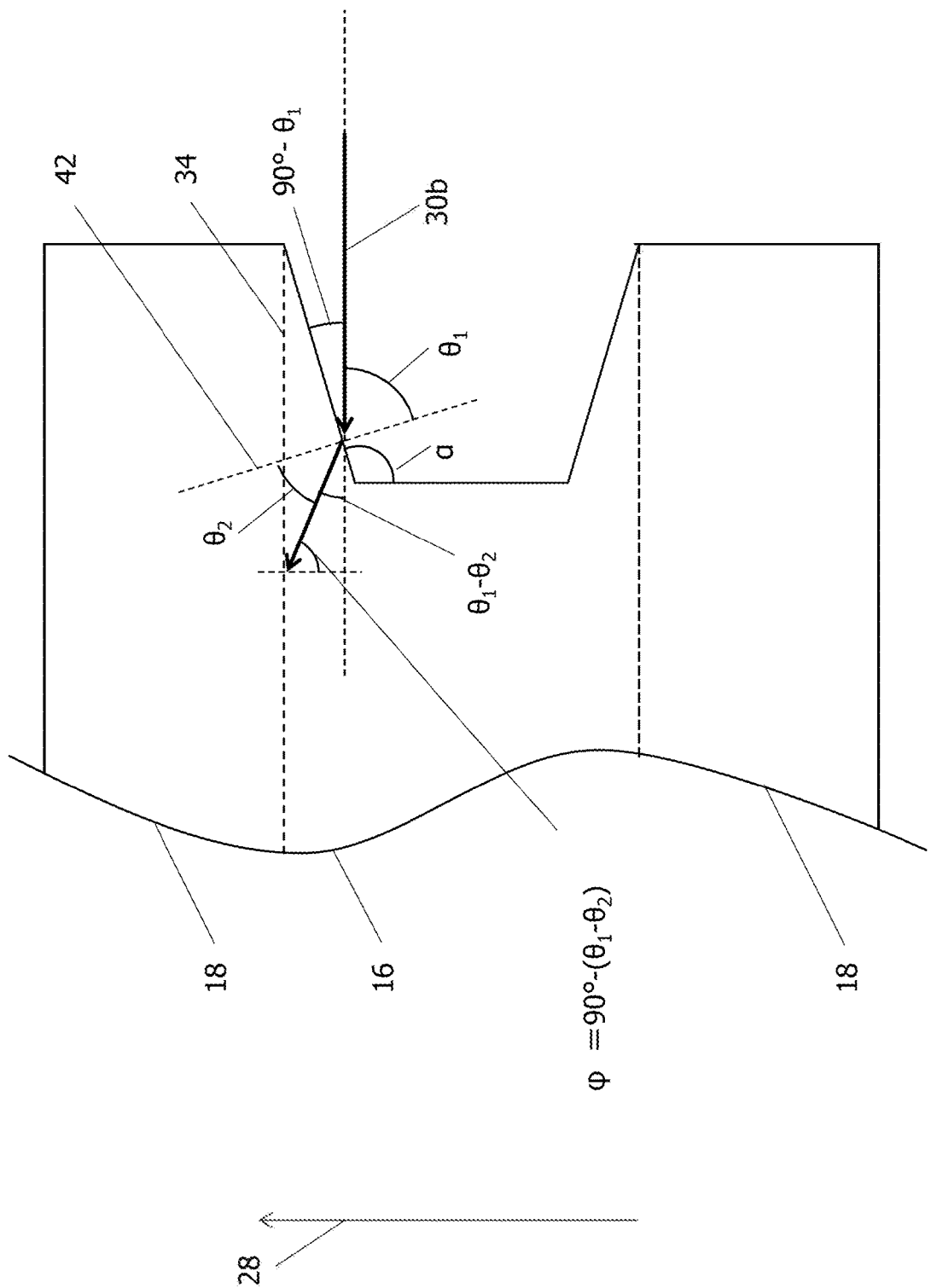
FIG. 9 is a view for describing conditions for emission of a spectrum end portion to a clad.

FIG. 9 is a view for describing a condition for emitting the spectrum end portion 26b to the clad 18 (that is, a condition that is not totally reflected on the boundary face 34). FIG. 9 illustrates a normal line 42 of the second face 22b.

As described above, the second light beam 30b indicates the course of the spectrum end portion 26b (see FIG. 5). An incidence angle (incident angle) of the second light beam 30b onto the second face 22b (see FIG. 2) is defined as $\theta_1$. A refraction angle (refractive angle) of the second light beam 30b onto the second face 22b is defined as $\theta_2$. Then, as apparent from FIG. 9, an incidence angle φ of the second light beam 30b onto the boundary face 34 is 90 degrees−($\theta_1-\theta_2$).

When the incidence angle φ on the boundary face 34 is smaller than a critical angle $\theta_c$ (critical angle), the second light beam 30b refracts on the boundary face 34, and is emitted to the clad 18. That is, when 90 degrees−($\theta_1-\theta_2$) is smaller than $\theta_c$, the second light beam 30b is emitted to the clad 18.

The critical angle $\theta_c$ is expressed by a formula (1).

$$\theta_c = \sin^{-1}(n_2/n_1) \quad (1)$$

Here, $n_1$ indicates the refractive index of the core 16. $n_2$ indicates the refractive index of the clad 18.

$\theta_1$ and $\theta_2$ satisfy the relation of a formula (2) according to the Snell's law.

$$n_0 \cdot \sin\theta_1 = n_1 \cdot \sin\theta_2 \quad (2)$$

Here, $n_0$ indicates the refractive index of a space outside the output fiber 6 (for example, 1). $n_1$ indicates the refractive index of the core 16.

An angle α between the transverse direction 28 of the core 16 and the second face 22b (that is, the inclination angle of the second face 22b) is expressed by a formula (3).

$$\alpha = 90° + (90° - \theta_1) = 180° - \theta_1 \quad (3)$$

Based on a below-mentioned formula (4) and the formulas (1) to (3), an allowable range of the inclination angle (that is, α) of the second face 22b may be readily found.

$$\varphi = 90° - (\theta_1 - \theta_2) < \theta_c \quad (4)$$

The formula (4) is the condition for emitting the second light beam 30b to the clad 18.

For example, $\theta_1$ and $\theta_2$ that satisfy the formulas (2) and (3) are derived while changing the value of α. If the derived $\theta_1$ and $\theta_2$ satisfy the formula (4), the value of α corresponding to the derived $\theta_1$ and $\theta_2$ is allowed as the inclination angle of the second face 22b.

(2) Usage Example

The optical filter 2 may be used, for example, to remove an amplified spontaneous emission (ASE) of an optical amplifier from an output of the optical amplifier. Specifically, first, the input fiber 5 (see FIG. 4) is connected to an output port of the optical amplifier (not illustrated). After that, the optical amplifier is activated. Then, light including the ASE is outputted from the optical amplifier. Output light 47 is outputted from the optical filter 2 receiving an output 44 of the optical amplifier (see FIG. 4). The output light 47 hardly include a portion of the output 44 of the optical amplifier (almost the range between λ1 and λ2) beyond the pass band of the optical filter 2. When the pass band of the optical filter 2 is smaller than the wavelength range of the ASE of the optical amplifier, the ASE of the optical amplifier is removed by the optical filter 2. Since the wavelength range of the ASE is large, the pass band of the optical filter 2 may be readily made smaller than the wavelength range of the ASE.

A process of removing the ASE from the output 44 of the optical amplifier will be described below.

The core size of the input fiber 5 and the output fiber 6 is several times larger than the wavelength of the input light 8 of the optical filter 2 (for example, the output 44 of the optical amplifier). Accordingly, behavior of light in the optical filter 2 (specifically, the input light 8 and the spectrum light 10) may be correctly recognized by handling the light as wave motion.

Thus, the behavior of light in the optical filter 2 will be described below based on a beam profile. The beam profile is the light intensity distribution on a face that is perpendicular to the light travelling direction (that is, beam cross section). The beam profile is information acquired by handling light as wave motion.

Figure 10:
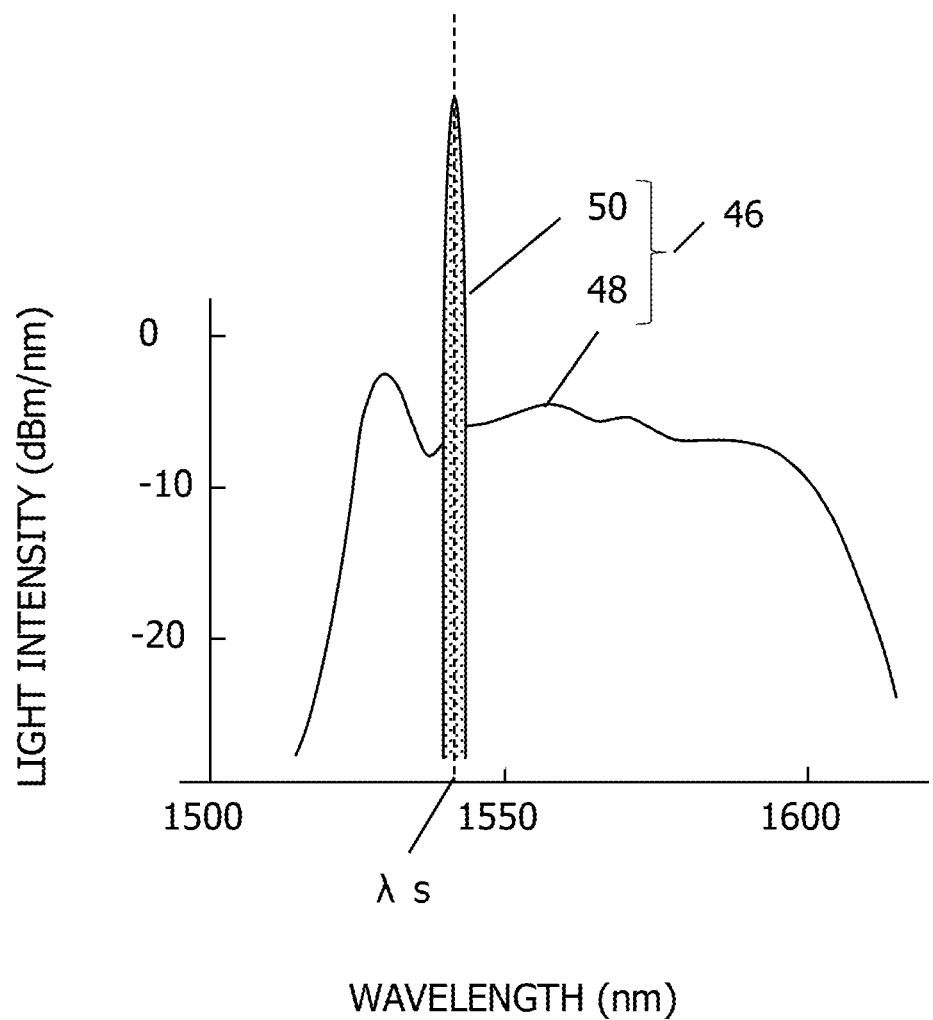
FIG. 10 is a view illustrating an example of an output of an EDFA.

FIG. 10 is a view illustrating an example of an output of the erbium doped fiber amplifier (EDFA). A horizontal axis indicates wavelength. A vertical axis indicates light intensity. FIG. 10 illustrates a spectrum 46 of output light from the EDFA. The spectrum 46 includes a spectrum 48 of the ASE of the EDFA and a spectrum 50 of signal light amplified by the EDFA (for example, laser light).

Here, it is assumed that light having the spectrum 46 in FIG. 10 is inputted as the input light 8 (see FIG. 4) to the optical filter 2. Further, it is assumed that a center wavelength Xs of the signal light falls within the pass band of the optical filter 2. Further, the input fiber 5 and the output fiber 6 each are assumed to be a single mode fiber. The center wavelength of light refers to a wavelength located at the center of the 3 dB band of light.

(Input Light in Input Fiber 5)

Figure 11A:
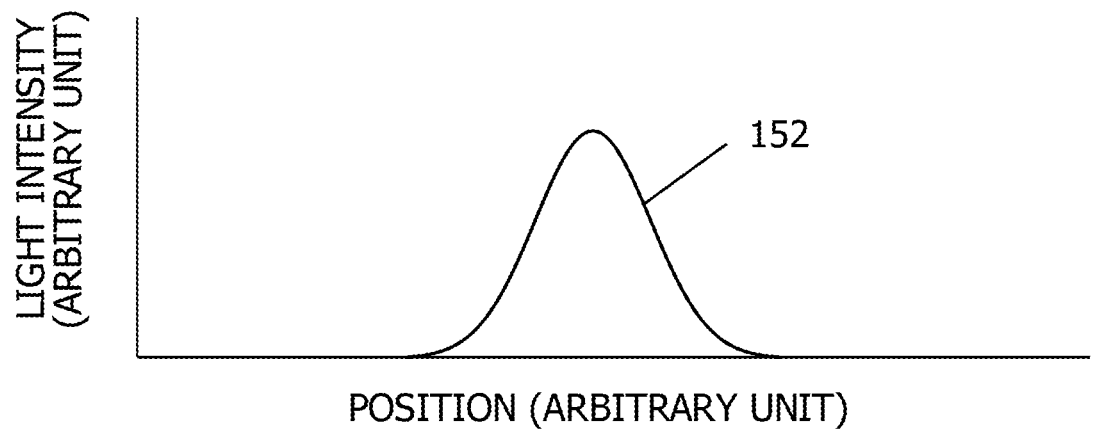
FIGS. 11A and 11B are views for describing an example of input light travelling in an input fiber.
Figure 11B:
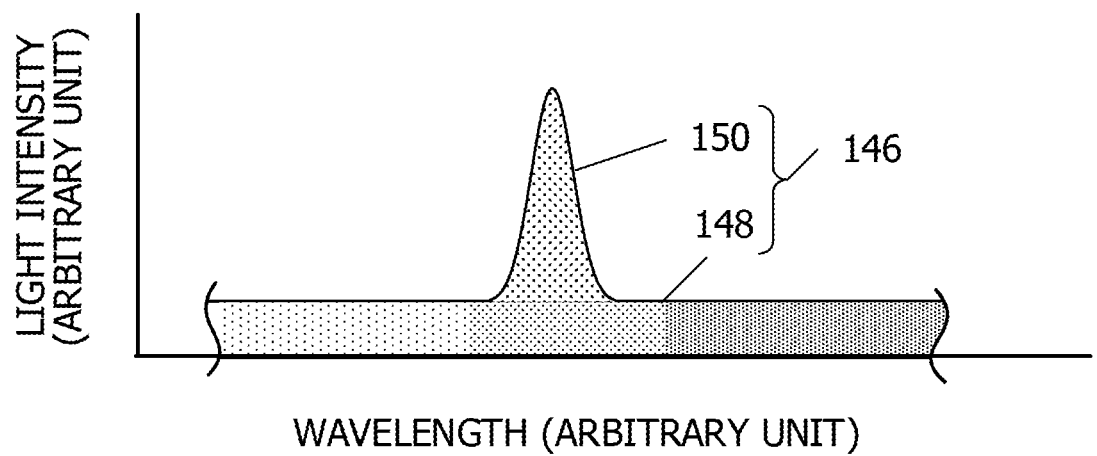

FIGS. 11A and 11B are views for describing an example of the input light 8 travelling in the input fiber 5 (see FIG. 4). The input light 8 is the output 44 of the optical amplifier.

FIG. 11A illustrates a beam profile 152 of the input light 8 travelling in the input fiber 5 (this also applies to FIG. 12A described below). A horizontal axis (linear scale) indicates position coordinates. A vertical axis (linear scale) indicates light intensity (this also applies to FIG. 12A). Since the input fiber 5 is the single mode fiber, the beam profile 152 of the input light 8 travelling in the input fiber 5 is Gaussian as illustrated in FIG. 11A.

Figure 12A:
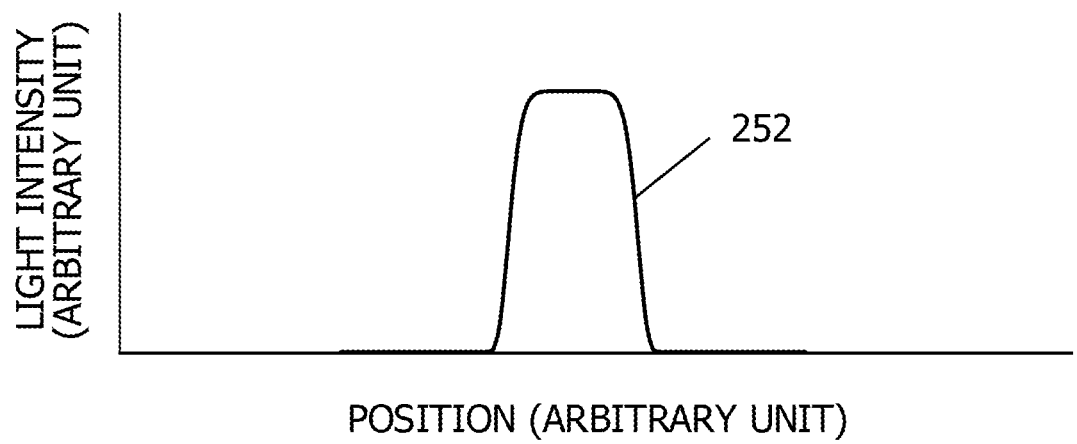
FIGS. 12A and 12B are views for describing an example of the input light immediately after emission from the input fiber.
Figure 12B:
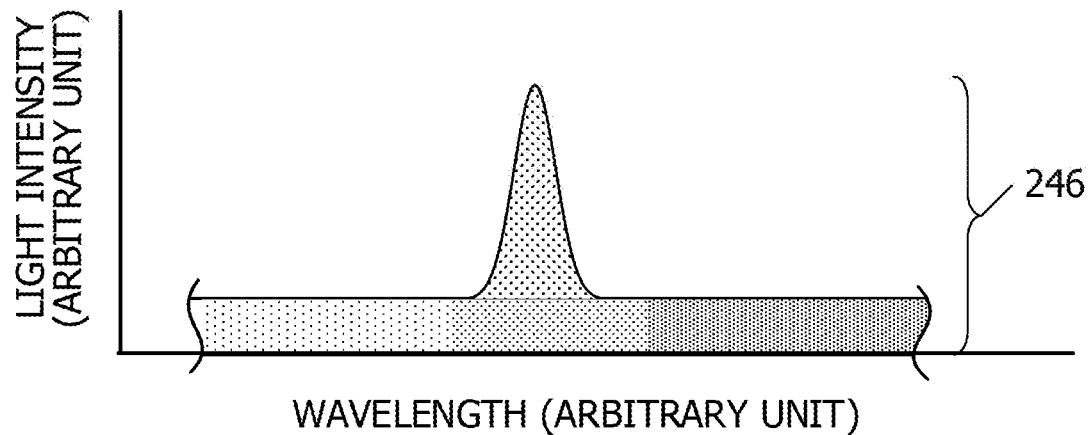

FIG. 11B illustrates a spectrum 146 of the input light 8 travelling in the input fiber 5 (this also applies to FIG. 12B). A horizontal axis (linear scale) indicates wavelength. A vertical axis (linear scale) indicates light intensity (this also applies to FIG. 12B).

The spectrum 146 of the input light 8 travelling in the input fiber 5 is substantially the same as the spectrum 46 (for example, see FIG. 10) of the output 44 of the optical amplifier (for example, EDFA). The spectrum 146 of the input light 8 includes a spectrum 148 of the ASE of the optical amplifier and a spectrum 150 of the signal light. The shape of the spectrum of the ASE is simplified in FIG. 11B (this also applies to FIG. 12B).

(Input Light Immediately After Emission of Input Fiber 5)

FIGS. 12A and 12B are views for describing an example of the input light 8 immediately after emission from the input fiber 5 (see FIG. 4).

The recess 112 (see FIG. 4) is formed on the end face of the input fiber 5. As illustrated in FIG. 12A, while the input light 8 passes through the recess 112, the beam profile of the input light 8 is converted from Gaussian into flat-top (for example, refer to Non-patent document 1).

As illustrated in FIG. 12B, a spectrum 246 of the input light 8 immediately after emission from the input fiber 5 is substantially the same as the spectrum 46 of the output 44 of the optical amplifier (or the spectrum 146 of the input fiber 5).

(Input Light in Free Space)

Figure 13A:
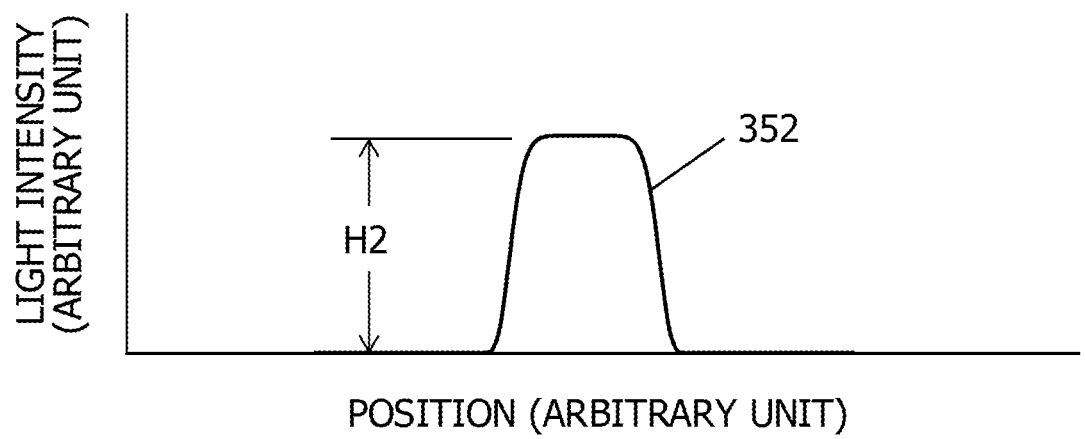
FIGS. 13A and 13B are views for describing an example of the input light travelling between the input fiber and the lens.
Figure 13B:
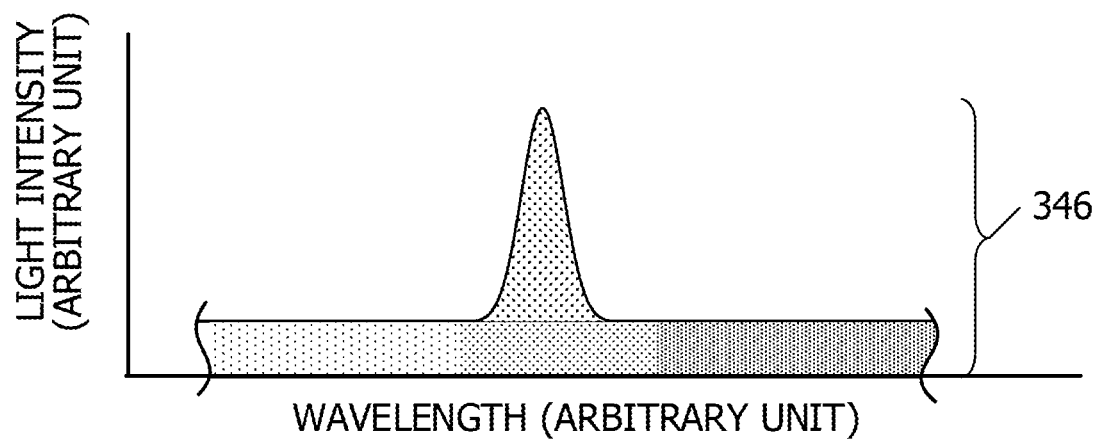

FIGS. 13A and 13B are views for describing an example of the input light 8 travelling between the input fiber 5 (see FIG. 4) and the lens 7.

As illustrated in FIG. 4, the input light 8 emitted from the input fiber 5 gradually spreads while travelling in the free space between the input fiber 5 and the lens 7. Accordingly, a beam profile 352 (see FIG. 13A) of the input light 8 between the input fiber 5 and the lens 7 is wider than a beam profile 252 of the input light 8 immediately after emission from the input fiber (see FIG. 12A).

The input light 8 passing through the free space between the input fiber 5 and the lens 7 is converted into collimated light by the lens 7. The beam profile of the input light 8 converted into collimated light hardly changes.

As illustrated in FIG. 13B, a spectrum 346 of the input light 8 between the input fiber 5 and the lens 7 is substantially the same as the spectrum 46 of the output 44 of the optical amplifier (or the spectrum 146 in the input fiber 5). This also applies to a spectrum of the input light 8 between the lens 7 and the diffraction grating 9.

(Spectrum Light on Mirror)

Figure 14A:
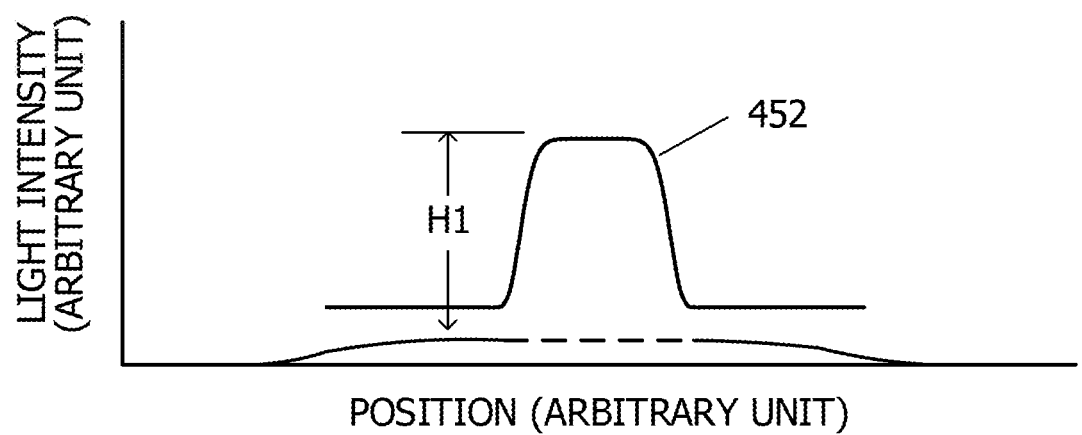
FIGS. 14A and 14B are views for describing an example of the spectrum light on the mirror.
Figure 14B:
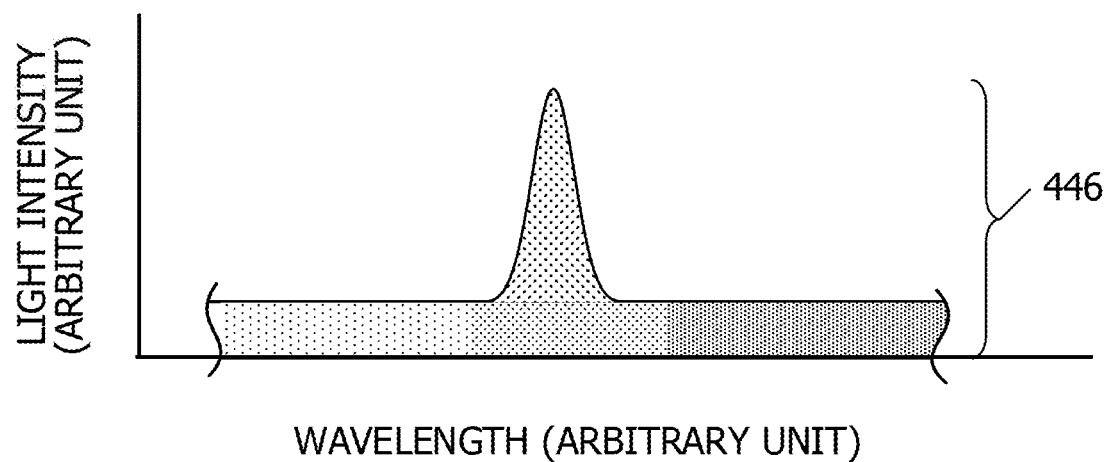

FIGS. 14A and 14B views for describing an example of the spectrum light 10 on the mirror 11 (see FIG. 4) (that is, the dispersed input light 8).

The input light 8 converted into the collimated light beam is projected onto the diffraction grating 9. The diffraction grating 9 diffracts wavelength components of the input light 8 in different directions according to the wavelengths. The diffracted input light 8 (that is, spectrum light 10) is projected onto the mirror 11. Due to a difference in diffraction angle (that is, a difference between the wavelength components in the travelling direction), a beam profile 452 of the spectrum light 10 on the mirror 11 is wider than the beam profile 352 of the input light 8 between the lens 7 and the diffraction grating 9 (see FIG. 14A).

The beam profile 452 of the spectrum light 10 has a two-layered structure. A lower layered portion (wider portion) is the beam profile of the ASE. As illustrated in FIG. 11B, the spectrum 148 of the ASE is wide. Accordingly, a difference between a maximum value and a minimum value of the diffraction angle of the ASE is large. Accordingly, the lower layered portion that is the beam profile of the ASE is wider than the beam profile 352 of the input light 8 between the lens 7 and the diffraction grating 9 (see FIG. 13A).

An upper layered portion (narrower portion) of the beam profile 452 is the beam profile of the signal light. As illustrated in FIG. 11B, the spectrum 150 of the signal light is narrow. Thus, a difference between a maximum value and a minimum value of the diffraction angle of the signal light is small. Accordingly, the upper layered portion that is the beam profile of the signal light is substantially the same as the beam profile 352 of the input light 8 between the lens 7 and the diffraction grating 9.

However, a peak value H1 of the upper layered portion is lower than a peak value H2 of the beam profile 352 of the input light 8 between the lens 7 and the diffraction grating 9. The upper layered portion of the beam profile 452 includes no ASE. On the contrary, the beam profile 352 of the input light 8 between the lens 7 and the diffraction grating 9 includes the ASE. For this reason, the peak value H1 of the upper layered portion is lower than the peak value H2 of the beam profile 352 of the input light 8 between the lens 7 and the diffraction grating 9.

As illustrated in FIG. 14B, a spectrum 446 of the spectrum light 10 on the mirror 11 is substantially the same as the spectrum 46 of the output 44 of the optical amplifier (or the spectrum 146 in the input fiber 5).

(Spectrum Light on End Face of Output Fiber)

Figure 15A:
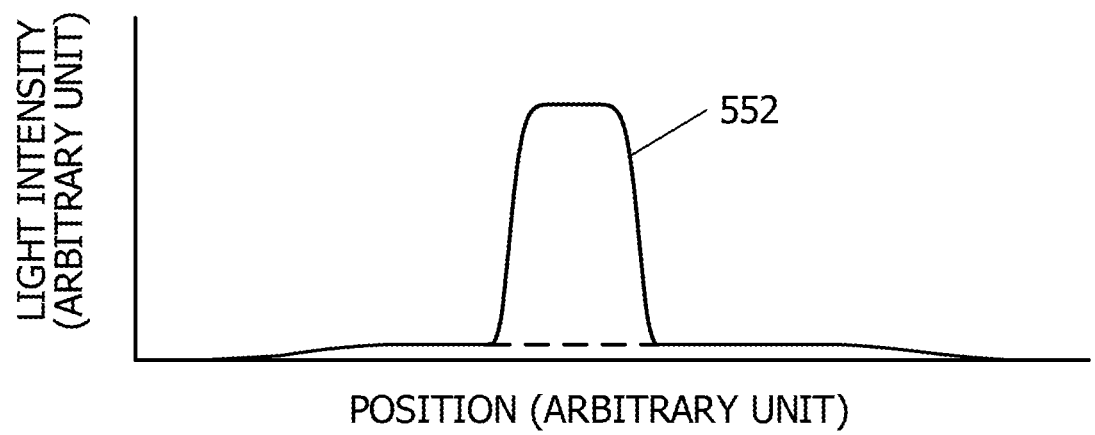
FIGS. 15A and 15B are views for describing an example of the spectrum light on the end face of the output fiber.
Figure 15B:
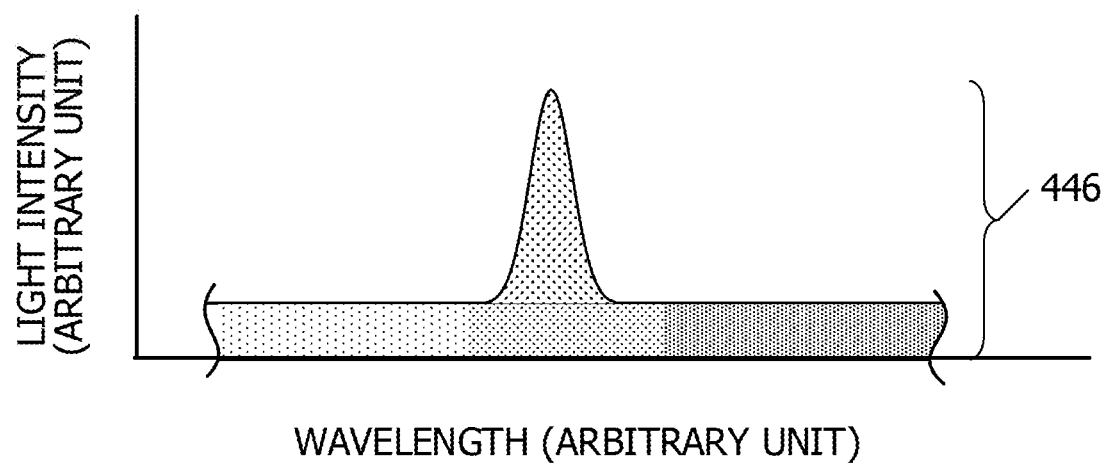

FIGS. 15A and 15B are views for describing an example of the spectrum light 10 on the end face of the output fiber 6 (see FIG. 4).

The mirror 11 reflects the spectrum light 10. The reflected spectrum light 10 is diffracted by the diffraction grating 9 again and then, is projected onto the end face of the output fiber 6 via the lens 7. As a result of re-diffraction, a lower layered portion (that is, the beam profile of the ASE) of a beam profile 552 of the spectrum light 10 is further extended as illustrated in FIG. 15A.

On the contrary, the upper layered portion of the beam profile 552 (that is, the beam profile of the signal light) hardly changes as a result of re-diffraction. The re-diffracted signal light is condensed by the lens 7. As a result, the width of the upper layered portion on the end face of the output fiber 6 is substantially the same as the width of the profile of the input light 8 immediately after emission from the input fiber 5 (see FIG. 12A).

As illustrated in FIG. 15B, a spectrum 546 of the spectrum light 10 on the end face of the output fiber 6 is substantially the same as the spectrum 46 of the output 44 of the optical amplifier (or the spectrum 146 in the input fiber 5).

(Spectrum Light in Output Fiber)

Figure 16A:
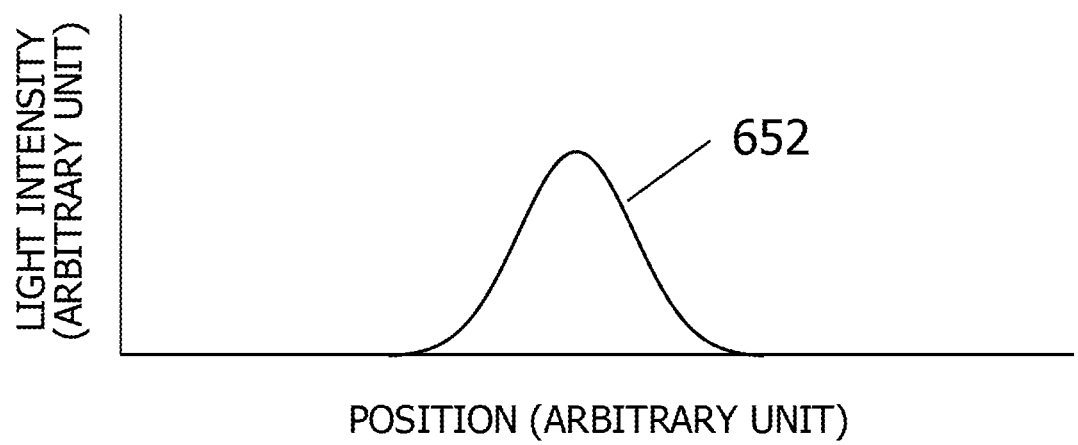
FIGS. 16A and 16B are views for describing an example of the spectrum light in the output fiber.
Figure 16B:
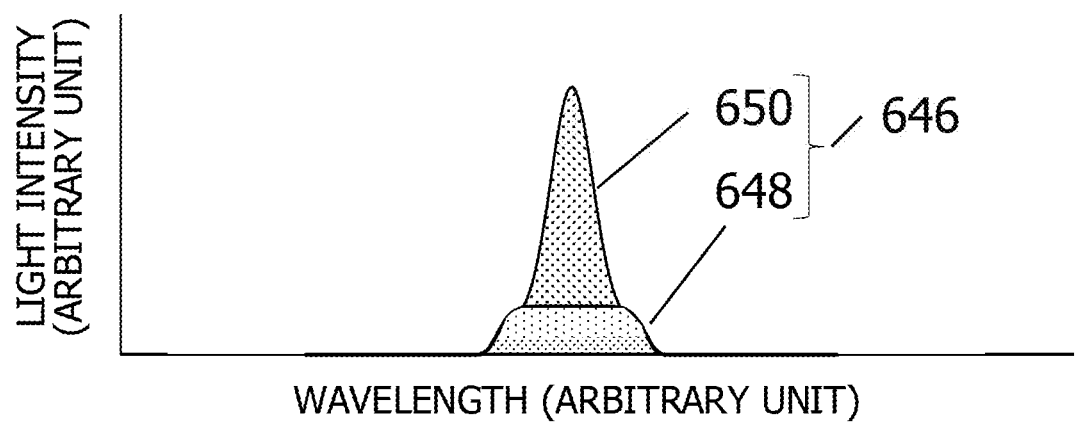

FIGS. 16A and 16B are views for describing an example of the spectrum light 10 in the output fiber 6 (see FIG. 4). FIGS. 16A and 16B illustrate the case where the upper layered portion of the beam profile 552 (see FIG. 15A) is projected onto the core of the output fiber 6.

According to the transmission characteristic 38a described with reference to FIG. 8, the spectrum light 10 incident onto the output fiber 6 is subjected to filtering (that is, filtered) in the vicinity of the end face of the output fiber 6. An unfiltered portion of the spectrum light 10 is gradually converted into an intrinsic mode of the output fiber 6. On the contrary, a filtered portion of the spectrum light 10 is emitted to the clad 18 and disappears. Accordingly, a beam profile 652 of the spectrum light 10 in the output fiber 6 is Gaussian as illustrated in FIG. 16A.

As described above, the spectrum light 10 is filtered in the vicinity of the end face of the output fiber 6. As a result, a spectrum 648 of the ASE in the output fiber 6 is largely narrower than the spectrum 148 of the ASE in the input fiber 5 (see FIG. 11B). That is, the ASE of the optical amplifier is substantially removed. On the contrary, a spectrum 650 of the signal light is substantially the same as the spectrum 150 of the signal light in the input fiber 5 (see FIG. 11B).

As described above, in the usage example in accordance with Embodiment 1, the ASE of the optical amplifier is substantially removed. On the contrary, the signal light is outputted substantially as it is.

(3) Production Method of Output Fiber

The output fiber 6 in accordance with Embodiment 1 (see FIG. 2) may be formed by etching an end face of an optical fiber having a germanium-doped core with an HF solution. The HF solution etches germanium-doped silica more rapidly than germanium-undoped silica.

Thus, the germanium-doped core is etched with the HF solution more rapidly than the germanium-undoped clad. As a result, as illustrated in FIG. 2, the recess 12 that is in contact with the core 16 is formed on the end face of the optical fiber. That is, the output fiber 6 in accordance with Embodiment 1 is formed. The input fiber 5 in accordance with Embodiment 1 may be formed in the same manner.

(4) Optical Filter Having Another Structure (4.1) Another Structure 1

FIG. 17 is a view illustrating an example of the configuration of an optical filter 202 that is different from the optical filter 2 in FIG. 1 in structure. The structure of the optical filter 202 is different from the structure of the optical filter 2 in FIG. 1 except that end faces of an input fiber 205 and an output fiber 206 are flat.

Since the end face of the output fiber 206 is flat, a spectrum light 210 projected onto the output fiber 206 is not filtered in the vicinity of the end face of the output fiber 206.

The spectrum light 210 projected onto the output fiber 206 is converted into the intrinsic mode while travelling in the output fiber 206. During the conversion, the spectrum light 210 is filtered (refer to below-mentioned "spectrum light in output fiber"). Accordingly, a filter characteristic of the optical filter 202 is different from the filter characteristic of the optical filter 2 in FIG. 1.

The transmission characteristic 38b in FIG. 8 is an example of the transmission characteristic of the optical filter 202 in FIG. 17. The transmission characteristic 38b is the Gaussian characteristic that the transmittance moderately decreases out of the pass band. On the contrary, the transmission characteristic 38a of the optical filter 2, which is described with reference to FIGS. 1 to 9, is the filtering characteristic that the transmittance suddenly decreases in the vicinity of the pass band. In many cases, the filtering characteristic that the transmittance suddenly decreases in the vicinity of the pass band is more preferable than the Gaussian characteristic (for example, refer to Embodiment 4).

A process in which the optical filter 202 filters the output 44 of the optical amplifier.

(Input Light in Input Fiber 205)

The beam profile of input light 208 travelling in the input fiber 205 is substantially the same as the beam profile 152 described with reference to FIG. 11A. A spectrum of the input light 208 travelling in the input fiber 205 is substantially the same as the spectrum 146 described with reference to FIG. 11B.

(Input Light Immediately After Emission from Input Fiber 205)

Figure 18A:
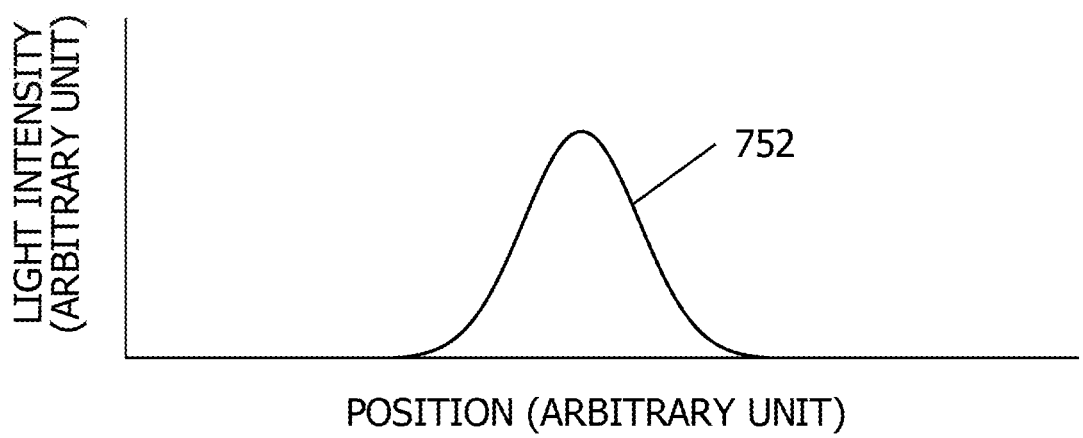
FIGS. 18A and 18B are views for describing an example of input light immediately after emission from the input fiber.
Figure 18B:
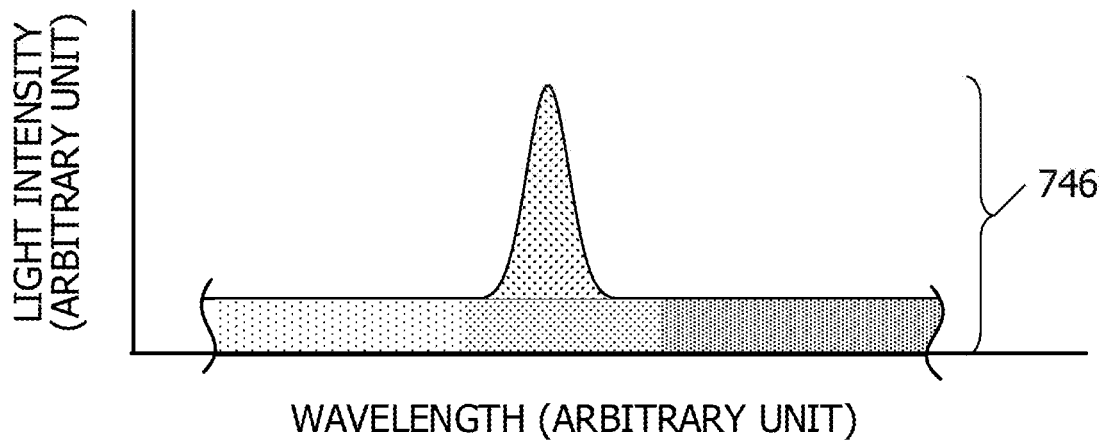

FIGS. 18A and 18B are views for describing an example of the input light 208 immediately after emission from the input fiber 205 (see FIG. 17).

Figure 19A:
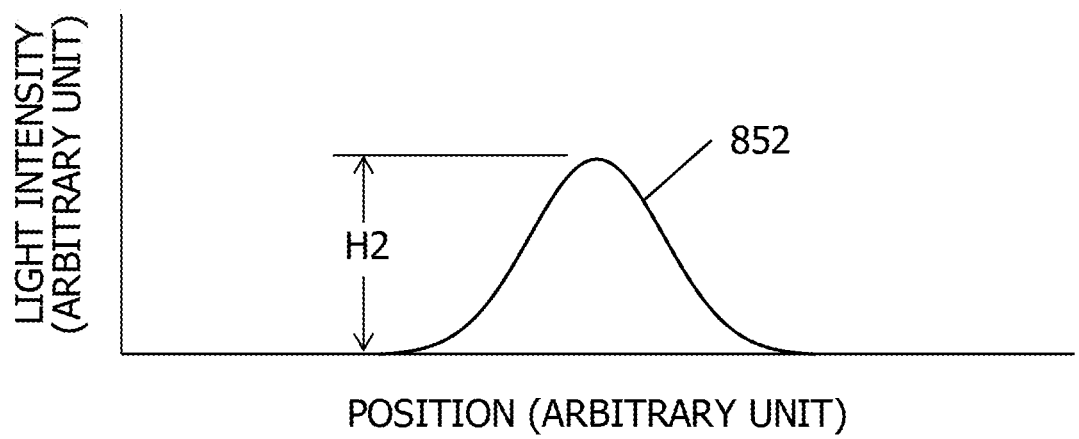
FIGS. 19A and 19B are views for describing an example of the input light traveling between the input fiber and the lens.

FIG. 18A illustrates a beam profile 752 of the input light 208 immediately after emission (this also applies to FIG. 19A). Since the end face of the input fiber 205 is flat, the beam profile 752 is substantially the same as the beam profile of the input light 208 in the input fiber 205. That is, the beam profile 752 is Gaussian.

Figure 19B:
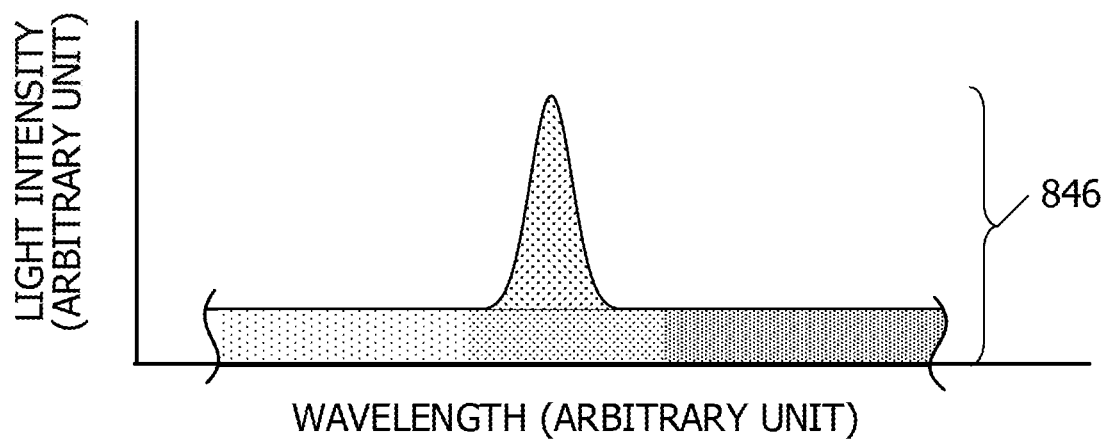

FIG. 18B illustrates a spectrum 746 of the input light 208 immediately after emission from the input fiber 205 (this also applies to FIG. 19B). The spectrum 746 is substantially the same as the spectrum of the input light 208. That is, the spectrum 746 of the input light 8 immediately after emission from the input fiber 205 is substantially the same as the spectrum 46 of the output 44 of the optical amplifier (see FIG. 10).

(Input Light in Free Space)

FIGS. 19A and 19B are views for describing an example of the input light 208 travelling between the input fiber 205 (see FIG. 17) and the lens 7.

As represented by a beam profile 852 in FIG. 19A, the input light 208 emitted from the input fiber 205 gradually extends while travelling in the free space. The input light 208 passing through the free space between the input fiber 205 and the lens 7 is converted into collimated light by the lens 7.

As illustrated in FIG. 19B, a spectrum 846 of the input light 208 between the input fiber 205 and the lens 7 is substantially the same as the spectrum 46 of the output 44 of the optical amplifier (or the spectrum in the input fiber). This also applies to the spectrum of the input light 208 between the lens 7 and the diffraction grating 9.

(Spectrum Light on Mirror)

Figure 20A:
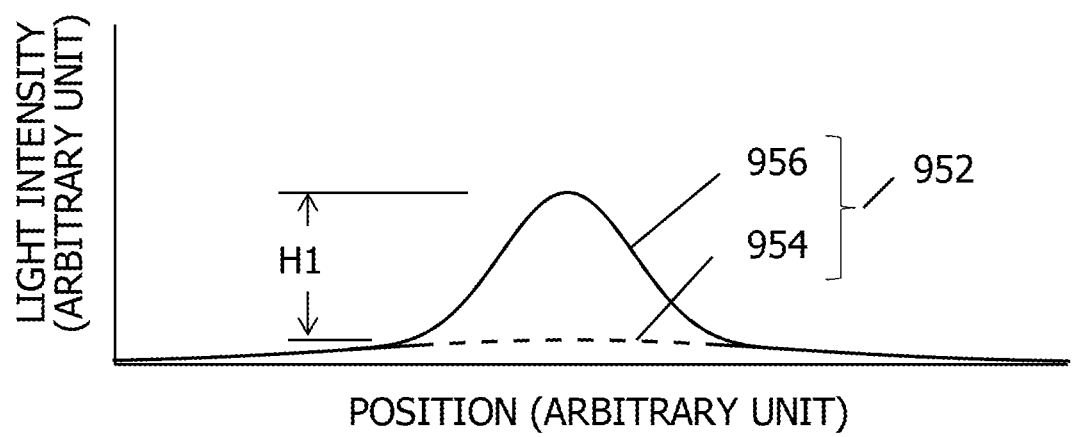
FIGS. 20A and 20B are views for describing an example of spectrum light on a mirror.
Figure 20B:
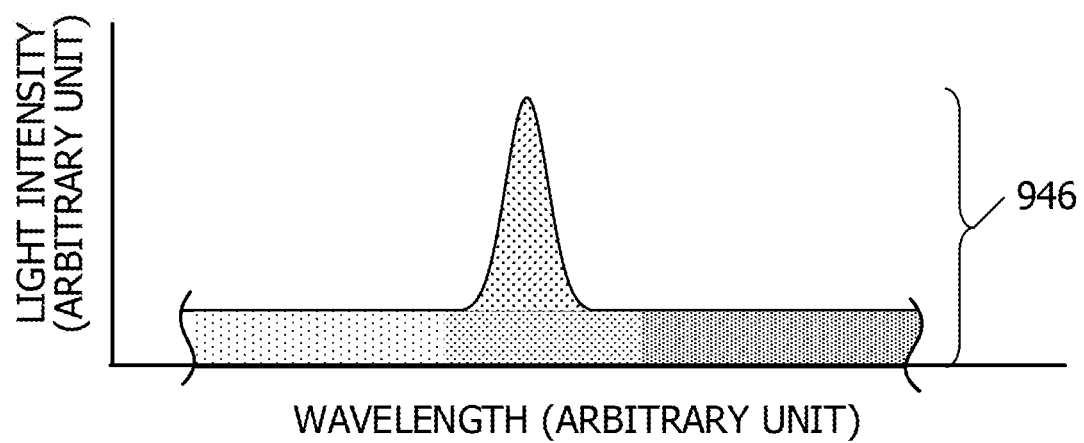

FIGS. 20A and 20B are views for describing an example of the spectrum light 210 (that is, the dispersed input light 208) on the mirror 11 (see FIG. 17).

The input light 208 converted into a collimated light beam is projected onto the diffraction grating 9. The diffraction grating 9 diffracts the projected input light 208. The diffracted input light 208 (that is, the spectrum light 210) is projected onto the mirror 11. Due to the spread of the diffraction angle, a beam profile 952 of the spectrum light 210 on the mirror 11 is wider than the beam profile 852 of the input light 208 between the lens 7 and the diffraction grating 9.

The beam profile 952 of the spectrum light 210 is a superposition of a wider portion 954 (lower portion) and a narrower portion 956 (upper portion). The wider portion 954 is the beam profile of the ASE. The narrower portion 956 is the beam profile of the signal light.

The narrower portion 956 is substantially the same as the beam profile 852 of the input light 208 between the lens 7 and the diffraction grating 9. However, the peak value H1 of the narrower portion 956 is lower than the peak value H2 of the beam profile 852 (see FIG. 19A) of the input light 208 between the lens 7 and the diffraction grating 9. This is due to that the narrower portion 956 includes no ASE.

As illustrated in FIG. 20B, a spectrum 946 of the spectrum light 210 on the mirror 11 is substantially the same as the spectrum 46 of the output 44 of the optical amplifier (or the spectrum in the input fiber).

(Spectrum Light on End Face of Output Fiber)

Figure 21A:
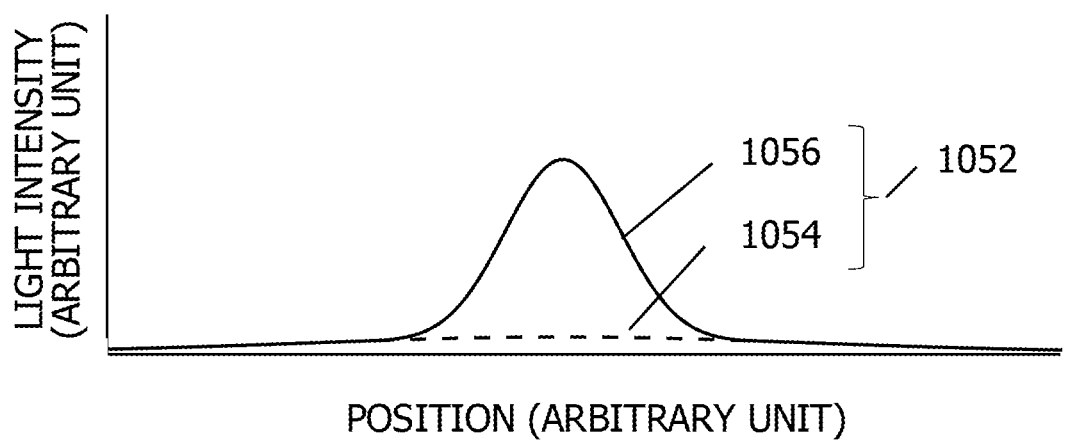
FIGS. 21A and 21B are views for describing an example of the spectrum light on the end face of the output fiber.
Figure 21B:
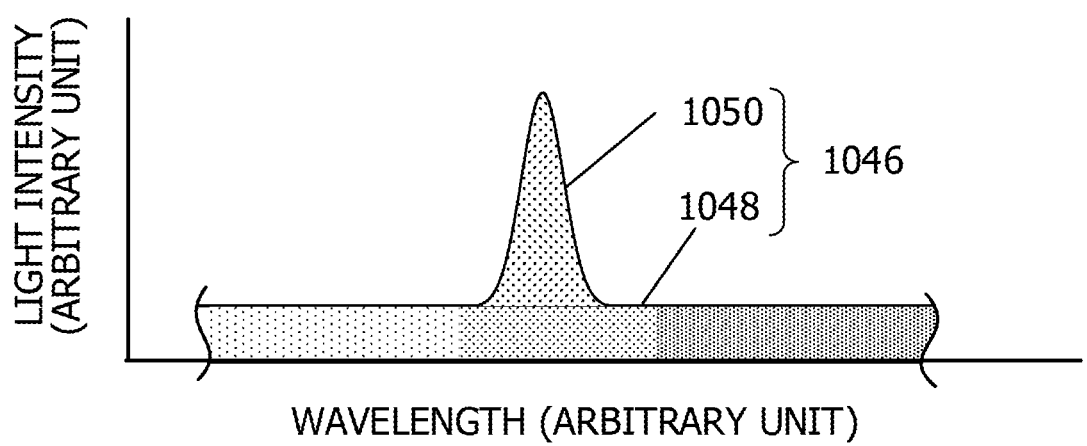

FIGS. 21A and 21B are views for describing an example of the spectrum light 210 on the end face of the output fiber 206 (see FIG. 17).

The spectrum light 210 reflected on the mirror 11 is diffracted by the diffraction grating 9 again. Then, the spectrum light 210 is projected onto the end face of the output fiber 206 via the lens 7. As a result of re-diffraction, a wider portion 1054 of a beam profile 1052 of the spectrum light 210 (that is, the beam profile of the ASE) becomes wider as illustrated in FIG. 21A.

On the contrary, a narrower portion 1056 of the beam profile 1052 (that is, the beam profile of the signal light) hardly changes as a result of re-diffraction. The re-diffracted signal light is condensed via the lens 7. As a result, on the end face of the output fiber 206, the width of the narrower portion 1056 becomes substantially the same as the beam profile 752 of the input light 208 immediately after emission from the input fiber 205 (see FIG. 18A).

As illustrated in FIG. 21B, a spectrum 1046 of the spectrum light 210 on the end face of the output fiber 206 is substantially the same as the spectrum 46 of the output 44 of the optical amplifier (or the spectrum in the input fiber).

(Spectrum Light in Output Fiber)

Figure 22A:
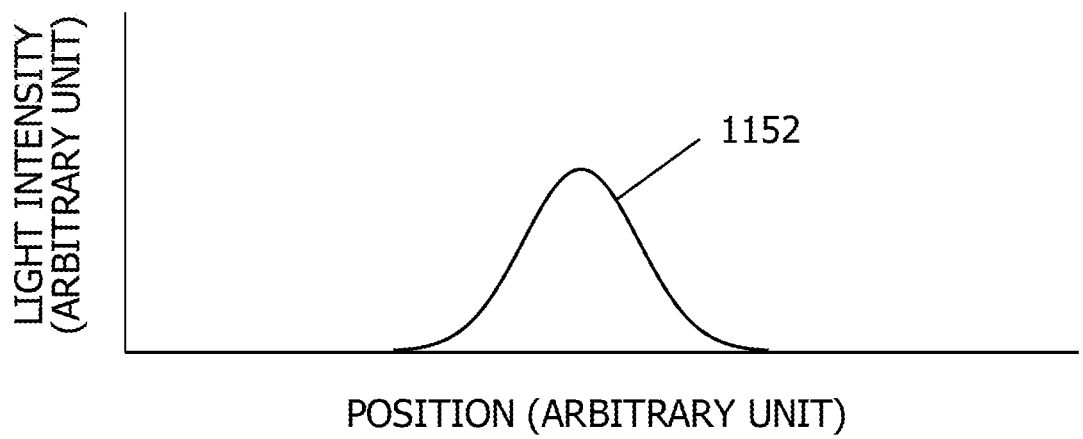
FIGS. 22A and 22B are views for describing an example of the spectrum light traveling in the output fiber.
Figure 22B:
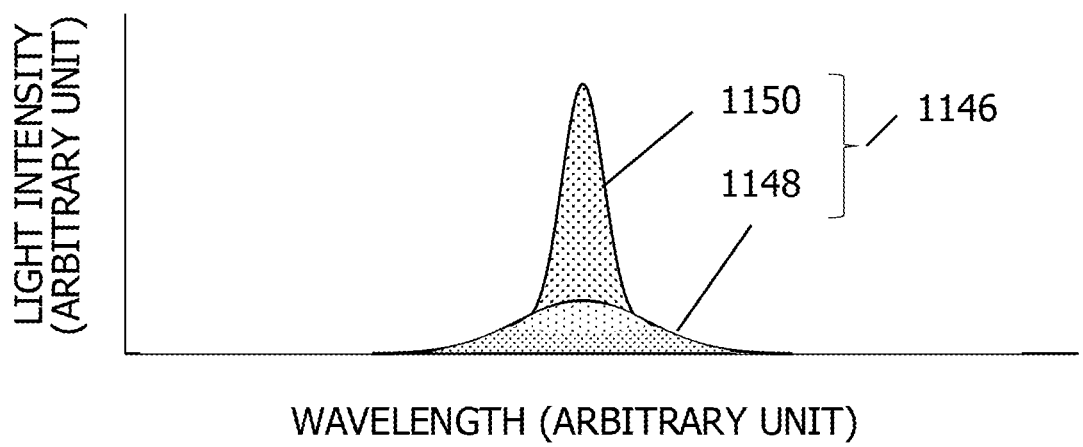

FIGS. 22A and 22B are views for describing an example of the spectrum light 210 travelling in the output fiber 206 (see FIG. 17). FIGS. 22A and 22B illustrate the case where the narrower portion 1056 (that is, the beam profile of the signal light) of the beam profile 1052 (see FIG. 21A) is projected onto the core of the output fiber 206.

The light incident to the optical fiber (hereinafter referred to as incident light) is converted into the intrinsic mode while being gradually emitted to the clad. The ratio at which the incident light is converted into the intrinsic mode (hereinafter referred to as conversion efficiency) is high in an area having a strong intrinsic mode and is low in an area having a weak intrinsic mode.

Accordingly, the spectrum light 210 in the output fiber 206 is shaped according to the conversion efficiency. In the example illustrated in FIG. 17, the output fiber 206 is a single mode fiber. Accordingly, the beam profile of the intrinsic mode in the output fiber 206 is substantially Gaussian. Thus, the conversion efficiency of the output fiber 206 is high at the core, and gradually lowers as it is away from the core.

The narrower portion 1056 (that is, the beam profile of the signal light) out of the beam profile 1052 on the end face of the output fiber 206 (see FIG. 21A) is projected onto the core. Thus, most of the narrower portion 1056 is converted into the intrinsic mode and propagates the core. On the contrary, most of a wider portion 1054 (that is, the beam profile of the ASE) out of the beam profile 1052 on the end face of the output fiber 206 (see FIG. 21A) is projected onto the clad. The portion projected onto the clad is not converted into the intrinsic mode. Most of the portion projected onto the core out of the wider portion 1054 is converted into the intrinsic mode. Such mode conversion forms a beam profile 1152 illustrated in FIG. 22A. The beam profile 1152 is Gaussian.

A spectrum 1146 in the output fiber 206 is a superposition of a spectrum 1148 of the ASE and a spectrum 1150 of the signal light.

As described above, most of the narrower portion 1056 (see FIG. 21A) that is the beam profile of the signal light incident to the output fiber 206 is converted into the intrinsic mode, and propagates the core. Accordingly, the spectrum 1150 of the signal light out of the spectrum 1146 is substantially the same as the spectrum immediately after incidence onto the output fiber 206. That is, the spectrum 1150 of the signal light in the output fiber 206 is substantially the same as a spectrum 1050 (see FIG. 21B) of the signal light on the end face of the output fiber 206.

On the contrary, only a central portion and a portion adjacent to the central portion, out of the wider portion 1054 (see FIG. 21A) that is the beam profile of the ASE incident to the output fiber 206, are converted into the intrinsic mode, and propagate the core. As a result, the spectrum 1148 of the ASE in the output fiber 206 becomes a spectrum including the central portion and a portion adjacent to the central portion of the spectrum of the ASE immediately after incidence onto the output fiber 206 (or a spectrum 1048 of the ASE on the end face of the output fiber 206).

As illustrated in FIG. 22B, the spectrum 1148 of the ASE in the output fiber 206 is Gaussian that moderately increases with an increase in wavelength, reaches a peak value, and moderately decreases from the peak value. That is, the output 44 of the optical amplifier is filtered, and a part of the ASE is removed. The optical filter 202 outputs the output 44 of the optical amplifier, from which a part of the ASE is removed, as output light 247.

Since the spectrum 1148 of the ASE in the output fiber 206 is Gaussian, the transmission characteristic 38b of the optical filter 202 in FIG. 17 is Gaussian as illustrated in FIG. 8. That is, the transmission characteristic of the optical filter 202 is not the filtering characteristic that the transmittance is flat within the pass band and suddenly decreases on the both sides of the pass band.

The optical filter 2 described with reference to FIGS. 1 to 9 is superior to the optical filter 202 described with reference to FIG. 17 in that it has the filtering characteristic that the transmittance is flat within the pass band and suddenly decreases on the both sides of the pass band.

The width (that is, band) of the transmission characteristic 38b based on the intrinsic mode of the output fiber 206 is larger than the width of the transmission characteristic 38a based on the recess on the end face of the output fiber. This is due to that the width of the intrinsic mode (that is, mode field diameter) is larger than the diameter of the bottom 20 of the recess 12.

(4.2) Another Structure 2

FIG. 23 is a view illustrating an example of the configuration of an optical filter 302 that is different from the optical filter 2 in FIG. 1 in configuration. The optical filter 302 has an input filter 305 and a first diffraction grating 309a. The optical filter 302 further has a first lens 307a, a slit plate 58, and a second lens 307b. The optical filter 302 further has a second diffraction grating 309b and an output fiber 306. The first lens 307a and the second lens 307b each are a lens of Fourier transform.

Input light 308 emitted from the input filter 305 is dispersed by the first diffraction grating 309a. The dispersed input light 308 is converted into collimated light by the first lens 307a. The slit plate 58 allows a portion of the input light 308 converted into the collimated light (hereinafter referred to as extracted light 60) to transmit and a remaining portion to block. The extracted light 60 is outputted via the second lens 307b, the second diffraction grating 309b, and the output fiber 306.

The extracted light 60 includes only the components that pass through the slit plate 58, out of wavelength components of the input light 308. For example, the slit plate 58 is a flat plate having a slit 62. The slit 62 transmit light as it is, and the portion other than the slit 62 of the slit plate 58 blocks light substantially completely. Accordingly, the transmittance characteristic of the optical filter 302 is the filtering characteristic that the transmittance is flat within the pass band and suddenly decreases on the both sides of the pass band. However, the optical filter 302 has a problem that the number of parts is large and thus, downsizing is difficult.

On the contrary, the optical filter 2 described with reference to FIGS. 1 to 9 advantageously has a small number of parts, facilitating miniaturization. In particular, the optical filter 2 described with reference to FIGS. 1 to 9 is superior to the optical filter 302 described with reference to FIG. 23 in that the slit plate 58 is unnecessary. Accordingly, the optical filter 2 described with reference to FIGS. 1 to 9 may be readily incorporated into another device such as a transmission device.

(5) Modification Example

Figure 24:
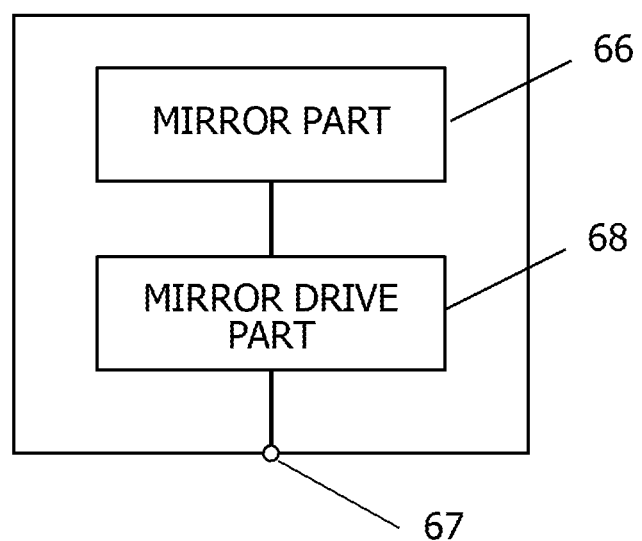
FIG. 24 is a view for describing a modification example of Embodiment 1.

FIG. 24 is a view for describing an example of a modification example of Embodiment 1. FIG. 24 illustrates a reflection part 64 that changes the rotation angle to reflect light incident in different directions toward the same direction. Specifically, the reflection part 64 reflects light dispersed by the diffraction grating 9 toward the diffraction grating 9.

By replacing the mirror 11 in FIG. 1 with the reflection part 64 in FIG. 24, the center wavelength of a portion (that is, first portion) projected onto the first face 22a (see FIG. 2) out of the spectrum light 10 (see FIG. 4) may be changed. Accordingly, in the modification example 1, the variable-wavelength filter may be realized.

Figure 25:
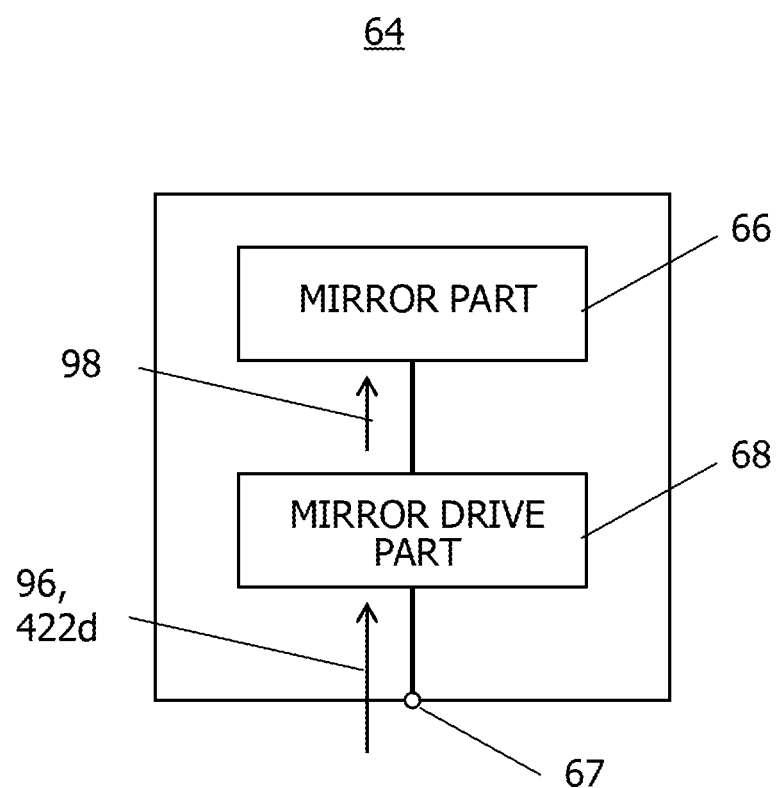
FIG. 25 is a view illustrating the operation of the reflection part.

As illustrated in FIG. 24, the reflection part 64 has a mirror part 66 that reflects the incident light, and a mirror drive part 68 that drives the mirror part 66. The reflection part 64 further has a command input port 67. FIG. 25 is a view illustrating the operation of the reflection part 64. The mirror drive part 68 drives the mirror part 66 based on a command 96 inputted to the command input port 67.

(Hardware Configuration)

Figure 26:
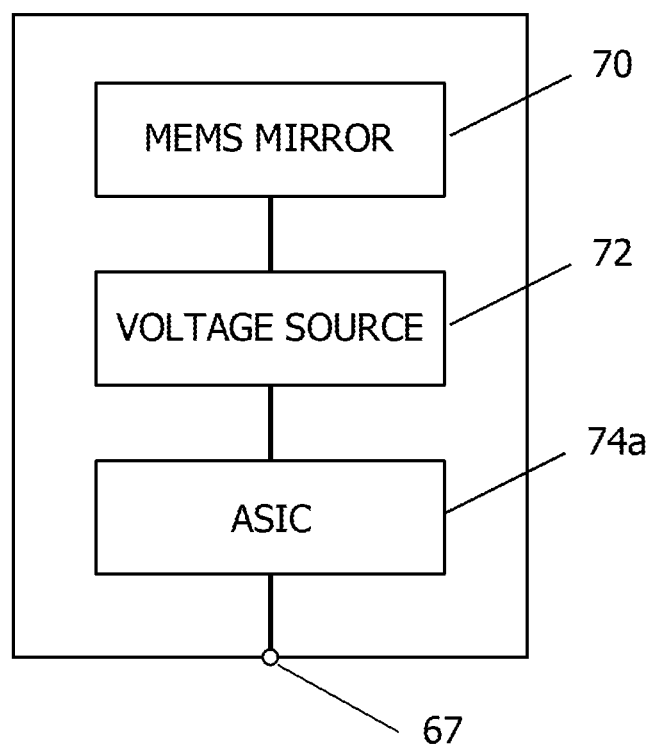
FIG. 26 is a view illustrating an example of the hardware configuration of the reflection part.

FIG. 26 is a view illustrating an example of the hardware configuration of the reflection part 64. As illustrated in FIG. 26, the reflection part 64 has a micro electro mechanical systems (MEMS) mirror 70 and a voltage source 72. The reflection part 64 further has an application specific integrated circuit (ASIC) 74a and the command input port 67. The mirror part 66 (see FIG. 25) is embodied as the MEMS mirror 70. The mirror drive part 68 (see FIG. 25) is formed of the voltage source 72, the ASIC 74a, and the command input port 67.

The mirror drive part 68 may be formed of another circuit such as a system large-scale integrated circuit (LSI). In place of the ASIC 74a, a central processing unit (CPU) and a memory, and another circuit such as a field-programmable gate array (FPGA) may be used. This also applies to a below-mentioned functional block including the ASIC.

(MEMS Mirror 70)

Figure 27:
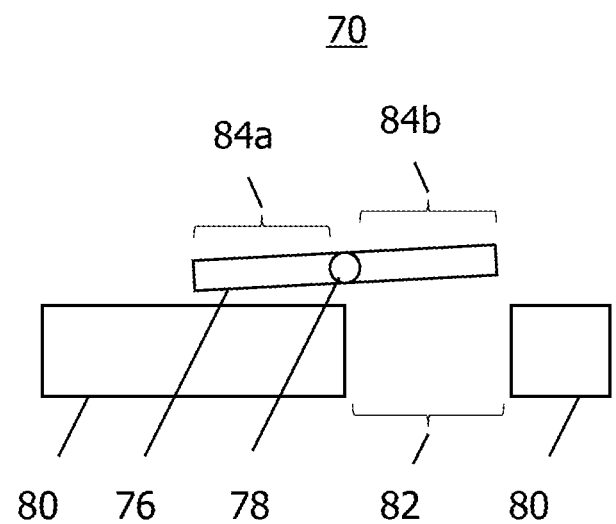
FIG. 27 is a view illustrating an example of a MEMS mirror.

FIG. 27 is a view illustrating an example of the MEMS mirror 70. As illustrated in FIG. 27, the MEMS mirror 70 has a mirror (hereinafter referred to as rotation mirror) 76. The MEMS mirror 70 further has a torsion spring 78 connected to the rotation mirror 76 and a silicon substrate 80. The silicon substrate 80 is provided with a groove 82. The rotation mirror 76 has a first area 84a disposed on the silicon substrate 80 and a second area 84b disposed on the groove 82. The torsion spring 78 is connected between the first area 84a and the second area 84b.

Figure 28:
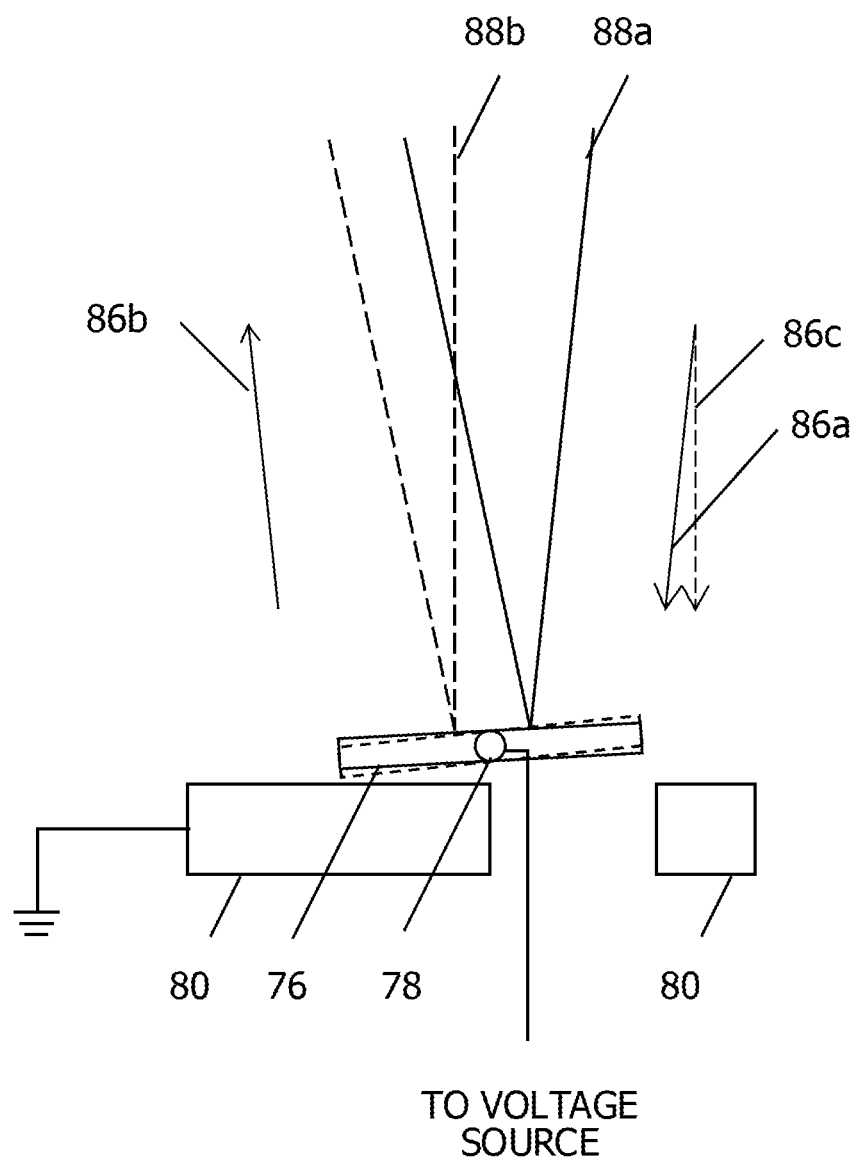
FIG. 28 is a view illustrating an example of the operation of the MEMS mirror.

FIG. 28 is a view illustrating an example of the operation of the MEMS mirror 70. As illustrated in FIG. 28, the silicon substrate 80 is grounded. The rotation mirror 76 is connected to the voltage source 72 via the torsion spring 78 (see FIG. 26).

When the voltage source 72 applies a voltage to the rotation mirror 76, the first area 84a (see FIG. 27) is attracted to the silicon substrate 80 by static electricity. As a result, the rotation mirror 76 rotates. On the contrary, the torsion spring 78 generates a rotation force that stops rotation of the rotation mirror 76. The rotation mirror 76 remains at rest at an angle (that is, rotation angle) at which the electrostatic force applied to the first area 84a is balanced to the rotation force of the torsion spring 78.

The rotation mirror 76 remaining at rest at a first angle due to the balancing reflects first incident light 88a incident in a first direction 86a toward a second direction 86b. When the voltage applied to the rotation mirror 76 changes, the rotation mirror 76 remains at rest at a second angle that is different from the first angle. The rotation mirror 76 remaining at rest at the second angle reflects second incident light 88b incident in a third direction 86c that is different from the first direction 86a toward the second direction 86b.

Specifically, the first incident light 88a is a wavelength component of the spectrum light 10. The second incident light 88b is a wavelength component of the spectrum light 10, which is different from the first incident light 88a. That is, the wavelength of the first incident light 88a is different from the wavelength of the second incident light 88b. The third direction 86c is the direction from the rotation mirror 76 toward the diffraction grating 9.

The first incident light 88a reflected in the second direction 86b is projected onto the center of the first face 22a (see FIG. 2) of the output fiber 6 via the diffraction grating 9 (see FIG. 4). This also applies to the second incident light 88b.

By changing the voltage applied to the rotation mirror 76, the center wavelength of a portion projected onto the first face 22a (for example, the wavelength of the first incident light 88a) out of the spectrum light 10 may be changed to another wavelength (for example, second the wavelength of the second incident light 88b).

(Digital Power Circuit)

The voltage source 72 (see FIG. 26) is, for example, a digital power circuit. The digital power circuit is a circuit that generates a voltage requested by a command.

(ASIC 74a)

Figure 29:
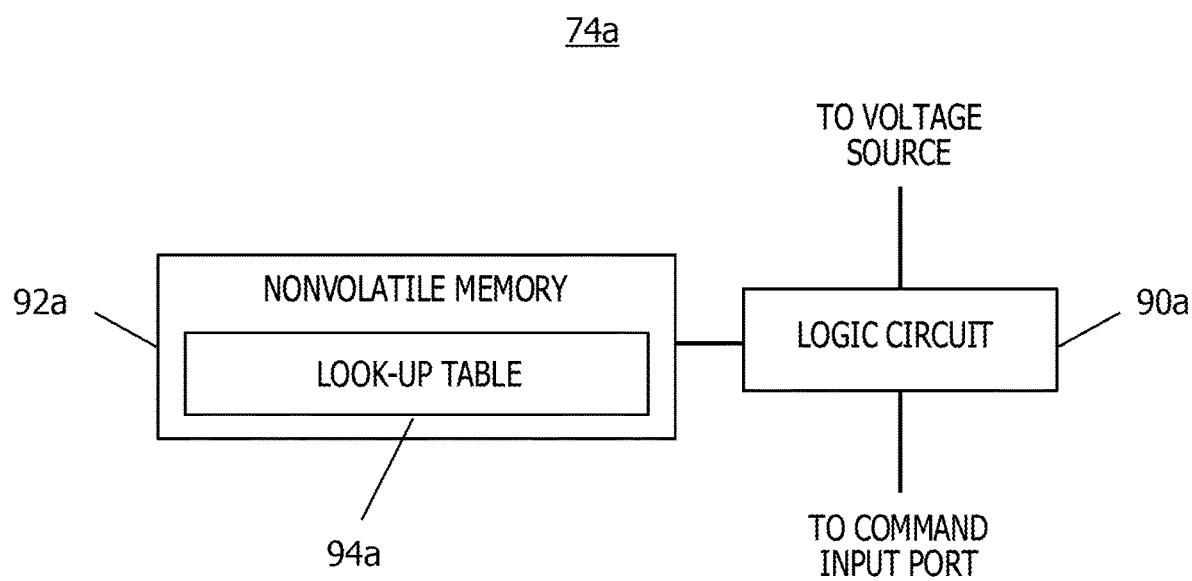
FIG. 29 is a view illustrating an example of the configuration of an ASIC.

FIG. 29 is a view illustrating an example of the configuration of the ASIC 74a. For example, the ASIC 74a has a logic circuit 90a. The ASIC 74a further has a nonvolatile memory 92a that records a look-up table 94a. The nonvolatile memory 92a is, for example, a flash memory (The same applies hereinafter).

FIG. 30 is a view illustrating an example of the look-up table 94a. As illustrated in FIG. 30, the look-up table 94a is tubular data (that is, table). The frequency of light incident onto the rotation mirror 76 is recorded in a first column of the look-up table 94a. The voltage applied to the rotation mirror 76 is recorded in a second column of the look-up table 94a. In place of the wavelength, the wavelength may be recorded in the first column.

When light having the frequency in the first column is incident from the diffraction grating 9 onto the rotation mirror 76, and the voltage in the second column is applied to the rotation mirror 76, the light incident onto the rotation mirror 76 is projected to the center of the first face 22a of the output fiber 6 (see FIG. 2). The frequency in the first column is, for example, 195.80 THz. The voltage in the second column is, for example, $V_8$.

(Operation)

The ASIC 74a (or the logic circuit 90a, and so forth) controls the voltage source 72 based on the command 96 (see FIG. 25). The processing of the ASIC 74a (see FIG. 26) is executed by the mirror drive part 68 (see FIG. 25).

For example, the command 96 is a command for setting the center of the pass band of the optical filter 2 (see FIG. 4) to the frequency (or wavelength) designated by the command 96.

When receiving the command 96, first, the ASIC 74a refers to the look-up table 94a to acquire the voltage (for example, $V_8$) corresponding to the frequency (for example, 195.80 THz) designated by the command 96.

Further, the ASIC 74a sends a command for generating the occurrence of the acquired voltage (for example, $V_8$) to the voltage source 72. In response to the command, the voltage source 72 applies a voltage 98 (see FIG. 25; for example, $V_8$) to the MEMS mirror 70. The MEMS mirror 70 (see FIG. 26) fixes the rotation mirror 76 at the rotation angle corresponding to the applied voltage (for example, $V_8$).

When light having the frequency (for example, 195.80 THz) designated by the command 96 is incident onto the rotation mirror 76 with the rotation angle fixed, the incident light is projected to the center of the first face 22a of the output fiber 6 via the diffraction grating 9.

Accordingly, the position in the pass band of the optical filter 2 (position on the wavelength axis) may be changed by changing the frequency designated by the command 96. That is, the variable-wavelength operation is achieved.

In the above-mentioned example, the input fiber 5 and the output fiber 6 each are a single mode fiber. However, one or both of the input fiber 5 and the output fiber 6 may be a multi-mode fiber.

In the above-mentioned example, the diffraction grating 9 is a transmission diffraction grating. However, the diffraction grating 9 may be a reflection diffraction grating.

In the above-mentioned example, the input fiber 5 and the output fiber 6 are placed side by side. However, the input fiber 5 and the output fiber 6 may be separated from each other as illustrated in FIG. 23.

In accordance with Embodiment 1, the recess 12 is provided on the end face of the output fiber 6, such that a portion of the dispersed input light (that is, the spectrum light 10), which is projected onto the inclined face of the recess 12 is emitted to the clad. As a result, in accordance with Embodiment 1, the optical filter having the filtering characteristic that the transmittance is flat in a certain wavelength range (specifically, pass band) and suddenly decreases on the both sides of the wavelength range is realized.

(Embodiment 2)

Figure 31:
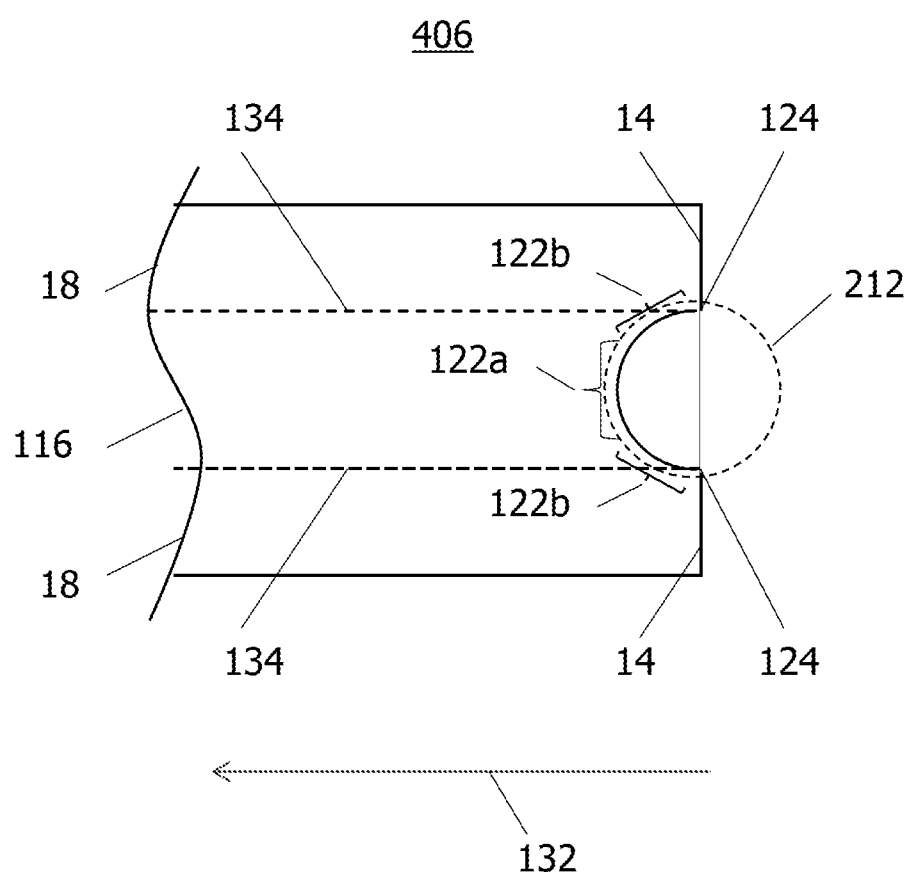
FIG. 31 is a view illustrating an example of the configuration of an output fiber in an optical filter in accordance with Embodiment 2.

FIG. 31 is a view illustrating an example of the configuration of an output fiber 406 included in an optical filter in accordance with Embodiment 2. The optical filter in accordance with Embodiment 2 has the substantially same configuration as the optical filter 2 in accordance with Embodiment 1 except that a recess 212 of the output fiber 406 is hemispherical. Thus, description of the same parts in this embodiment as those in Embodiment 1 is omitted or simplified.

FIG. 31 is a view illustrating a cross section of the output fiber 406 in parallel to a longitudinal direction 132. As illustrated in FIG. 31, an interface between the output fiber 406 and the recess 212 is a semispherical face. A first face 122a (that is, a face that is in contact with the bottom of the recess 212) in accordance with Embodiment 2 is a face that is in contact with a central portion of the semispherical face. A second face 122b (that is, a face sandwiched between the first face 122a and a circumferential end 124 of the recess 212) is a portion other than the central portion of the semispherical face. The inclination of the second face 122b is not fixed, but gradually increases toward the clad 18.

Figure 32:
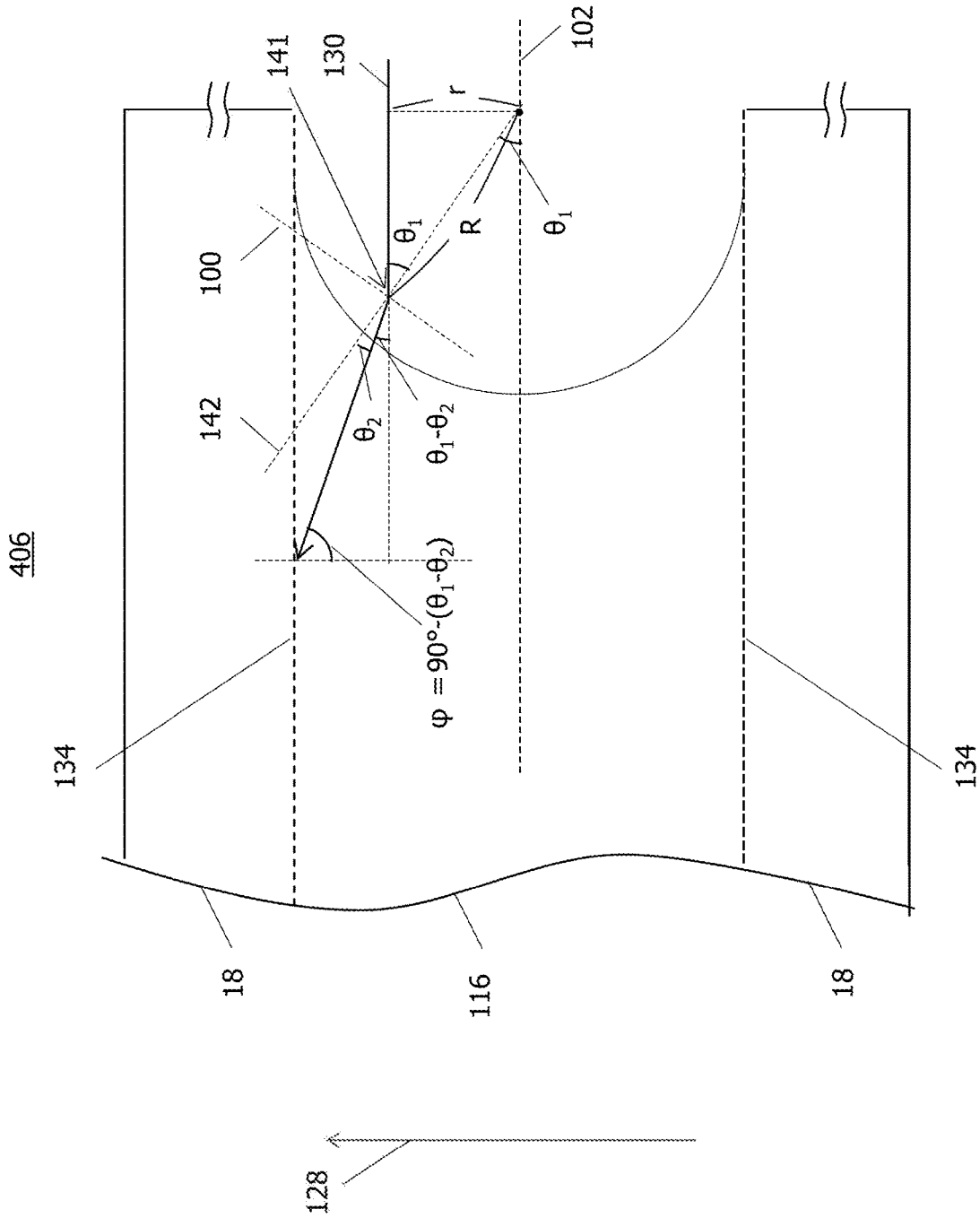
FIG. 32 is a view for deriving an area where the spectrum light projected onto the recess is emitted to the clad.

FIG. 32 is a view for deriving an area (that is, the second face 122b) where the spectrum light 10 projected onto the recess 212 is emitted to the clad 18.

FIG. 32 illustrates a light beam 130 indicating the course of the spectrum light 10 (see FIG. 4). FIG. 32 further illustrates a flat face 100 that is in contact with the recess 212 (hereinafter referred to as contact face). FIG. 32 further illustrates a normal line 142 of the contact face 100. The normal line 142 passes through a contact point 141 between the contact face 100 and the recess 212. The light beam 130 is incident from the contact point 141 to a core 116.

An incidence angle (incident angle) of the light beam 130 onto the contact face 100 is defined as $\theta_1$. A refraction angle (refractive angle) of the light beam 130 onto the contact face 100 is defined as $\theta_2$. Then, as apparent from FIG. 32, an incidence angle $\varphi$ of the light beam 130 onto an interface 134 between the core 116 and the clad 18 is 90 degrees−$(\theta_1-\theta_2)$.

If the incidence angle $\varphi$ on the interface 134 is smaller than the critical angle $\theta_c$ (critical angle), a portion of the light beam 130 is refracted on the interface 134, and is emitted to the clad 18. That is, if 90 degrees−$(\theta_1-\theta_2)$ is smaller than $\theta_c$, the light beam 130 is emitted to the clad 18.

The critical angle $\theta_c$ is expressed as the formula (1).

$$\theta_c = \sin^{-1}(n_2/n_1) \quad (1)$$

Here, $n_1$ indicates the refractive index of the core 116. $n_2$ indicates the refractive index of the clad 18.

$\theta_1$ and $\theta_2$ satisfy the relation of the formula (2) according to the Snell's law.

$$n_0 \sin \theta_1 = n_1 \sin \theta_2 \quad (2)$$

Here, $n_0$ indicates the refractive index (for example, 1) of an external space of the output fiber 406. $n_1$ indicates the refractive index of the core 116.

As apparent from the definition of the sine function and FIG. 32, the incidence angle $\theta_1$ is expressed by the formula (3).

$$\theta_1 = \sin^{-1}(r/R) \quad (3)$$

Here, r indicates a distance between a center line 102 of the core 116 and the light beam 130. R indicates a radius of the interface between the output fiber 406 and the recess 212.

The formula (4) is derived from the formulas (2) and (3).

$$\theta_2 = \sin^{-1}\left(\frac{n_0 \cdot r}{n_1 \cdot R}\right) \quad (4)$$

The formula (5) is acquired from the formulas (3) and (4). A left side of the formula (5) is the incidence angle $\varphi$ of the light beam 130 onto the interface 134.

$$90° - (\theta_1 - \theta_2) = 90° + \sin^{-1}\left(\frac{n_0 \cdot r}{n_1 \cdot R}\right) - \sin^{-1}(r/R) \quad (5)$$

The formula (6) is acquired from a conditional expression for emission of the light beam 130 to the clad 18 (that is, 90 degrees−$(\theta_1-\theta_2)<\theta_c$) and the formula (5).

$$90° + \sin^{-1}\left(\frac{n_0 \cdot r}{n_1 \cdot R}\right) - \sin^{-1}(r/R) < \theta_c \quad (6)$$

The formula (6) is the conditional expression for emission of the light beam 130 to the clad 18. A right side of the formula (6) is the critical angle found by the formula (1).

Figure 33:
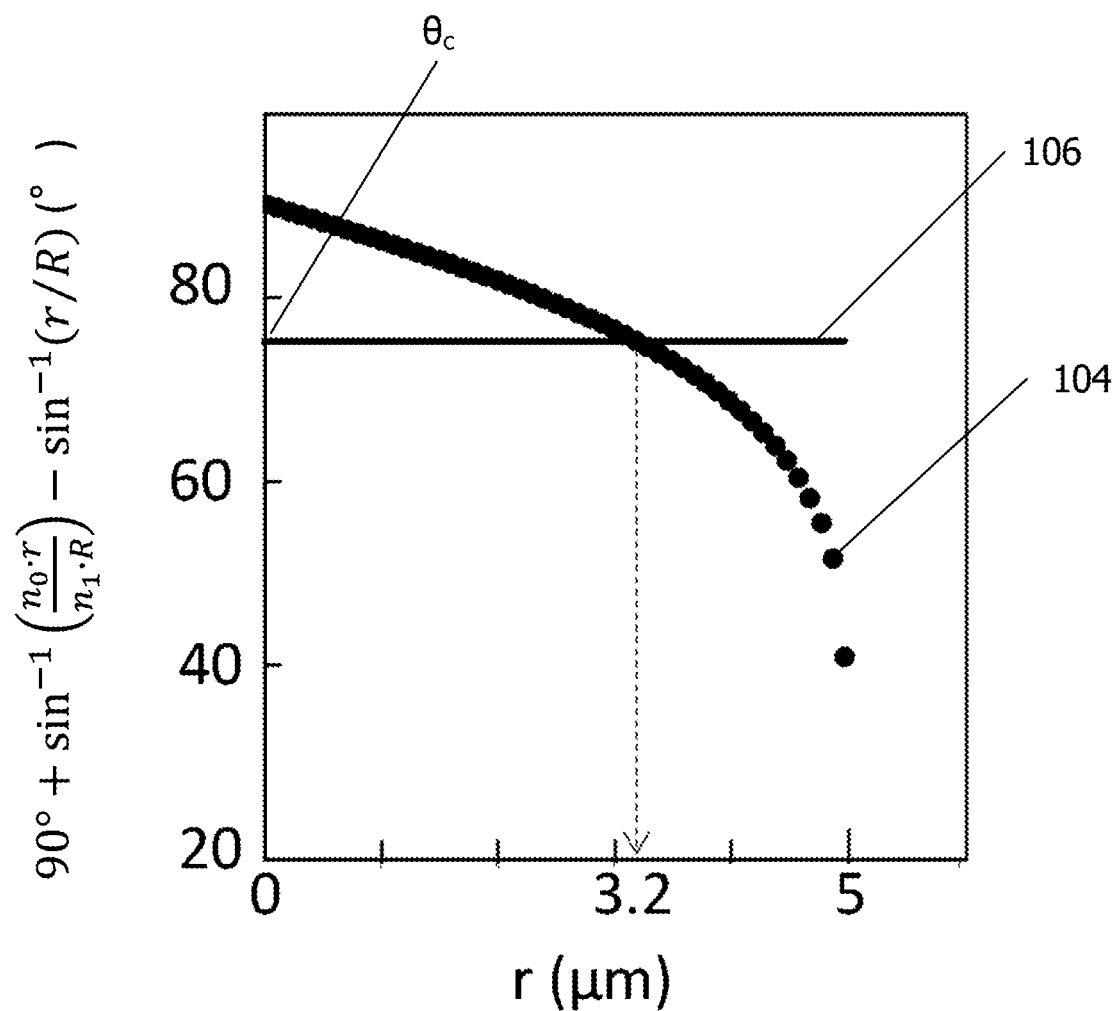
FIG. 33 is a view for describing an example of a method of finding an area where a light beam is emitted to the clad.

FIG. 33 is a view for describing an example of a method of finding an area where the light beam 130 is emitted to the clad 18. A horizontal axis denotes r. A vertical axis denotes a left side of the formula (6) (that is, the incidence angle φ of the light beam 130 onto the interface 134).

A curved line 104 is a graph plotting a left side of the formula (6) with respect to the distance r. A line segment 106 is a line segment indicating the critical angle $\theta_c$ derived based on the formula (1). In the example illustrated in FIG. 33, no, $n_1$, $n_2$, and R are 1, 1.55, 1.5, and 5 μm, respectively. $\theta_c$ is 75.4 degrees.

As apparent from FIG. 33, in the area having r of 3.2 μm or more, the incidence angle φ of the light beam 130 is smaller than the critical angle $\theta_c$. Accordingly, in the area having r of 3.2 μm or more, the light beam 130 is emitted to the clad 18. That is, the area having r of 3.2 μm or more corresponds to the second face 122b where the spectrum light 10 is emitted to the clad 18 (see FIG. 31).

In other words, only light incident onto the core face within the distance of 3.2 μm or less from the center line 102 of the core 116, out of the spectrum light 10, propagates the core 116, and is outputted from the output fiber 406. As a result, the filtering characteristic that the transmittance is flat in the pass band and suddenly decreases on the both sides of the pass band is realized.

As described above, in accordance with Embodiment 2, the end face of output fiber 406 is provided with the recess 212. Therefore, a portion projected onto surroundings of the circumferential end 124 of the recess 212 out of the dispersed input light (that is, the spectrum light 10) is emitted to the clad. Thus, in accordance with Embodiment 2, as in Embodiment 1, the optical filter having the filtering characteristic that the transmittance is flat in a certain wavelength range (specifically, pass band) and suddenly decreases on the both sides of the wavelength range is realized.

In accordance with Embodiment 2, since the recess 212 is semispherical, an angle $(=\theta_1)$ that the contact face 100 of the recess 212 forms with the core 116 in a lateral direction 128 (see FIG. 32) changes from 0 degree to 90 degrees. For this reason, even when the critical angle $\theta_c$ on the interface 134 between the core 116 and the clad 18 deviates from a designed value due to variations in the difference between the refractive indexes $n_1$ and $n_2$, the spectrum light 10 incident onto the vicinity of the circumferential end of the recess 212 is reliably emitted to the clad 18.

That is, in accordance with Embodiment 2, even when the difference between the refractive indexes of the core 116 and the clad 18 deviates from the designed value, the filtering characteristic that the transmittance is flat in a certain wavelength range (specifically, pass band) and suddenly decreases on the both sides of the wavelength range is realized.

(Embodiment 3)

Figure 34:
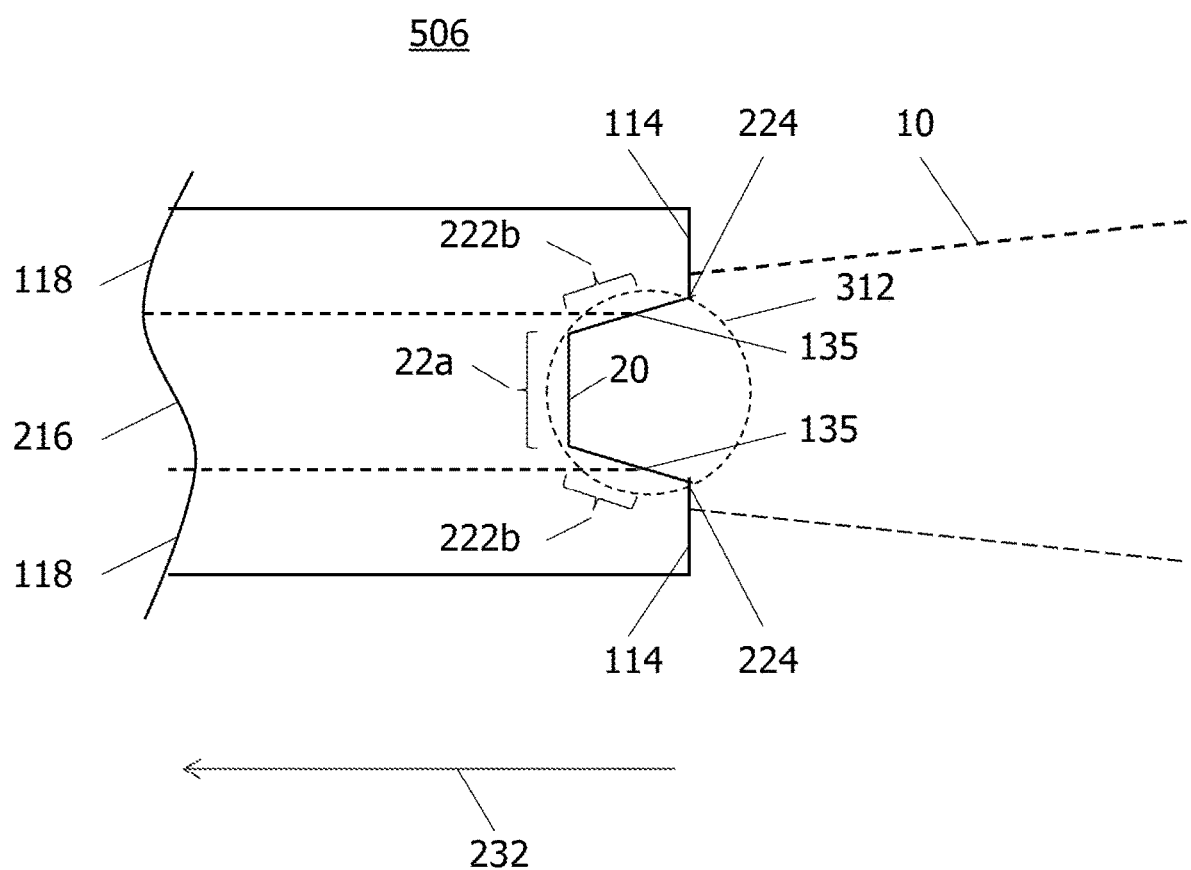
FIG. 34 is a view illustrating an example of the configuration of an output fiber in an optical filter in accordance with Embodiment 3.
Figure 35:
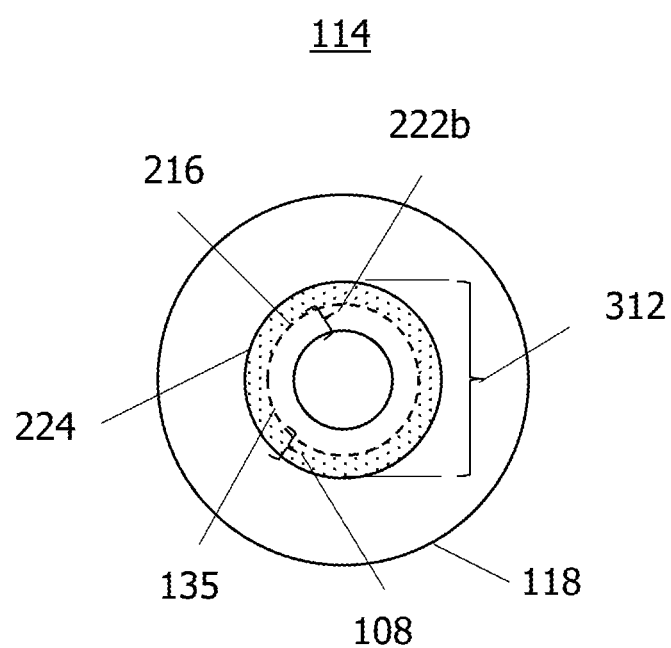
FIG. 35 is a view illustrating an example of the configuration of the output fiber in the optical filter in accordance with Embodiment 3.

FIGS. 34 and 35 are views illustrating an example of the configuration of an output fiber 506 included in an optical filter in accordance with Embodiment 3. The optical filter in accordance with Embodiment 3 has the substantially same configuration as the optical filter 2 in accordance with Embodiment 1 except that a recess 312 of the output fiber 506 extends to the outside of a core 216. Thus, description of the same parts in this embodiment as those in Embodiment 1 is omitted or simplified.

FIG. 34 is a view illustrating a cross section of the output fiber 506 in parallel to a longitudinal direction 232. FIG. 35 is a view illustrating an end face 114 of the output fiber 506 (end face on the side of the lens 7).

As illustrated in FIG. 2, the circumferential end 24 of the recess 12 in accordance with Embodiment 1 overlaps a boundary 35 between the clad 18 and the core 16 on the end face 14 of the output fiber 6. As illustrated in FIGS. 34 and 35, a circumferential end 224 of the recess 312 in accordance with Embodiment 3 surrounds a boundary 135 between a clad 118 and the core 216 on the end face 114 of the output fiber 506. That is, the recess 312 extends to the outside of the core 216.

The spectrum light 10 projected onto an area 108 sandwiched between the circumferential end 224 of the recess 312 and the boundary 135 (see FIG. 35) refracts on an inclined face of the recess 312, and changes the travelling direction to the direction of moving away from the core 216.

The spectrum light 10 incident to the output fiber 6 in accordance with Embodiment 1 (see FIG. 2) may be slightly inclined with respect to the longitudinal direction 32 of the core 16. In such case, a portion of the spectrum light 10 projected on the clad 18 enters into the core 16, and propagates the core 16. This degrades the steepness of rising (and falling) of the transmission characteristic of the optical filter.

However, in the output fiber 506 in accordance with Embodiment 3, the traveling direction of the spectrum light 10 projected onto an area 108 surrounding the core 216 is changed to the direction of moving away from the core 216. As a result, the spectrum light 10 incident from the clad 118 to the core 216 decreases, thereby improving the steepness of rising (and falling) of the transmission characteristic.

In accordance with Embodiment 3, since the end face 114 of the output fiber 506 is provided with the recess 312, a portion projected onto a second face 222b (see FIG. 34) out of the dispersed input light (that is, spectrum light 10) is emitted to the clad. Accordingly, in accordance with Embodiment 3, as in Embodiment 1, the optical filter having the filtering characteristic that the transmittance is flat in a certain wavelength range (specifically, pass band) and suddenly decreases on the both sides of the wavelength range is realized.

In accordance with Embodiment 3, since the recess 312 extends to the outside of the core 216, the spectrum light 10 incident from the clad 118 to the core 216 decreases. Accordingly, in accordance with Embodiment 3, the optical filter with improved steepness of rising (and falling) of the transmission characteristic may be acquired.

(Embodiment 4)

An optical transmission device in accordance with Embodiment 4 is an optical transmission device provided with the optical filter in accordance with Embodiment 1.

(1) Configuration and Operation

Figure 36:
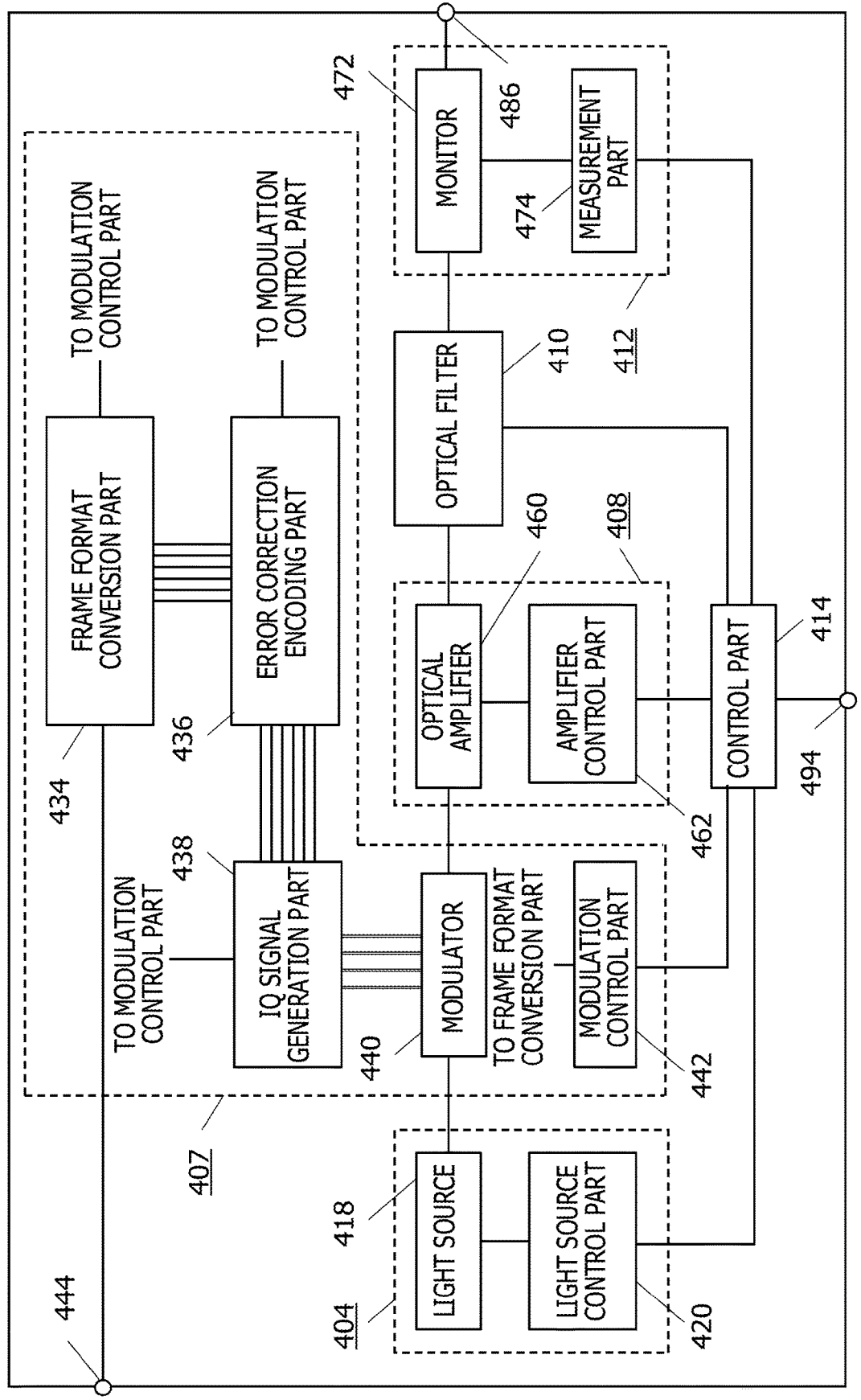
FIG. 36 is a view illustrating an example of the configuration of an optical transmission device in accordance with Embodiment 4.

FIG. 36 is a view illustrating an example of the configuration of an optical transmission device 402 in accordance with Embodiment 4. The optical transmission device 402 has, for example, a light source part 404, a modulation part 407, and an optical amplification part 408. The optical transmission device 402 further has an optical filter 410, a monitor part 412, and a control part 414. The optical transmission device 402 further has an input port 444, an output port 486, and a control port 494. The optical filter 410 is the variable-wavelength filter described in the modification example of Embodiment 1 (see FIGS. 24 to 30).

Figure 37:
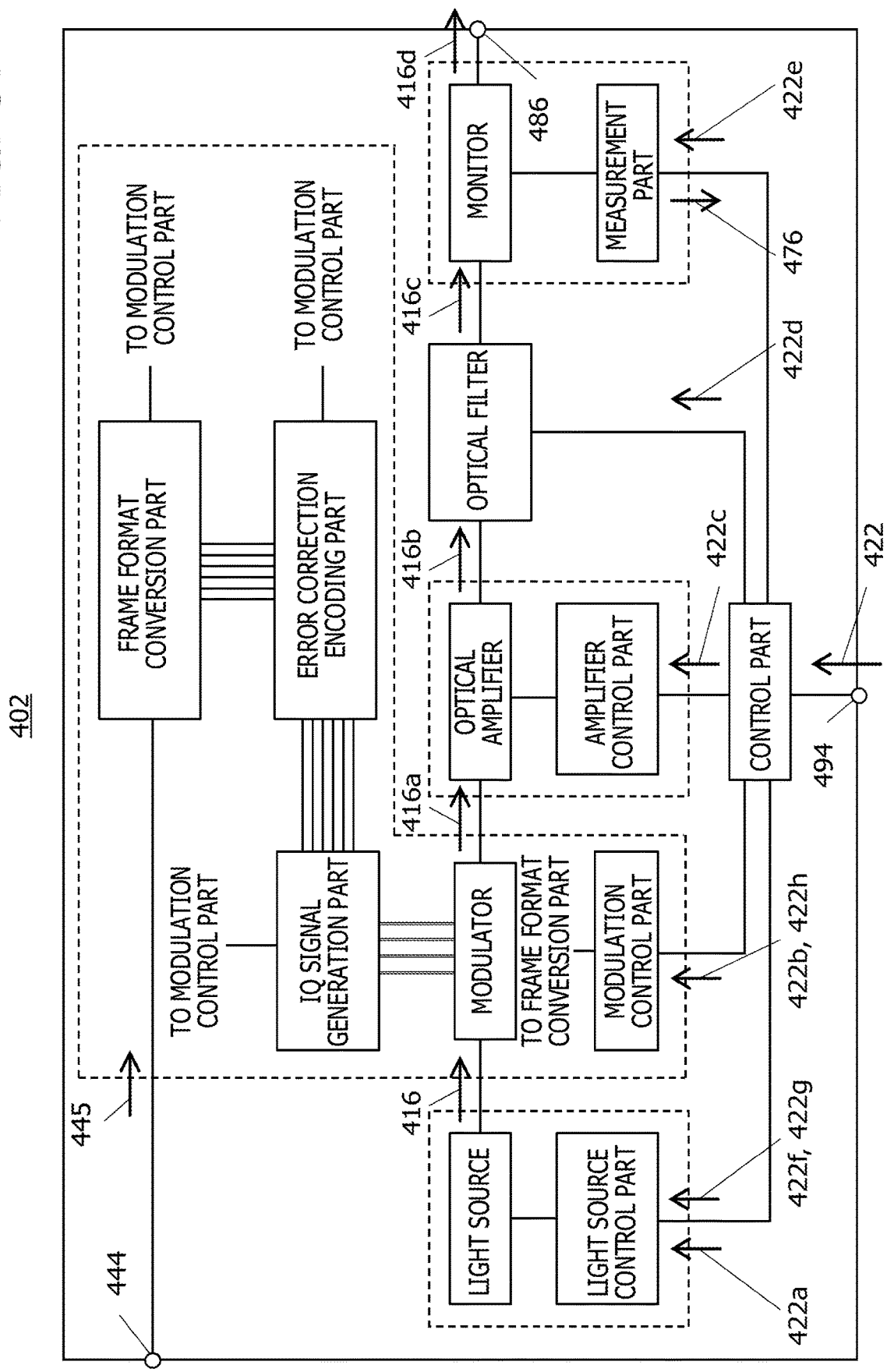
FIG. 37 is a view for describing an example of the operation of the optical transmission device.

FIG. 37 is a view for describing an example of the operation of the optical transmission device 402.

The light source part 404 (see FIG. 36) generates light 416 (see FIG. 37) and outputs the light 416. The light 416 is, for example, laser light. The modulation part 407 modulates the light 416. The optical amplification part 408 amplifies an output 416a of the modulation part 407 (that is, the modulated light 416).

The optical filter 410 filters an output 416b of the optical amplification part 408. Specifically, the optical filter 410 removes ASE of an optical amplifier 460 from the output 416b of the optical amplification part 408.

In other words, the output 416b of the optical amplification part 408, which includes the modulated and amplified light 416 is inputted as the input light 8 (see FIG. 4) to the optical filter 410, and an output 416c (see FIG. 37) is outputted as the output light 47 (see FIG. 4) from the optical filter 410. The output 416c includes the modulated and amplified light 416.

The monitor part 412 monitors the output 416c of the optical filter 410. The control part 414 controls the light source part 404, the modulation part 407, and the optical amplification part 408. The control part 414 further controls the optical filter 410 and the monitor part 412.

The modulation part 407 may be omitted. For example, if the light source part 404 directly outputs modulated light, the modulation part 407 may be omitted. Further, the monitor part 412 may be omitted. For example, if processing of correcting a drive current of the light source part 404 (see below-mentioned Steps S110 to S114) is not executed, the monitor part 412 may be omitted. Further, the control part 414 may be omitted. For example, if each module (the light source part 404 or so on) controlled by the control part 414 is controlled by an external device, the control part 414 may be omitted.

In the example illustrated in FIG. 36, the modulation part 407 is disposed between the light source part 404 and the optical amplification part 408. However, the modulation part 407 may be disposed at another position. For example, the modulation part 407 may be disposed between the optical amplification part 408 and the optical filter 410. Alternatively, the modulation part 407 may be disposed between the optical filter 410 and the monitor part 412.

(1.1) Light Source Part

As illustrated in FIG. 36, the light source part 404 has a light source 418 and a light source control part 420. The light source 418 outputs the light 416 (see FIG. 37). The light source control part 420 controls the light source 418 according to a command 422a (see FIG. 37) from the control part 414 (see FIG. 36).

(Hardware Configuration)

Figure 38:
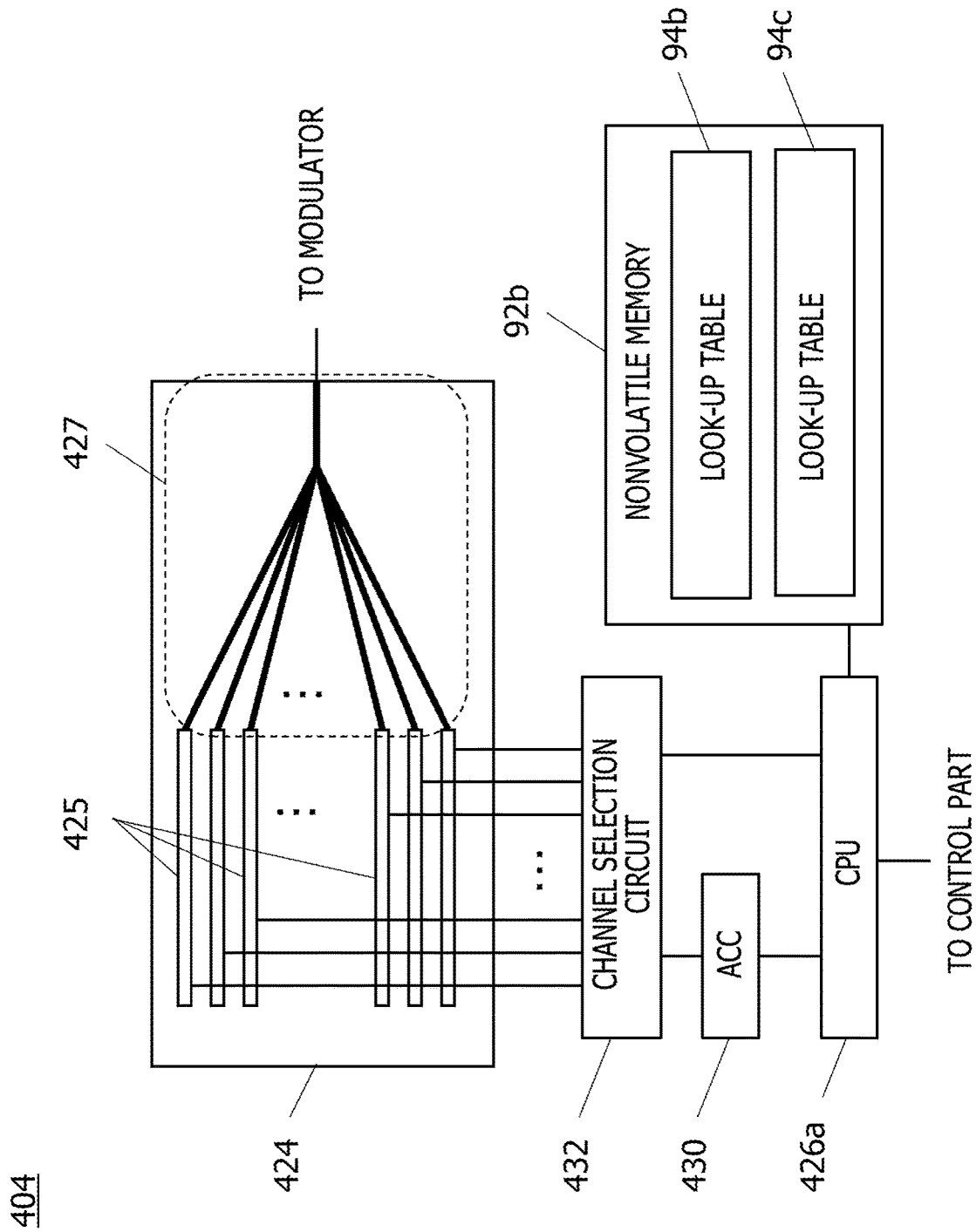
FIG. 38 is a view illustrating an example of the hardware configuration of a light source part.

FIG. 38 is a view illustrating an example of the hardware configuration of the light source part 404. The light source part 404 has, for example, a distributed feed back (DFB) laser array 424.

The DFB laser array 424 has a plurality of DFB lasers 425 having different luminous wavelengths, and a multiplexer 427 that multiplexes outputs of the plurality of DFB lasers 425.

The light source part 404 further has a CPU 426a and a nonvolatile memory 92b. The light source part 404 further has an auto current controller (ACC) 430 and a channel selection circuit 432. In place of a CPU 426a and a nonvolatile memory 92b, FPGA or ASIC may be used. This also applies to a below-mentioned CPU.

The nonvolatile memory 92b records a program (not illustrated) executed by the CPU 426a. The nonvolatile memory 92b further records a look-up table 94b and a look-up table 94c.

FIGS. 39A and 39B are views illustrating an example of the look-up tables 94b, 94c. As illustrated in FIG. 39A, the look-up table 94b is tubular data (that is, table).

An identification number of each channel of the channel selection circuit 432 is recorded in a first column of the look-up table 94b. The frequency (for example, 195.50 THz) of the laser light outputted from the DFB laser 425 connected to the channel corresponding to the identification number (for example, CH8) in the first column is recorded in a second column of the look-up table 94b.

As illustrated in FIG. 39B, the look-up table 94c is tubular data (that is, table). An identification number of each channel of the channel selection circuit 432 is recorded in a first column of the look-up table 94c. A drive current (for example, 2.1 mA) for outputting laser light having the intensity (for example, 1 mW) from the DFB laser 425 connected to the channel corresponding to the identification number (for example, CH8) in the first column is recorded in a second column of the look-up table 94c.

For example, the plurality of look-up tables 94c are recorded in the nonvolatile memory 92b. In this case, the output intensity of the DFB laser 425 driven with the drive current recorded in one of the plurality of look-up tables 94c is different from the output intensity of the DFB laser 425 driven with the drive current recorded in another look-up table 94c. The nonvolatile memory 92b may record only one look-up table 94c.

The light source 418 is formed of the DFB laser array 424, for example. The light source control part 420 is formed of the CPU 426a, the nonvolatile memory 92b, the ACC 430, and the channel selection circuit 432, for example.

(Operation)

The CPU 426a reads a program from the nonvolatile memory 92b, and controls the channel selection circuit 432 and the ACC 430 according to the read program. Specifically, the CPU 426a controls the channel selection circuit 432 and the ACC 430 according to the command 422a from the control part 414. The processing of the CPU 426a is executed using the light source control part 420.

For example, the command 422a (see FIG. 37) is a command for requesting the light source part 404 to output the light 416 having frequency f (or wavelength λ, and so forth) and light intensity P.

When receiving the command 422a, the CPU 426a first refers to the command 422a to identify the frequency f and the light intensity P.

Further, the CPU 426a refers to the look-up table 94b and acquires the identification number (for example, CH8) of the channel corresponding to the identified frequency f (for example, 195.50 THz) from the channels of the channel selection circuit 432. The CPU 426a requests the channel selection circuit 432 to connect the ACC 430 to the channel corresponding to the acquired identification number.

Further, the CPU 426a identifies the look-up table 94c corresponding to the identified light intensity P. Specifically, the look-up table 94c that records the drive current for causing the DFB laser 425 to emit light having the identified light intensity P (for example, 1 mW) is identified from among the plurality of look-up tables 94c.

Further, the CPU 426a refers to the identified look-up table 94c, and reads the drive current (for example, 2.1 mA) corresponding to the identification number (for example, CH8) acquired from the look-up table 94b. The CPU 426a requests the ACC 430 to output the read drive current.

In response to the request from the CPU 426a, the channel selection circuit 432 and the ACC 430 cooperate to cause the DFB laser array 424 to output the light 416 having the identified frequency f (for example, 195.50 THz) and the identified light intensity P (for example, 1 mW). Specifically, the current outputted from the ACC 430 is supplied to the DFB laser 425 that emits light having the frequency f via the channel selection circuit 432. Then, the DFB laser 425 outputs the light 416 having the identified frequency f and the identified light intensity P.

(1.2) Modulation Part

As illustrated in FIG. 36, the modulation part 407 has a frame format conversion part 434 and an error correction encoding part 436. The modulation part 407 further has an IQ signal generation part 438, a modulator 440, and a modulation control part 442.

For example, the frame format conversion part 434 converts a format of a signal 445 (see FIG. 37) inputted to the input port 444 on the side of the local area network (LAN) into a frame format on the side of the wide area network (WAN), and outputs the converted format. For example, the signal 445 is an Ethernet (registered trademark) signal. For example, the WAN is an optical transport network (OTN).

The error correction encoding part 436 adds an error correction sign to the output of the frame format conversion part 434, and outputs the output.

Based on the output of the error correction encoding part 436, the IQ signal generation part 438 generates, for example, two quadrature phase shift keying (QPSK) signals, and outputs the QPSK signals. The QPSK signals each include an in-phase signal and a quadrature-phase signal. The in-phase signal is a so-called I signal. The quadrature-phase signal is a so-called Q signal.

According to the output (that is, two QPSK signals) of the IQ signal generation part 438, the modulator 440 modulates the light 416 (see FIG. 37), and outputs the modulated light. The output 416a of the modulator 440 is, for example, a polarization-multiplexed QPSK signal. The modulation frequency is, for example, 85 to 150 GHz.

The modulation control part 442 controls other blocks (that is, the frame format conversion part 434, the error correction encoding part 436, and the IQ signal generation part 438) according to a command 422b from the control part 414 (see FIG. 37).

(Hardware Configuration)

Figure 40:
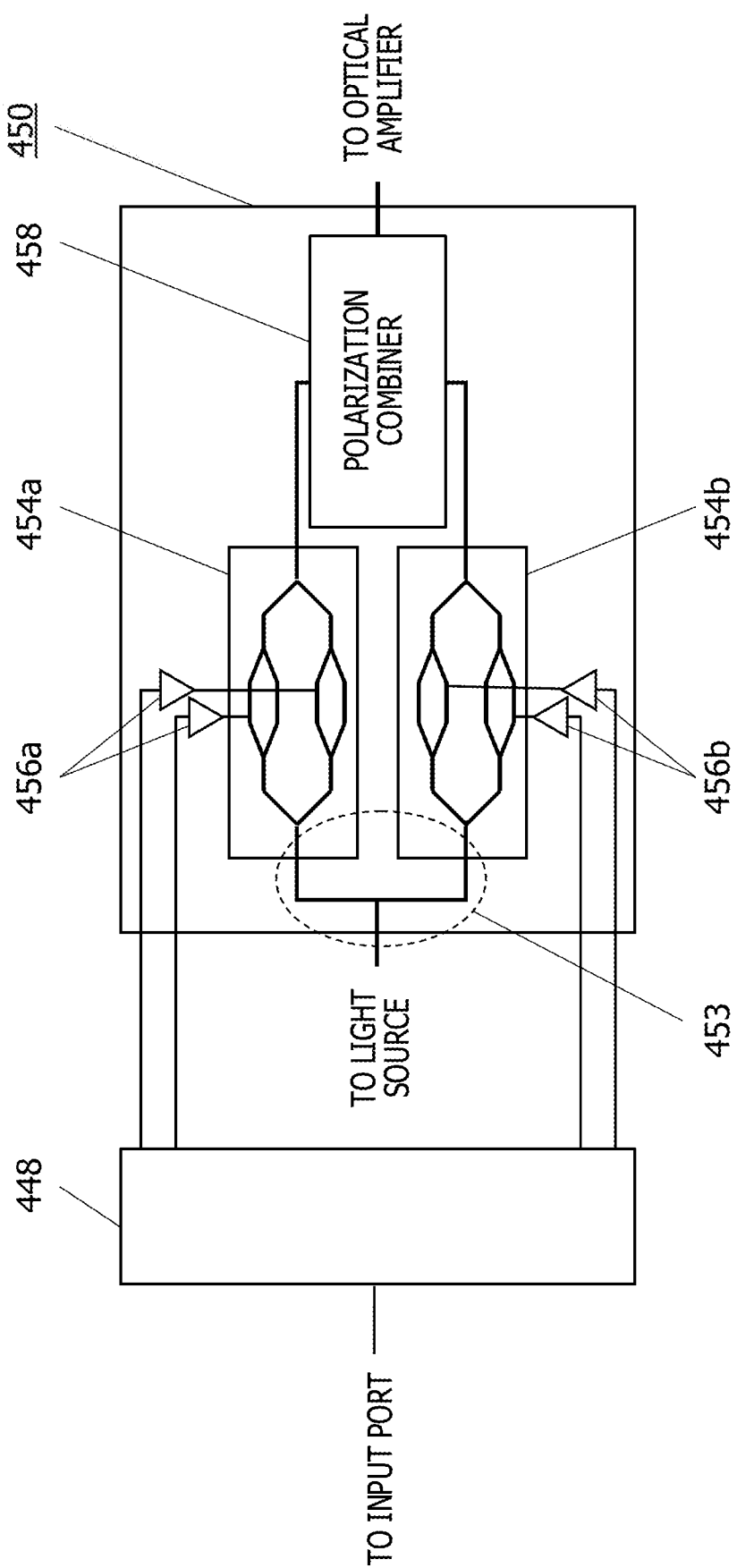
FIG. 40 is a view illustrating an example of the hardware configuration of a modulation part.

FIG. 40 is a view illustrating an example of the hardware configuration of the modulation part 407. The modulation part 407 has, for example, a digital signal processor (DSP) 448 and a QPSK modulator module 450. The frame format conversion part 434, the error correction encoding part 436, the IQ signal generation part 438, and the modulation control part 442 are embodied as the DSP 448. The modulator 440 is embodied as the QPSK modulator module 450, for example.

(DSP 448)

The DSP 448 converts the signal 445 (see FIG. 37) into two QPSK signals. The signal 445 is converted by the frame format conversion part 434, the error correction encoding part 436, and the IQ signal generation part 438.

The DSP 448 applies the two QPSK signals to the QPSK modulator module 450. The QPSK signals are applied by the IQ signal generation part 438.

The DSP 448 is prohibited from outputting the QPSK signals according to the command 422b from the control part 414 (see FIG. 37). Further, the DSP 448 is allowed to output the QPSK signals according to a command 422h from the control part 414. The modulation control part 442 performs the control based on the command 422b and the command 422h.

(QPSK Modulator Module 450)

The QPSK modulator module 450 in FIG. 40 is a polarization-multiplexing modulator module that outputs polarization-multiplexed modulated light. The QPSK modulator module 450 has, for example, a branching waveguide 453 and two dual parallel Mach Zehnder modulators (DPMZM) 454a, 454b. The QPSK modulator module 450 further has a plurality of buffers 456a, 456b and a polarization combiner 458.

One QPSK signal outputted from the DSP 448 via the buffer 456a is applied to one DPMZM 454a. The other QPSK signal outputted from the DSP 448 via the buffer 456b is applied to the other DPMZM 454b.

The light 416 (see FIG. 37) from the light source part 404 is branched by the branching waveguide 453, and the branched light 416 (hereinafter referred to as branched light) is inputted to each of the DPMZMs 454a, 454b. The DPMZMs 454a, 454b each modulate the inputted branched light according to the QPSK signal.

The polarization combiner 458 combines the branched light modulated by the two DPMZMs 454a, 454b. At this time, the polarization combiner 458 rotates one branched light by 90 degrees, and combines the one branched light with the other branched light. That is, according to the QPSK signals from the DSP 448, the QPSK modulator module 450 modulates the light 416 from the light source part 404, and outputs polarization-multiplexed signal light (specifically, the output 416a).

(1.3) Optical Amplification Part

As illustrated in FIG. 36, the optical amplification part 408 has the optical amplifier 460 and an amplifier control part 462. The amplifier control part 462 controls the optical amplifier 460 according to a command 422c from the control part 414 (see FIG. 37).

(Hardware Configuration)

Figure 41:
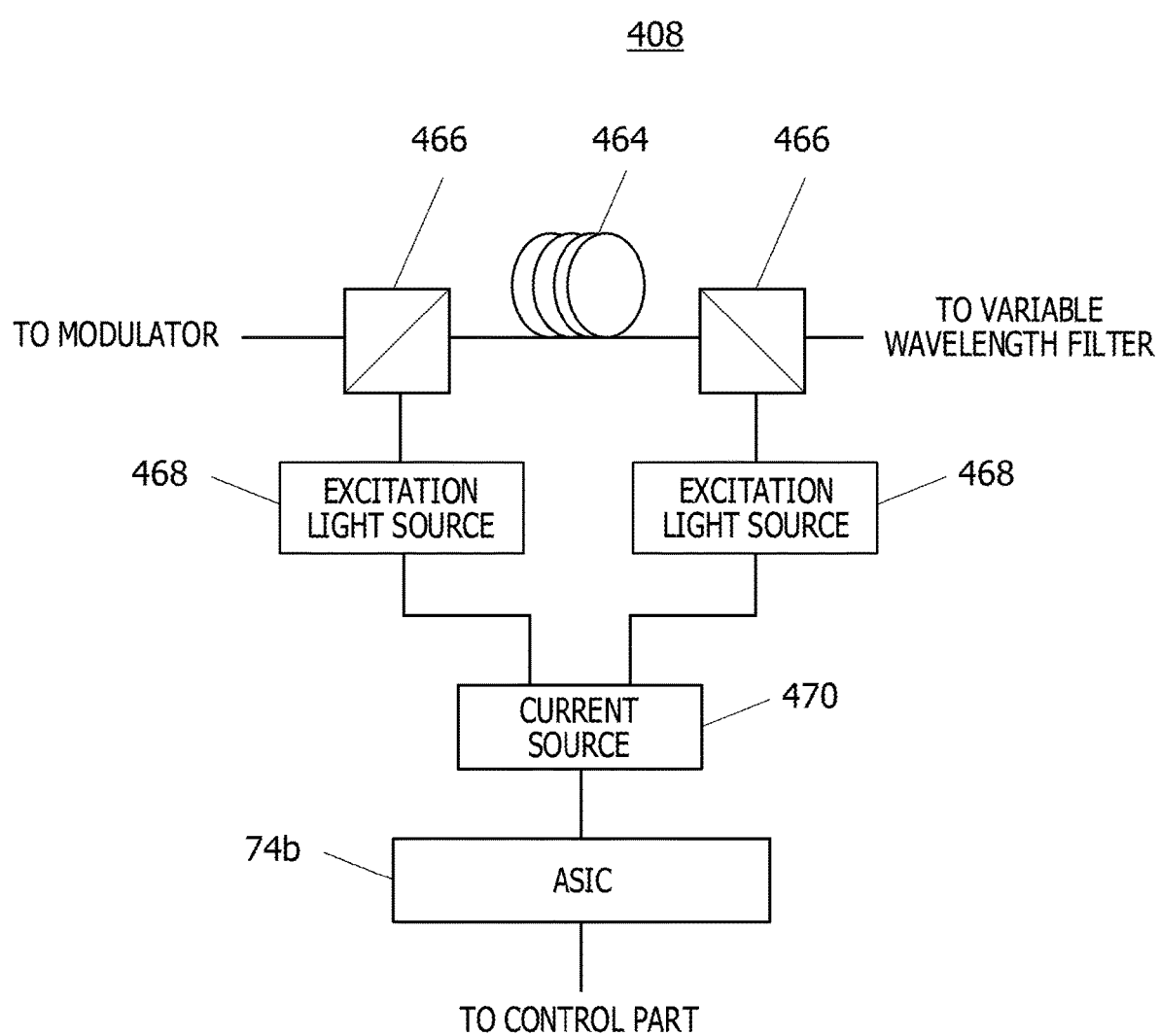
FIG. 41 is a view illustrating an example of the hardware configuration of an optical amplification part.

FIG. 41 is a view illustrating an example of the hardware configuration of the optical amplification part 408. The optical amplification part 408 has, for example, an EDFA 464, two multiplexers 466, and two excitation light sources 468. The optical amplification part 408 further has a current source 470 and an ASIC 74b.

For example, the optical amplifier 460 (see FIG. 36) is formed as the EDFA 464, the two multiplexers 466, the two excitation light sources 468, and the current source 470. The amplifier control part 462 is formed of the ASIC 74b, for example.

Figure 42:
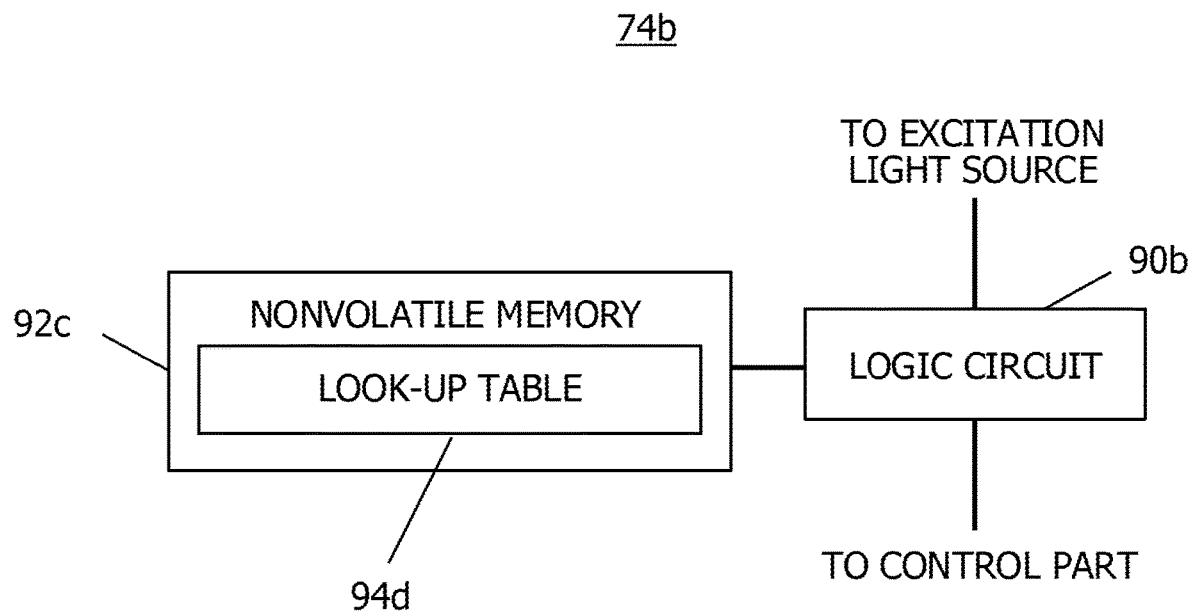
FIG. 42 is a view illustrating an example of the configuration of the ASIC.

FIG. 42 is a view illustrating an example of the configuration of the ASIC 74b. As illustrated in FIG. 42, the ASIC 74b has a logic circuit 90b. The ASIC 74b further has a nonvolatile memory 92c that records a look-up table 94d.

FIG. 43 is a view illustrating an example of the look-up table 94d. As illustrated in FIG. 43, the look-up table 94d is tubular data (that is, table). The gain of the EDFA 464 is recorded in a first column of the look-up table 94d. The drive current of the excitation light sources 468 is recorded in a second column of the look-up table 94d. When each of the excitation light sources 468 is excited with the current (for example, $I_{10}$) in the second column, the gain of the EDFA 464 becomes the gain (for example, 10 dB) recorded in the first column.

(Operation)

The ASIC 74b controls the optical amplifier 460 based on the command 422c (see FIG. 37). The processing of the ASIC 74b is executed by the amplifier control part 462.

The command 422c is a command for requesting the optical amplifier 460 to capture the designated gain (for example, 10 dB).

The ASIC 74b (or the logic circuit 90b, and so forth) refers to the look-up table 94c to identify the drive current (for example, $I_{10}$) corresponding to the gain (for example, 10 dB) designated by the command 422c. The ASIC 74b sends a command (not illustrated) for requesting the current source 470 to generate the identified drive current.

The current source 470 generates the requested drive current, and supplies the generated drive current to each of the excitation light sources 468. The excitation light sources 468 emits light with the supplied drive current to output excitation light. The outputted excitation light is supplied to the EDFA 464 via the multiplexers 466.

Through the excitation light, the EDFA 464 captures the gain (for example, 10 dB) designated by the command 422c.

(1.4) Optical Filter

The optical filter 410 is the variable-wavelength filter described in the modification example of Embodiment 1 (see FIGS. 24 to 30).

The mirror drive part 68 (see FIG. 25) drives the mirror part 66 according to a command 422d (corresponding to the command 96 in FIG. 25) from the control part 414 (see FIG. 37).

The command 422d is a command for setting the center of the pass band of the optical filter 410 (see FIG. 7) to the frequency (or wavelength) designated by the command 422d.

When receiving the command 422d, the mirror drive part 68 applies the voltage 98 corresponding to the frequency (or wavelength) designated by the command 422d to the mirror part 66 (refer to "(5) modification example" in Embodiment 1).

In response to the voltage 98, the mirror part 66 fixes the rotation mirror 76 (see FIG. 27) at the angle corresponding to the frequency designated by the command 422d. As a result, the center of the pass band of the optical filter 410 is set to the frequency (or wavelength) designated by the command 422d.

(1.5) Monitor Part

As illustrated in FIG. 36, the monitor part 412 has a monitor 472 and a measurement part 474. In response to a command 422e from the control part 414 (see FIG. 37), the measurement part 474 measures the intensity of the output 416c of the optical filter 410, and returns monitor information 476 including a measurement result to the control part 414.

(Hardware Configuration)

Figure 44:
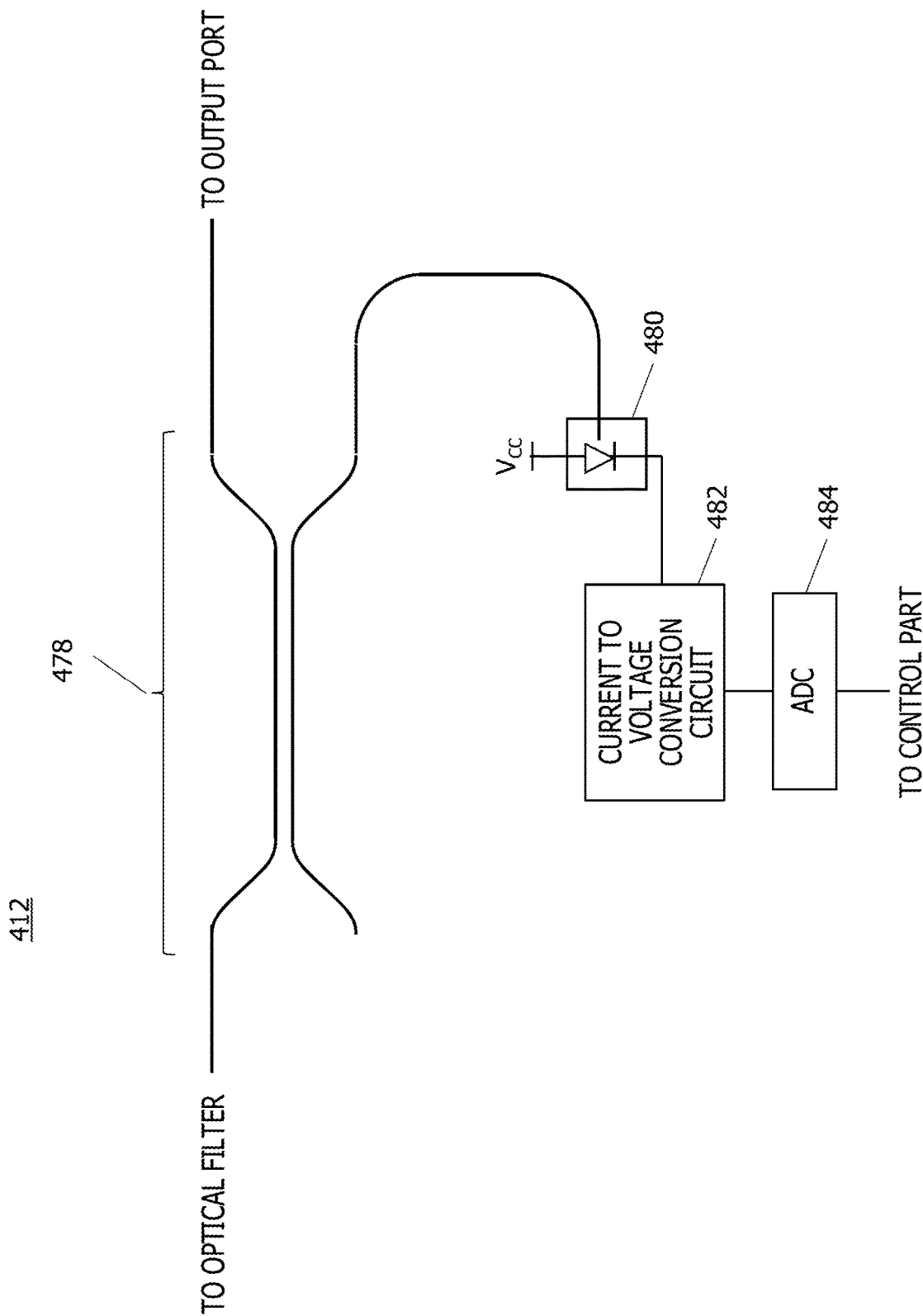
FIG. 44 is a view illustrating an example of the hardware configuration of a monitor part.

FIG. 44 is a view illustrating an example of the hardware configuration of the monitor part 412. The monitor part 412 has, for example, an optical divider 478 and an optical detector 480. The monitor part 412 further has a current to voltage conversion circuit 482 and an analog to digital converter (ADC) 484. The optical divider 478 is an optical fiber coupler, for example.

The monitor 472 (see FIG. 36) is formed of the optical divider 478, for example. The measurement part 474 is formed of the optical detector 480, the current to voltage conversion circuit 482, and the ADC 484, for example.

The optical divider 478 branches the output 416c of the optical filter 410. The optical divider 478 outputs one branched output 416c (hereinafter referred to as output light 416d) from the output port 486 (see FIG. 37). The output light 416d is an output of the optical transmission device 402.

The optical divider 478 sends the other branched output 416c (hereinafter referred to as monitor light) to the optical detector 480. The monitor light is sufficiently weaker than the output light 416d.

The optical detector 480 converts the received monitor light into a current (hereinafter referred to as photocurrent), and sends the photocurrent to the current to voltage conversion circuit 482.

The ADC 484 controls the current to voltage conversion circuit according to the command 422e from the control part 414. The command 422e is a command for measuring the intensity of the output 416c of the optical filter 410, and sending the monitor information 476 including the measured output intensity to the control part 414. The processing of the ADC 484 is executed by the measurement part 474.

The ADC 484 first requests the current to voltage conversion circuit 482 to convert the photocurrent from the optical detector 480 into a voltage (hereinafter referred to as converted voltage) and transmit the converted voltage. In response to the request, the current to voltage conversion circuit 482 sends the converted voltage to the ADC 484.

The ADC 484 converts the converted voltage into a digital signal, and sends the monitor information 476 including the digital signal to the control part 414.

(1.6) Control Part

According to the command 422 received via the control port 494 (see FIG. 37), the control part 414 controls the light source part 404, the modulation part 407, the optical amplification part 408, the optical filter 410, and the monitor part 412.

Figure 45:
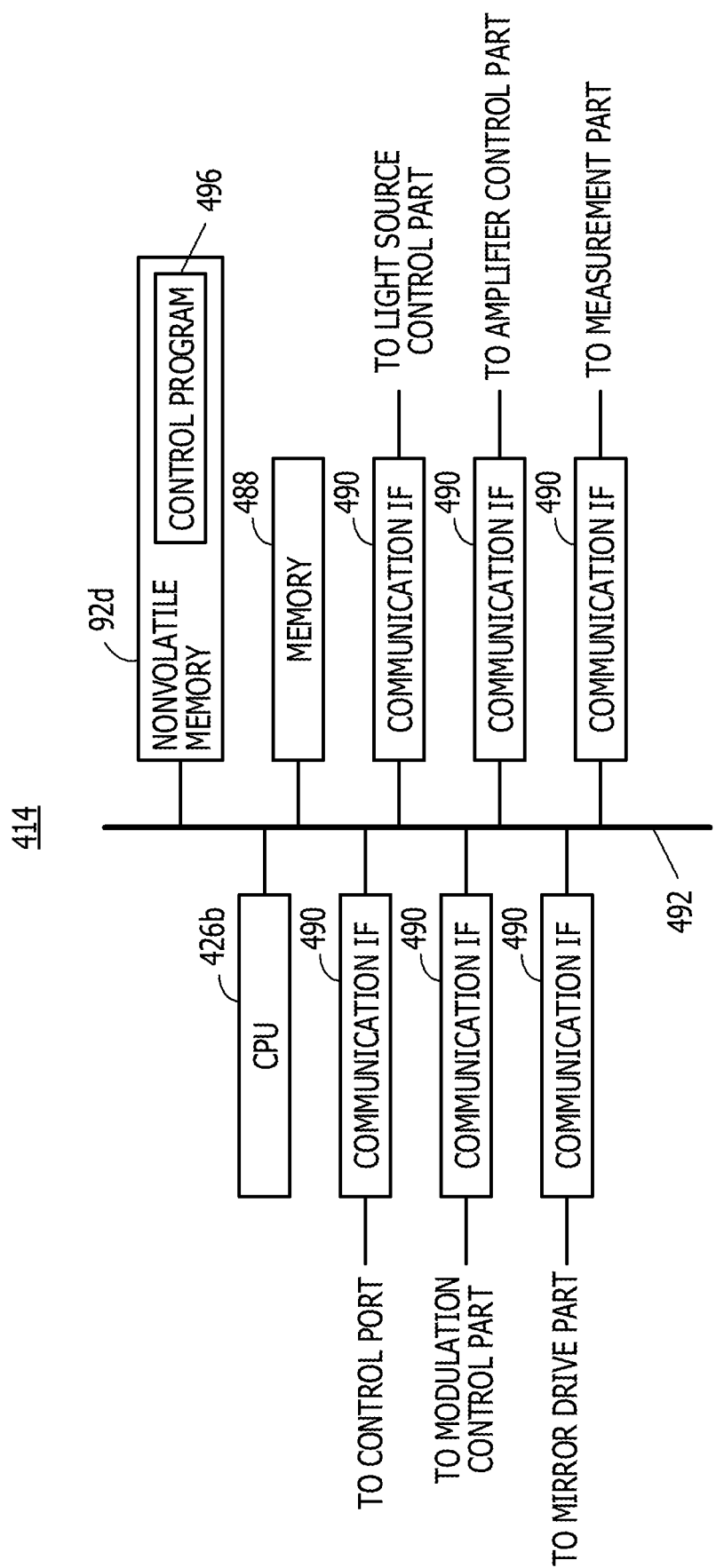
FIG. 45 is a view illustrating an example of the hardware configuration of a control part.

FIG. 45 is a view illustrating an example of the hardware configuration of the control part 414. The control part 414 has, for example, a CPU 426b, a nonvolatile memory 92d, and a memory 488. The memory 488 is a dynamic random access memory (DRAM), for example. The control part 414 further has a plurality of communication interfaces 490 and a bus 492. The control part 414 is formed of the CPU 426b, the memory 488, the nonvolatile memory 92d, and the plurality of communication interfaces 490.

The CPU 426b is connected to the control port 494 and control parts of blocks via the plurality of communication interfaces 490 and the bus 492. The control parts of the blocks are the light source control part 420 (see FIG. 36), the modulation control part 442, the amplifier control part 462, the mirror drive part 68 (see FIG. 25), and the measurement part 474 (and so forth). The nonvolatile memory 92d records a control program 496.

The CPU 426b performs calculation based on information acquired via the communication interfaces 490 and data acquired from the memory 488, and records a calculation result in the memory 488. Further, the CPU 426b outputs the data and calculation result (including the command) recorded in the memory 488 via the communication interfaces 490.

Figure 46:
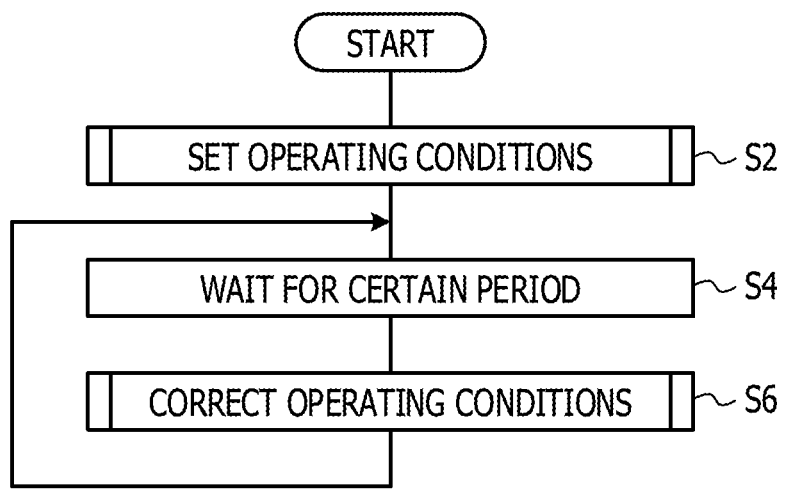
FIG. 46 is a view illustrating an example of a flow chart of a control program.

FIG. 46 is a view illustrating an example of a flow chart of the control program 496. Each step in the control program 496 is performed by the control part 414.

When receiving the command 422 (see FIG. 37), the CPU 426b reads the control program 496 from the nonvolatile memory 92d, and cooperates with the memory 488 to execute the read control program 496.

(Step S2) The CPU 426b first sends the command 422a to 422e and sets operating conditions of the light source part 404 and so on (for example, the output intensity of the ACC 430).

(Step S4) Following Step S2, the CPU 426b stops sending any command for a certain period.

(Step S6) Following Step S4, the CPU 426b corrects the operating conditions of the light source part 404 and so on.

Following Step S6, the CPU 426b return to Step S4.

Then, the CPU 426b repeats Steps S4 and S6. For example, when receiving an interrupt signal to terminate the control program 496, the CPU 426b terminates execution of the control program 496. For example, the interrupt signal is sent to the control part 414 via the control port 494.

Figure 47:
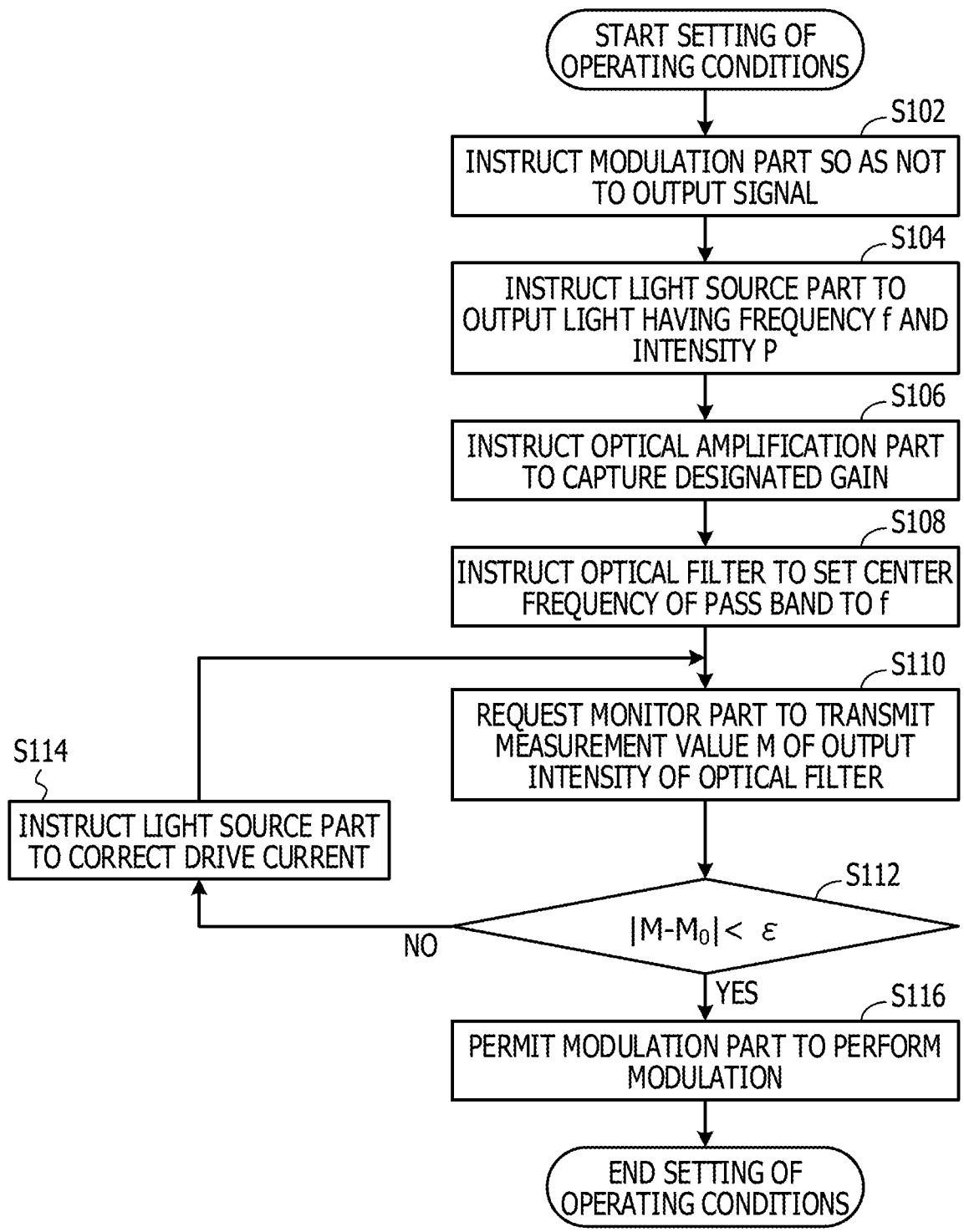
FIG. 47 is a flow chart of an example of a subprocess illustrating details in Step S2.

FIG. 47 illustrates an example of a subprocess indicating details of Step S2.

(Step S102) The CPU 426b first sends a command 422b for prohibiting the modulation part 407 from performing modulation (Step S102).

The command 422b is received by the DSP 448 of the modulation part 407 (see FIG. 40).

The DSP 448 is prohibited from outputting the QPSK signals according to the command 422b.

(Step S104) Following Step S102, the CPU 426b sends the command 422a for requesting the light source part 404 to output light having the frequency f (for example, 195.50 THz) and the light intensity P (for example, 1 mW) (Step S104).

The command 422a is received by the CPU 426a of the light source part 404 (see FIG. 38). When receiving the command 422b, the CPU 426a of the light source part 404 cooperates with the ACC 430 and outputs the light 416 (that is, laser light) having the frequency f and the light intensity P to the DFB lasers 425.

(Step S106) Following Step S104, the CPU 426b sends the command 422c for requesting the optical amplification part 408 to capture a designated gain (10 dB) (Step S106).

The command 422c is received by the ASIC 74b of the optical amplification part 408 (see FIG. 41). When receiving the command 422c, the ASIC 74b cooperates with the current source 470 and so on to cause the EDFA 464 to capture the designated gain (for example, 10 dB).

(Step S108) Following Step S106, the CPU 426b sends the command 422d for requesting the optical filter 410 to set the center frequency of the pass band to the frequency f (Step S108).

The command 422d is received by the ASIC 74a of the optical filter 410 (see FIG. 26). When receiving the command 422d, the ASIC 74a cooperates with the voltage source 72 to set the center frequency of the pass band of the MEMS mirror 70 to a designated frequency f (for example, 195.50 THz).

(Step S110) Following Step S108, the CPU 426b sends the command 422e for requesting the monitor part 412 to return a measurement value of the intensity of the output 416c of the optical filter 410 (Step S110).

The command 422e is received by the ADC 484 of the monitor part 412. When receiving the command 422e, the ADC 484 cooperates with the current to voltage conversion circuit 482 and so on to return the monitor information 476 including a measurement value M (that is, the intensity of monitor light) of the output 416c of the optical filter 410 to the control part 414.

(Step S112) When receiving the monitor information 476, the CPU 426b compares a difference between the measurement value M and a reference value $M_0$ in the monitor information 476 with an allowable value ε (Step S112).

For example, the allowable value ε is larger than 0 and smaller than the reference value $M_0$. The reference value $M_0$ and the allowable value ε are recorded in, for example, the nonvolatile memory 92d. The reference value $M_0$ and the allowable value ε may be informed to the CPU 426b according to the command 422.

(Step S114) If an absolute value of the difference (hereinafter referred to as deviation) between the measurement value M and the reference value $M_0$ is the allowable value ε (ε is a value more than 0) or more, the CPU 426b sends commands 422f, 422g for requesting the light source part 404 to correct the drive current of the light source 418 (Step S114).

Specifically, if the deviation (=$M-M_0$) is ε or more, the CPU 426b sends the command 422f for requesting the light source part 404 to decrease the drive current. The command 422f is received by the CPU 426a of the light source part 404 (see FIG. 38). When receiving the command 422f, the CPU 426a requests the ACC 430 to decrease the output (that is, the drive current of the DFB lasers 425) by a certain amount (for example, 5%). In response to the request, the ACC 430 decreases the output by the certain amount.

If the deviation (=$M-M_0$) is -ε or less, the CPU 426b sends the command 422g for requesting the light source part 404 to increase the drive current. The command 422g is received by the CPU 426a of the light source part 404. When receiving the command 422g, the CPU 426a requests the ACC 430 to increase the output by a certain amount (for example, 5%). In response to the request, the ACC 430 increases the output by the certain amount.

Following Step S114, the CPU 426b returns to Step S110.

(Step S116) If the absolute value of the deviation between the measurement value M and the reference value $M_0$ is smaller than the allowable value ε, the CPU 426b sends the command 422h for permitting the modulation part 407 to perform modulation (Step S116).

The command 422h is received by the DSP 448 of the modulation part 407 (see FIG. 40). When receiving the command 422h, the DSP 448 starts to output the QPSK signals.

In this manner, setting of the operating conditions (that is, Step S2 in FIG. 46) is finished. The execution order of Steps S104 to S108 is not limited to the example illustrated in FIG. 47. Any of Steps S104 to S106 may be first executed. Similarly, any of Steps S104 to S108 may be finally executed. Similarly, any of Steps S104 to S108 may be executed between the first step and the last step.

In Step S114, the drive current of the light source part 404 is corrected. However, in Step S114, one or both of the drive current of the light source part 404 and an excitation current of the optical amplification part 408 may be corrected.

Figure 48:
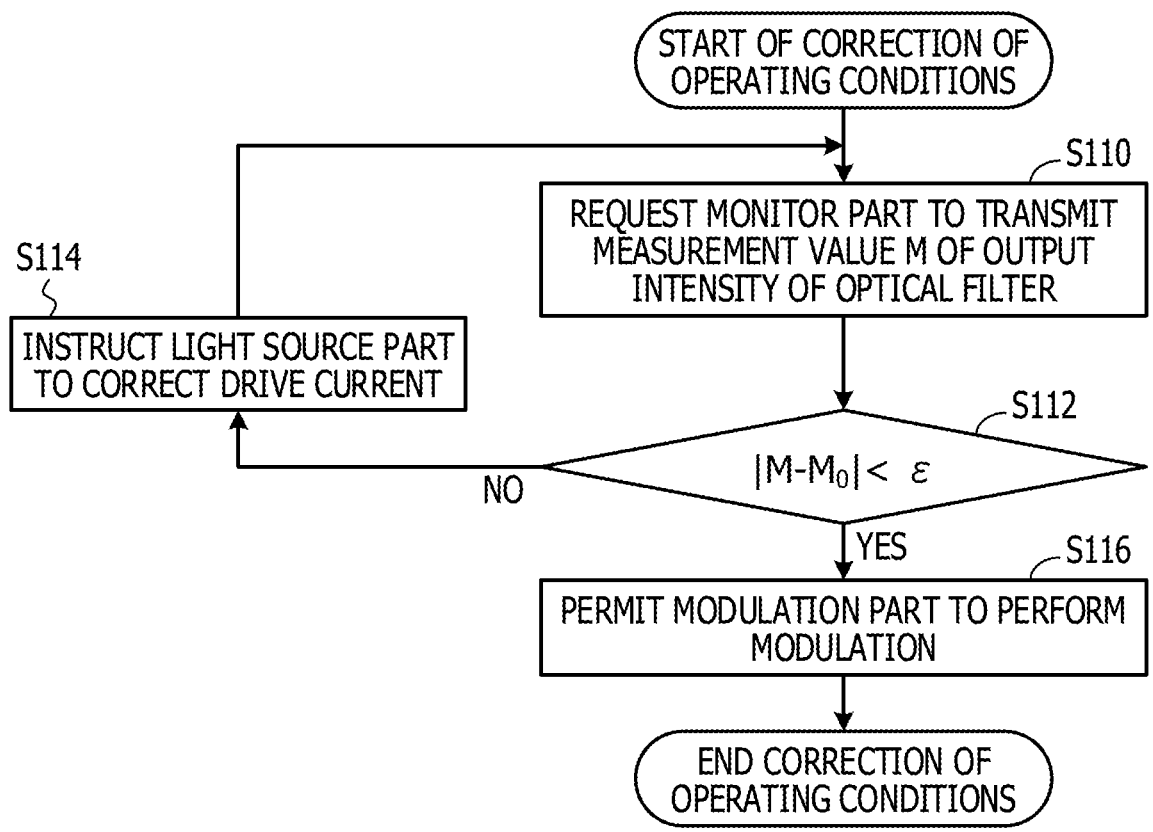
FIG. 48 is a flow chart of an example of a subprocess illustrating details in Step S6.

FIG. 48 illustrates an example of a subprocess illustrating details of Step S6 (see FIG. 46). The subprocess illustrated in FIG. 48 corresponds to Steps S110 to S116 mentioned above (see FIG. 47). Thus, description of the subprocess illustrated in FIG. 48 is omitted.

The CPU 426b of the control part 414 executes the control program 496 described with reference to FIGS. 46 to 48, thereby keeping the intensity of the output light 416d of the optical transmission device 402 substantially fixed.

(2) Usage Example (2.1) Configuration and Operation

Figure 49:
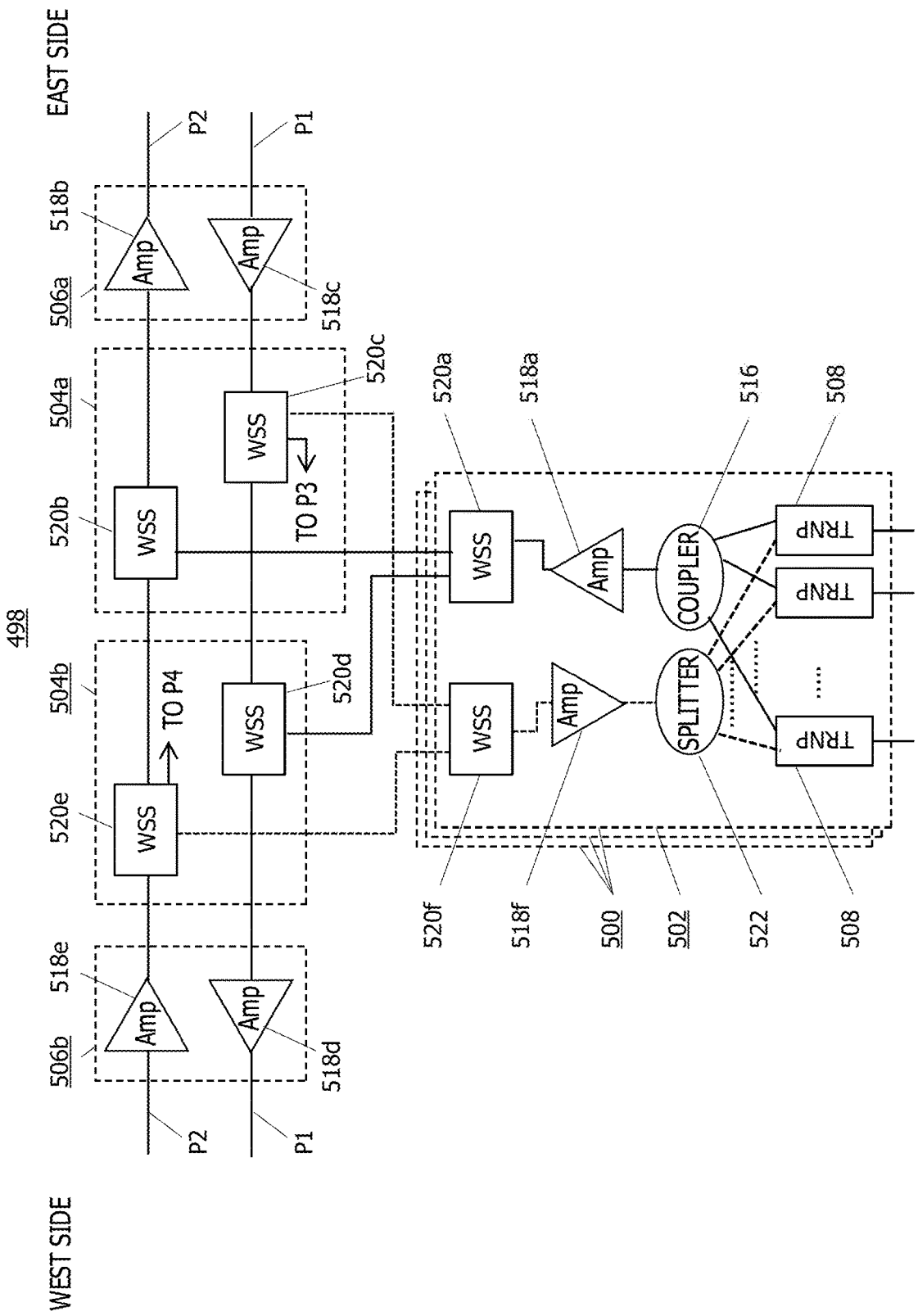
FIG. 49 is a view illustrating an example of a device using the optical transmission device.

FIG. 49 is a view illustrating an example of a device using the optical transmission device 402. The device illustrated in FIG. 49 is a re-configurable optical add/drop multiplexer (hereinafter abbreviated as ROADM) 498. The re-configurable optical add/drop multiplexer 498 illustrated in FIG. 49 is a CD (Colorless Directionless) ROADM.

The ROADM 498 in FIG. 49 has a plurality of optical add/drop modules 500. The plurality of optical add/drop modules 500 have the substantially same configuration, and perform the substantially same operation. FIG. 49 illustrates the configuration of an optical add/drop module 502. The optical add/drop module 502 is one of the plurality of optical add/drop modules 500.

The ROADM 498 further has a plurality of wavelength selectable switch modules. FIG. 49 illustrates a first wavelength selectable switch module 504a and a second wavelength selectable switch module 504b.

The ROADM 498 further has a plurality of amplifier modules. FIG. 49 illustrates a first amplifier module 506a and a second amplifier module 506b.

The ROADM 498 sends signal light traveling in a first direction (for example, the east to the west) to a first path P1. The ROADM 498 further receives the signal light traveling in the first direction to the first path P1.

The ROADM 498 further sends signal light traveling in a second direction (for example, the west to the east) that is different from the first direction to a second path P2 that is different from the first path P1. The ROADM 498 further receives signal light traveling in the second direction from the second path P2.

The first path P1 and the second path P2 each pass through the first amplifier module 506a, the first wavelength selectable switch module 504a, the second wavelength selectable switch module 504b, and the second amplifier module 506b.

The ROADM 498 further sends signal light to a third path P3 (not illustrated) connected to the first wavelength selectable switch module 504a. The ROADM 498 further sends signal light to a fourth path P4 (not illustrated) connected to the second wavelength selectable switch module 504b.

The optical add/drop module 502 has a plurality of optical transmission devices 508.

Figure 50:
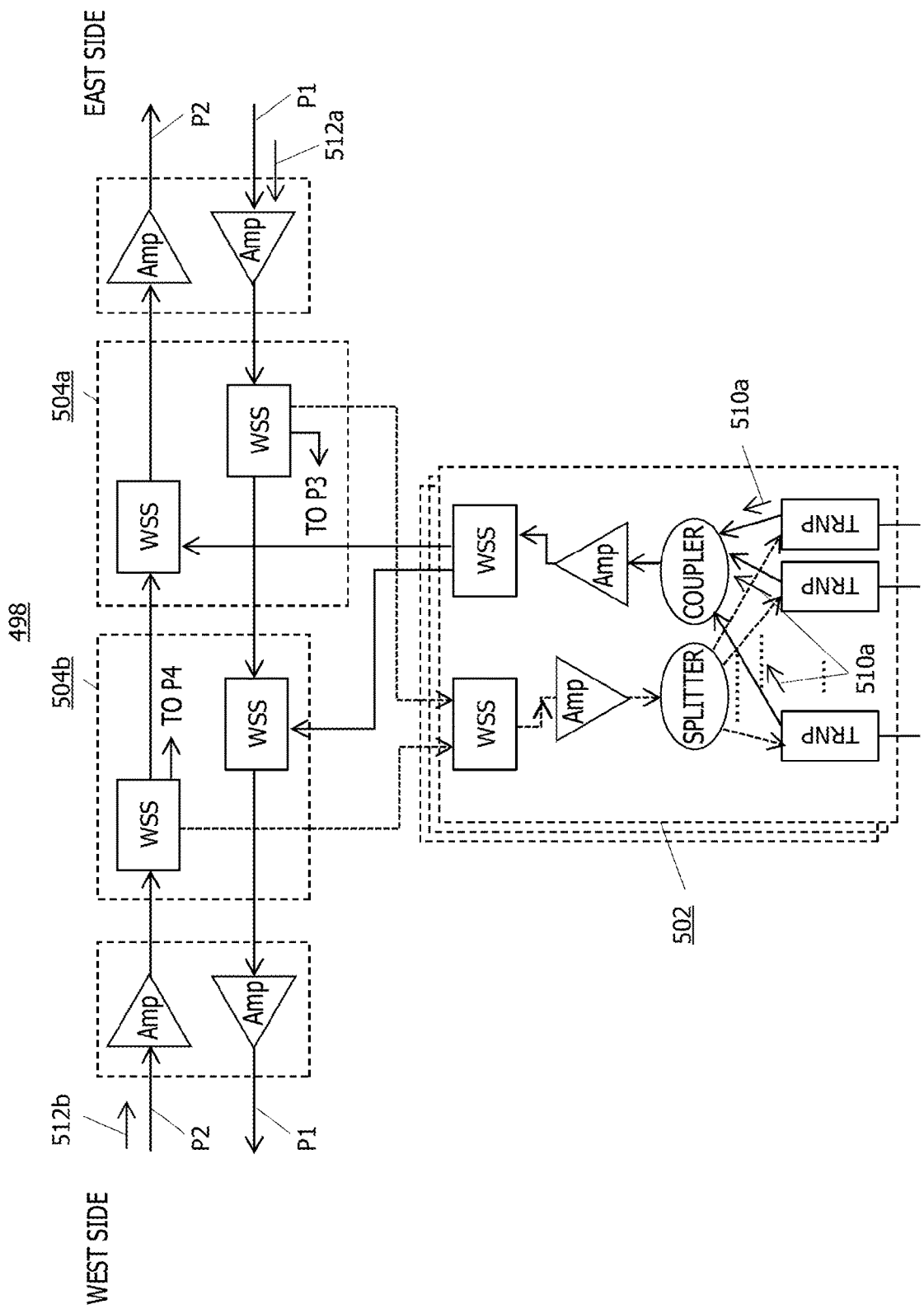
FIG. 50 is a view illustrating the flow of signal light in a ROADM.

FIG. 50 is a view illustrating the flow of signal light in the ROADM 498. Arrows in FIG. 50 represent the flow of the signal light. Each arrow indicates that signal light flows from the part that in contact with the tail of the arrow toward the part that is in contact with the head of the arrow.

A plurality of first signal light beams 510a outputted from the plurality of optical transmission devices 508 are sent from the optical add/drop module 502. The plurality of first signal light beams 510a each are received by either the first wavelength selectable switch module 504a or the second wavelength selectable switch module 504b. The plurality of first signal light beams 510a are signal light beams having different center wavelengths. For example, the frequency interval of the plurality of first signal light beams 510a is fixed.

The first wavelength selectable switch module 504a sends a part or whole of the plurality of received first signal light beams 510a to the second path P2. The first wavelength selectable switch module 504a further disperses first wavelength multiplexed light 512a transmitted via the first path P1 into a plurality of output light beams (for example, three output light beams) according to wavelength. The first wavelength selectable switch module 504a further sends the plurality of dispersed output light beams in different directions. Specifically, the first wavelength selectable switch module 504a sends each output light beam to any of the optical add/drop module 502, the first path P1, and the third path P3.

The second wavelength selectable switch module 504b sends a part or whole of the plurality of received first signal light beams 510a to the first path P1. The second wavelength selectable switch module 504b further disperses second wavelength multiplexed light 512b transmitted via the second path P2 into a plurality of output light beams (for example, three output light beams) according to wavelength. The second wavelength selectable switch module 504b further sends the plurality of dispersed output light beams in different directions. Specifically, the second wavelength selectable switch module 504b sends each output light beam to any of the optical add/drop module 502, the second path P2, and the fourth path P4.

(Details of Each Block)

Figure 51:
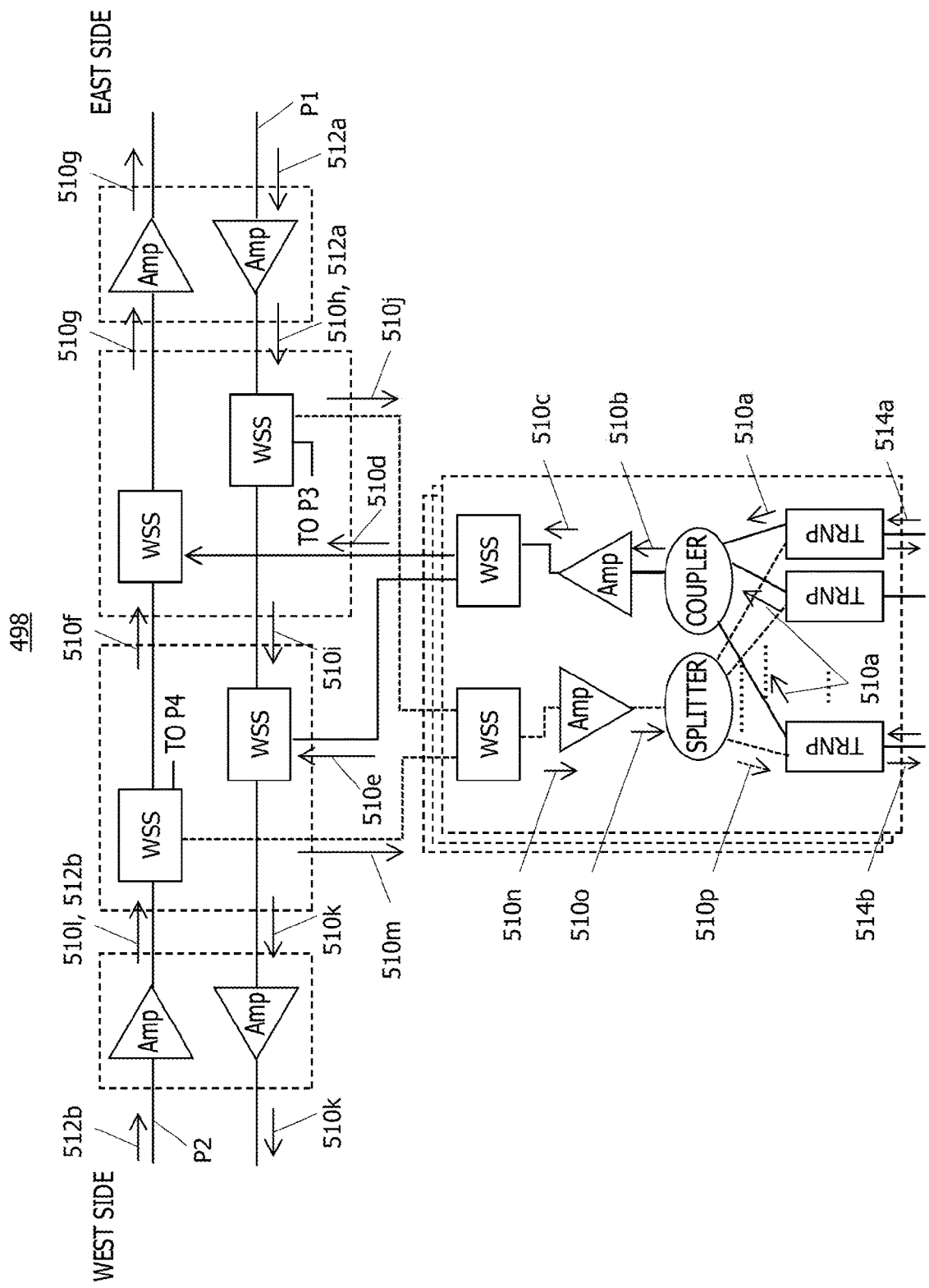
FIG. 51 is a view illustrating the configuration and operation of each block of the ROADM.

FIG. 51 is a view illustrating the configuration and operation of each block in the ROADM 498.

(Optical Add/Drop Module 502 (Sending Part))

The optical add/drop module 502 (see FIG. 49) has the plurality of optical transmission devices 508. Each of the optical transmission devices 508 is a device formed by adding a reception part for demodulating the received signal light to the optical transmission device 402 described with reference to FIG. 36. That is, the optical transmission devices 508 is a transponder.

For example, a transmission part (part corresponding to the optical transmission device 402 illustrated in FIG. 36) of the optical transmission devices 508 converts a received first electric signal 514a (see FIG. 51) into the first signal light beams 510a, and outputs the first signal light beams 510a. The first electric signal 514a corresponds to the signal 445 described with reference to FIG. 37. The first signal light beams 510a sent from the plurality of optical transmission devices 508 are a plurality of signal light beams having different wavelengths.

The optical add/drop module 502 further has an optical coupler 516 (see FIG. 49). The optical coupler 516 multiplexes the plurality of first signal light beams 510a. The optical coupler 516 is a coupler having no wavelength selectivity. For example, the optical coupler 516 is a plain light waveguide having a plurality of Y branched light waveguides.

The optical add/drop module 502 further has a first optical amplifier 518a (see FIG. 49). The first optical amplifier 518a amplifies second signal light beam 510b outputted from the optical coupler 516 (that is, multiplexed first signal light beams 510a). The first optical amplifier 518a is, for example, EDFA (this also applies to below-mentioned second optical amplifier 518b).

The optical add/drop module 502 further has a first wavelength selectable switch 520a. The first wavelength selectable switch 520a extracts a fourth signal light beam 510d having a certain center wavelength from third signal light beam 510c (that is, amplified second signal light beam 510b) outputted from the first optical amplifier 518a. The first wavelength selectable switch 520a further sends the extracted fourth signal light beam 510d to the first wavelength selectable switch module 504a.

The first wavelength selectable switch 520a may extract a plurality of signal light beams having different center wavelengths from the third signal light beam 510c, and send the plurality of extracted signal light beams as the fourth signal light beam 510d. That is, the fourth signal light beam 510d may be a collection of a plurality of signal light beams having different center wavelengths (that is, wavelength multiplexed light) (this also applies to below-mentioned fifth signal light beam 510e to sixteenth signal light beam 510p).

The first wavelength selectable switch 520a further extracts the fifth signal light beam 510e that is different from the fourth signal light beam 510d from the third signal light beam 510c outputted from the first optical amplifier 518a, and sends the extracted fifth signal light beam 510e to the second wavelength selectable switch module 504b.

The first wavelength selectable switch 520a has, for example, a diffraction grating and a movable mirror. The diffraction grating separates the plurality of amplified first signal light beams 510a included in the third signal light beam 510c. The dispersed first signal light beams 510a are assigned to different destinations by the movable mirror.

(First Wavelength Selectable Switch Module 504a)

The first wavelength selectable switch module 504a (see FIG. 49) has a second wavelength selectable switch 520b and a third wavelength selectable switch 520c.

The second wavelength selectable switch 520*b* receives the fourth signal light beam 510*d* sent from the first wavelength selectable switch 520*a* and a below-mentioned sixth signal light beam 510*f*. The second wavelength selectable switch 520*b* extracts a seventh signal light beam 510*g* from the sixth signal light beam 510*f* and the fourth signal light beam 510*d*. The second wavelength selectable switch 520*b* further sends the extracted seventh signal light beam 510*g* to the second path P2.

The third wavelength selectable switch 520*c* receives a below-mentioned eighth signal light beam 510*h*. The third wavelength selectable switch 520*c* further extracts a ninth signal light beam 510*i* and a tenth signal light beam 510*j* from the received eighth signal light beam 510*h*. The third wavelength selectable switch 520*c* further sends the extracted ninth signal light beam 510*i* to the first path P1. The third wavelength selectable switch 520*c* further sends the extracted tenth signal light beam 510*j* to a sixth wavelength selectable switch 520*f*. The third wavelength selectable switch 520*c* further extracts a light beam that is different from the ninth signal light beam 510*i* and the tenth signal light beam 510*j* from the eighth signal light beam 510*h*, and sends the extracted light beam to the third path P3.

(Second Wavelength Selectable Switch Module 504*b*)

The second wavelength selectable switch module 504*b* has a fourth wavelength selectable switch 520*d* and a fifth wavelength selectable switch 520*e*. The fourth wavelength selectable switch 520*d* receives the ninth signal light beam 510*i* transmitted from the third wavelength selectable switch 520*c* and the fifth signal light beam 510*e* transmitted from the first wavelength selectable switch 520*a*. The fourth wavelength selectable switch 520*d* further extracts an eleventh signal light beam 510*k* from the ninth signal light beam 510*i* and the fifth signal light beam 510*e*. The fourth wavelength selectable switch 520*d* further sends the extracted eleventh signal light beam 510*k* to the first path P1.

The fifth wavelength selectable switch 520*e* receives a below-mentioned twelfth signal light beam 510*l*. The fifth wavelength selectable switch 520*e* further extracts the sixth signal light beam 510*f* and a thirteenth signal light beam 510*m* from the received twelfth signal light beam 510*l*. The fifth wavelength selectable switch 520*e* further sends the extracted sixth signal light beam 510*f* to the second path P2. The fifth wavelength selectable switch 520*e* further sends the extracted thirteenth signal light beam 510*m* to the sixth wavelength selectable switch 520*f*. The fifth wavelength selectable switch 520*e* further extracts a signal light beam that is different from the sixth signal light beam 510*f* and the thirteenth signal light beam 510*m* from the twelfth signal light beam 510*l*, and sends the extracted signal light beam to the fourth path P4.

(First Amplifier Module 506*a*)

The first amplifier module 506*a* has the second optical amplifier 518*b* and a third optical amplifier 518*c*. The second optical amplifier 518*b* amplifies the seventh signal light beam 510*g* sent from the second wavelength selectable switch 520*b*. The second optical amplifier 518*b* sends the amplified seventh signal light beam 510*g* to the second path P2.

The third optical amplifier 518*c* amplifies the first wavelength multiplexed light 512*a* transmitted via the first path P1. The third optical amplifier 518*c* sends the eighth signal light beam 510*h* that is the amplified first wavelength multiplexed light 512*a* to the third wavelength selectable switch 520*c*.

(Second Amplifier Module 506*b*)

The second amplifier module 506*b* has a fourth optical amplifier 518*d* and a fifth optical amplifier 518*e*. The fourth optical amplifier 518*d* amplifies the eleventh signal light beam 510*k* sent from the fourth wavelength selectable switch 520*d*. The fourth optical amplifier 518*d* sends the amplified eleventh signal light beam 510*k* to the first path P1.

The fifth optical amplifier 518*e* amplifies the second wavelength multiplexed light 512*b* transmitted via the second path P2. The fifth optical amplifier 518*e* sends the twelfth signal light beam 510*l* that is the amplified second wavelength multiplexed light 512*b* to the fifth wavelength selectable switch 520*e*.

(Optical Add/Drop Module 502 (Reception Part))

The optical add/drop module 502 has the sixth wavelength selectable switch 520*f* in addition to the devices described in the "optical add/drop module 502 (transmission part)".

The sixth wavelength selectable switch 520*f* receives the tenth signal light beam 510*j* sent from the third wavelength selectable switch 520*c*. The sixth wavelength selectable switch 520*f* further receives the thirteenth signal light beam 510*m* sent from the fifth wavelength selectable switch 520*e*. The sixth wavelength selectable switch 520*f* further extracts a fourteenth signal light beam 510*n* from the tenth signal light beam 510*j* and the thirteenth signal light beam 510*m*. The sixth wavelength selectable switch 520*f* further outputs the extracted fourteenth signal light beam 510*n*.

The optical add/drop module 502 further has a sixth optical amplifier 518*f*. The sixth optical amplifier 518*f* amplifies the fourteenth signal light beam 510*n* outputted from the sixth wavelength selectable switch 520*f*.

The optical add/drop module 502 further has an optical splitter 522. The optical splitter 522 disperses a fifteenth signal light beam 510*o* that is the amplified fourteenth signal light beam 510*n* into a plurality of sixteenth signal light beams 510*p*. The optical splitter 522 is a coupler having no wavelength selectivity. For example, the optical splitter 522 is a plain light waveguide having a plurality of Y branched light waveguides.

The reception part of each optical transmission device 508 receives any of the plurality of sixteenth signal light beams 510*p*, converts the received signal light beam into a second electric signal 514*b*, and outputs the second electric signal 514*b*.

(2.2) Noise Characteristic

Figure 52:
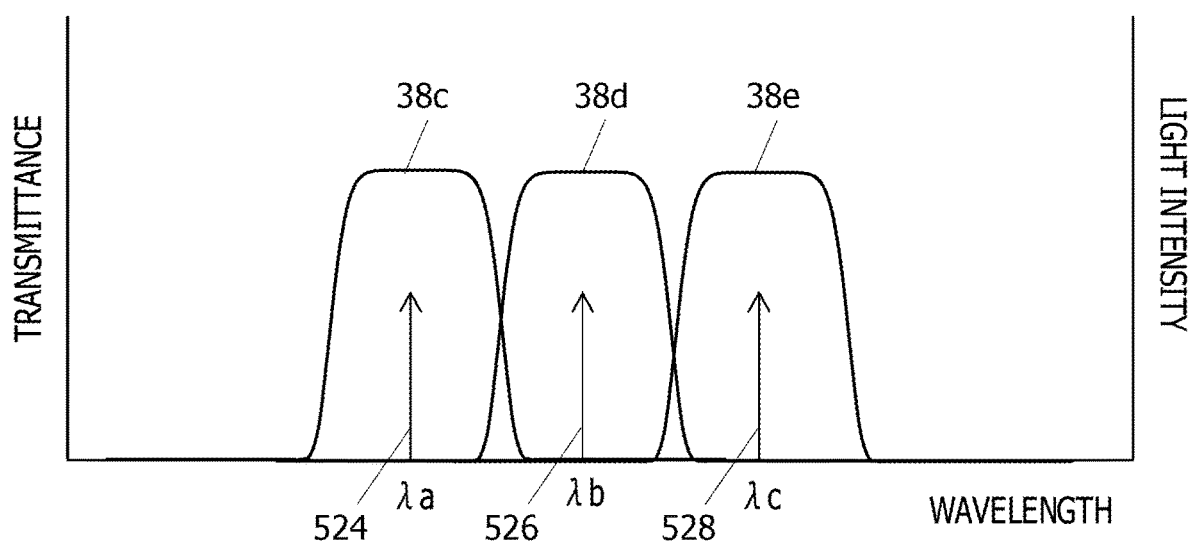
FIG. 52 is a view for describing an example of noise characteristics of second signal light beam.

FIG. 52 is a view for describing an example of noise characteristics of the second signal light beams 510*b* outputted from the optical coupler 516. A horizontal axis (linear scale) indicates wavelength. A vertical axis (linear scale) indicates transmittance of the optical filter and intensity of signal light.

FIG. 52 illustrates transmission characteristics 38*c*, 38*d*, and 38*e* of the optical filters 410 of three optical transmission devices 508 (see FIG. 36). The optical transmission devices 508 each output the first signal light beam 510*a*.

In FIG. 52, light intensities 524, 526, and 528 of the three first signal light beams 510*a* in the center wavelengths λa, λb, and λc are represented as arrows. The light intensity 524 represents the first signal light beams 510*a* having the center wavelength λa. The light intensity 526 represents the first signal light beams 510*a* having the center wavelength λb. The light intensity 528 represents the first signal light beams 510*a* having the center wavelength λc. Here, it is given that the optical coupler 516 multiplexes the outputs (that is, first signal light beams 510a) of the above-mentioned three optical transmission devices 508, and outputs the second signal light beam 510b.

The optical transmission devices 508 that outputs the first signal light beams 510a represented by the left light intensity 524 has the optical filter 410 having the left transmission characteristic 38c. Accordingly, the ASE of the optical amplifier 460, which is outputted from the optical transmission devices 508 is filtered according to the transmission characteristic 38c.

As illustrated in FIG. 52, transmission characteristic 38c is the filtering characteristic that the transmittance is flat in a certain wavelength range and suddenly decreases on the both sides of the wavelength range. Accordingly, in the center wavelength Xb of the first signal light beam 510a represented by the central light intensity 526, the ASE (that is, ASE generated due to the amplification of the first signal light beam 510a represented by the left light intensity 524) associated with the first signal light beam 510a represented by the left light intensity 524 is almost removed. This also applies to the ASE in the center wavelength λc of the first signal light beam 510a represented by the right light intensity 528.

Accordingly, the ASE associated with the first signal light beam 510a represented by the left light intensity 524 hardly degrades the noise characteristics of the first signal light beams 510a represented by the other light intensities 526, 528. This also applies to the ASE associated with the first signal light beams 510a represented by the other light intensities 526, 528.

(Improvement of 3 dB Band)

Figure 53:
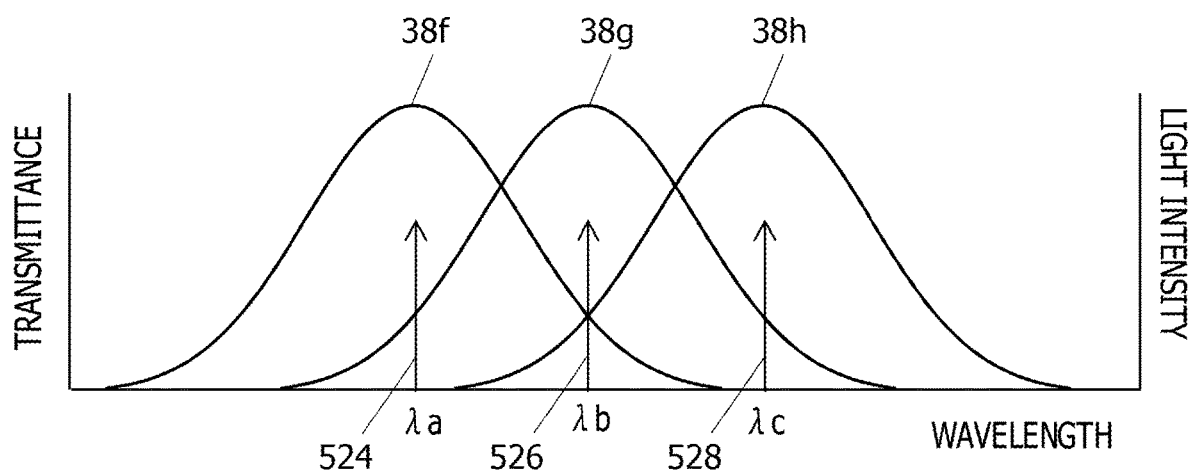
FIG. 53 is a view for describing an example of noise characteristics of the second signal light beams in the case where the optical filters of a plurality of optical transmission devices each are replaced with the optical filter described with reference to FIG. 17.

FIG. 53 is a view for describing an example of noise characteristics of the second signal light beam 510b in the case where the optical filters 410 of a plurality of optical transmission devices 508 each are replaced with the optical filter 202 described with reference to FIG. 17. A horizontal axis (linear scale) indicates wavelength. A vertical axis (linear scale) indicates transmittance of the optical filter and intensity of the signal light.

FIG. 53 illustrates transmission characteristics 38f, 38g, and 38h of the replaced optical filter 202.

The transmission characteristic 38f is a Gaussian characteristic that the transmittance moderately decreases on the outer side of the pass band (for example, 1 dB band). Since the decrease in the transmittance is moderate, the ASE associated with the first signal light beam 510a represented by the left light intensity 524 is not sufficiently removed in the center wavelengths λb, λc (especially, λb) of the first signal light beams 510a represented by the other light intensities 526, 528. Accordingly, the ASE associated with the first signal light beams 510a represented by the left light intensity 524 degrades the noise characteristics of the first signal light beams 510a represented by the other light intensities 526, 528.

It is given that the 1 dB bandwidth of the Gaussian transmission characteristic 38f, 38g, and 38h, and the filtering characteristics 38c, 38d, and 38e (see FIG. 52) that the transmittance is flat within the pass band and suddenly decreases on the both sides of the pass band is 85 GHz. In this case, the 3 dB bandwidth of the Gaussian transmission characteristics 38f, 38g, and 38h is 150 GHz. On the contrary, 3 dB bandwidth of the filtering characteristics 38c, 38d, and 38e is 97 GHz. That is, a difference (=12 GHz) between the 3 dB bandwidth and 1 dB bandwidth of the filtering characteristics 38c, 38d, 38e is smaller than a difference (=65 GHz) between the 3 dB bandwidth and 1 dB bandwidth of the Gaussian transmission characteristic 38f, 38g, and 38h by 5.4 times or more.

That is, in Embodiment 4, the 3 dB band of the optical filter 410 included in the optical transmission device 508 may be decreased.

(Improvement in Signal Light-to-Noise Ratio)

In the optical add/drop module 502 illustrated in FIG. 49, the optical coupler 516 multiplexes the outputs of the plurality of optical transmission devices 508. Accordingly, the ASEs included in the outputs of the plurality of optical transmission devices 508 are also multiplexed. Accordingly, the signal light-to-noise ratio (Optical Signal to Noise Ratio) of the second signal light beam 510b outputted from the optical coupler 516 tends to be higher than the signal light-to-noise ratio of the first signal light beam 510a outputted from the optical transmission devices 508.

First, considering that the optical filters 410 of the plurality of optical transmission devices 508 in the optical add/drop module 502 (see FIG. 49) have the Gaussian characteristic. The 1 dB bandwidth of the optical filter 410 is assumed to be 85 GHz. The interval of the center frequencies of the first signal light beams 510a (that is, outputs of the optical transmission devices 508) is assumed to be 50 GHz. The number of the optical transmission devices 508 is assumed to be 16 (that is, 16 channels). In this case, the signal light-to-noise ratio of the second signal light beam 510b is defined as $SN_G$.

Similarly, in the case where the optical filters 410 of the plurality of optical transmission devices 508 each have the above-mentioned filtering characteristic, the signal light-to-noise ratio of the second signal light beam 510b is defined as $SN_F$. The 1 dB bandwidth of the optical filter 410 is the same as the case where the optical filter 410 has the Gaussian characteristic.

As apparent from comparison of the noise characteristics described with reference to FIGS. 52 to 53, the signal light-to-noise ratio $SN_F$ in the case where the optical filter 410 has the above-mentioned filtering characteristic is higher than the signal light-to-noise ratio $SN_G$ in the case where the optical filter 410 has the Gaussian characteristic.

For example, considering the signal light-to-noise ratio of the first signal light beam 510a having the seventh lowest center frequency (hereinafter referred to as seventh channel signal light beam). According to the Inventor's estimation, the signal light-to-noise ratio $SN_F$ of the seventh channel signal light in the case where the optical filter 410 has the above-mentioned filtering characteristic is higher than the signal light-to-noise ratio $SN_G$ of the seventh channel in the case where the optical filter 410 has the Gaussian characteristic by about 4 dB.

That is, the optical transmission device in accordance with Embodiment 4 may improve the signal light-to-noise ratio of the signal light outputted from the optical add/drop module 502. Therefore, the optical transmission device in accordance with Embodiment 4 is suitable for systems adopting the noise-vulnerable communication mode (for example, 16QAM (Quadrature Amplitude Modulation)) and systems having a long transmission distance.

In the example described with reference to FIG. 36 and other figures, the optical filter 410 is the variable-wavelength filter in accordance with Embodiment 1. The recess 12 of the output fiber 6 in the variable-wavelength filter in accordance with Embodiment 1 is conical (see FIGS. 2 and 3). However, like the optical filter in Embodiment 2, the optical filter 410 in Embodiment 4 may have the hemispherical recess 212 (see FIG. 31). Further, like the optical filter in accordance with Embodiment 3, the optical filter 410 in accordance with Embodiment 4 may have the recess 312 extending toward the outside of the core 216 (see FIG. 34).

In the example described with reference to FIG. 36 and other figures, the optical filter 410 is the variable-wavelength filter. However, the optical filter 410 may be an optical filter with fixed pass band.

In the example described with reference to FIG. 36 and other figures, the optical transmission device 402 is a device for digital coherent communication. The optical transmission device 402 may be a device according to another communication mode (for example, intensity modulation). That is, the modulation part 407 may be a module for intensity modulation.

In accordance with Embodiment 4, since the optical filter having the flap-top characteristic (for example, the optical filter in accordance with Embodiment 1) remove the ASE of the optical amplifier, the signal light-to-noise ratio of the signal light beam outputted from the optical transmission device may be improved. Further, as described in Embodiment 1, the optical filter 410 may be easily miniaturized to realize smaller optical transmission device having a high signal light-to-noise ratio.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical filter comprising:
  a spectroscopic element configured to disperse input light, and emit the dispersed input light as spectrum light; and
  an optical fiber including:
  an end face having a recess;
  a core having a first face in contact with a bottom of the recess and a second face sandwiched between the first face and a circumference end of the recess; and
  a clad surrounding the core,
  wherein in the optical fiber,
  the recess is irradiated with the spectrum light,
  the second face is inclined such that a second portion incident from the second face to the core out of the irradiated spectrum light is emitted to the clad, and
  a first portion incident from the first face to the core out of the irradiated spectrum light is outputted.

2. The optical filter according to claim 1, wherein a part of the second portion is refracted on an interface between the core and the clad and emitted to the clad, and other part of the second portion is reflected on the interface.

3. The optical filter according to claim 1, wherein the circumference end overlaps a boundary between the clad and the core on the end face, or surrounds the boundary.

4. The optical filter according to claim 1, wherein the recess is hemispherical.

5. The optical filter according to claim 1, wherein the spectroscopic element changes a center wavelength of the first portion.

6. The optical filter according to claim 1, wherein
  to disperse the input light means that a plurality of components having different wavelengths in the input light are traveled in different directions, and
  the spectrum light includes the plurality of components.

7. The optical filter according to claim 1, wherein the first portion travels in a longitudinal direction of the optical fiber, and is totally reflected on the interface.

8. An optical transmission device comprising:
  a light source configured to generate light;
  an optical amplifier configured to amplify the light; and
  an optical filter including
  a spectroscopic element configured to disperse an output of the optical amplifier, the output including the amplified light, and emit the dispersed light as spectrum light,
  an optical fiber including:
  an end face having a recess;
  a core having a first face in contact with a bottom of the recess and a second face sandwiched between the first face and a circumference end of the recess; and
  a clad surrounding the core, wherein
  in the optical fiber, the recess is irradiated with the spectrum light, the second face is inclined such that a second portion incident from the second face to the core out of the irradiated spectrum light is emitted to the clad, and a first portion incident from the first face to the core out of the irradiated spectrum light is outputted.

9. The optical transmission device according to claim 8, further comprising: a modulator configured to the light.

* * * * *